United States Patent
Matsunami et al.

(10) Patent No.: US 7,472,240 B2
(45) Date of Patent: Dec. 30, 2008

(54) STORAGE SYSTEM WITH PLURAL CONTROL DEVICE AFFILIATIONS

(75) Inventors: Naoto Matsunami, Hayama (JP); Tetsuya Shirogane, Yokohama (JP); Naoko Iwami, Sagamihara (JP); Kenta Shiga, Yokohama (JP); Akira Nishimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 327 days.

(21) Appl. No.: 11/120,447

(22) Filed: May 2, 2005

(65) Prior Publication Data

US 2005/0251620 A1 Nov. 10, 2005

Related U.S. Application Data

(63) Continuation-in-part of application No. 10/879,424, filed on Jun. 28, 2004, now Pat. No. 7,124,143.

(30) Foreign Application Priority Data

May 10, 2004 (JP) .............................. 2004-139306
Feb. 3, 2005 (JP) .............................. 2005-027616

(51) Int. Cl.
*G06F 12/00* (2006.01)

(52) U.S. Cl. ...................................... 711/162; 711/148
(58) Field of Classification Search ................. 711/162, 711/148, 165

See application file for complete search history.

(56) References Cited

U.S. PATENT DOCUMENTS

| | | | |
|---|---|---|---|
| 6,601,138 B2 * | 7/2003 | Otterness et al. ............ | 711/114 |
| 6,941,396 B1 * | 9/2005 | Thorpe et al. ................ | 710/74 |
| 2003/0204683 A1 * | 10/2003 | Okumoto et al. ............ | 711/147 |
| 2004/0049553 A1 * | 3/2004 | Iwamura et al. ............. | 709/213 |
| 2004/0083343 A1 * | 4/2004 | Mithal et al. ................ | 711/148 |
| 2004/0085347 A1 * | 5/2004 | Hagarty et al. .............. | 345/735 |
| 2004/0123027 A1 * | 6/2004 | Workman et al. ........... | 711/112 |
| 2005/0018709 A1 * | 1/2005 | Barrow et al. ............... | 370/465 |

FOREIGN PATENT DOCUMENTS

JP 2000-187608 7/2000

* cited by examiner

*Primary Examiner*—Pierre-Michel Bataille
*Assistant Examiner*—Hal Schnee
(74) *Attorney, Agent, or Firm*—Townsend and Townsend and Crew LLP

(57) ABSTRACT

The storage system includes a plurality of storage nodes and a control device coupling unit. Each of the storage nodes includes at least one storage device configured to store data and at least one control device configured to control input and output of data for the storage device. The control device coupling unit is configured to connect the control devices without using an access path between the control device and a host computer connected to the storage system. The control devices connected by the control device coupling unit are included in mutually different storage nodes.

16 Claims, 38 Drawing Sheets

RAID GROUP STRUCTURE

LOGICAL UNIT STRUCTURE

| LU | RG | Start RG LBA | LEN | Initiator | Target |
|---|---|---|---|---|---|
| LU0a | RG0a | 0 | k | Init-a0 | Targ-a0 |
| LU1a | RG0a | k | n | Init-b0 | Targ-a1 |

| LU | RG | Start RG LBA | LEN | Initiator | Target |
|---|---|---|---|---|---|
| LU0b | RG0b | 0 | n | Init-SNa1 | Targ-b0 |

| LU | RG | Start RG LBA | LEN | Initiator | Target |
|---|---|---|---|---|---|
| LU0b | RG0b | 0 | n | Init-b0 | Targ-a1 |

| LU | RG | Start RG LBA | LEN | Initiator | Target |
|---|---|---|---|---|---|
| LU0a | RG0a | 0 | k | Init-a0 | Targ-a0 |

| Host | Initiator | SN | Target | LU |
|---|---|---|---|---|
| Host a | Init-a0 | SN a | Targ-a0 | LU 0a |
| Host b | Init-b0 | SN a | Targ-a1 | LU 1a |
| ... | ... | ... | ... | ... |

Fig.35A

| | ~3124 |
|---|---|
| HOST | Host b |
| INITIATOR | Init-b0 |
| VIRTUAL TARGET | V Targ-a0 |
| TARGET | Targ-a1 |
| STORAGE NODE | SN a |
| LU | LU 1a |

Fig.35B

| | ~3124 |
|---|---|
| HOST | Host b |
| INITIATOR | Init-b0 |
| VIRTUAL TARGET | V Targ-a0 |
| TARGET | Targ-b0 |
| STORAGE NODE | SN b |
| LU | LU 0b |

STORAGE SYSTEM WITH PLURAL CONTROL DEVICE AFFILIATIONS

CROSS-REFERENCES TO RELATED APPLICATIONS

This application is a continuation-in-part of a commonly owned U.S. patent application Ser. No. 10/879,424, filed on Jun. 28, 2004 now U.S. Pat. No. 7,124,143. This application relates to and claims priority from Japanese Patent Applications No.JP2005-27616, filed on Feb. 3, 2005 and No.JP2004-139306, filed on May 10, 2004, the entire disclosures of which are incorporated herein by reference.

BACKGROUND

The present invention relates to a storage system for use in a computer system.

The data migration technology from a first storage system to a second storage system is described in Patent Document 1.

In Patent Document 1, once connected with a host computer, the second storage system responsively issues a read request to the first storage system so that data in the first storage system is copied into the second storage system. The second storage system is provided with a copy pointer for recoding the completion level of data copying to tell the progress of data migration.

During such data migration, an I/O request issued by the host computer is accepted by the second storage system. In an exemplary case where a read request is issued from the host computer during data migration, the second storage system refers to the copy pointer to see whether data in request is already at hand. If at hand, the second storage system forwards the data to the host computer. If not at hand, the second storage system reads the requested data from the first storage system for transfer to the host computer.

Here, Patent Document 1 is JP-A-2000-187608.

SUMMARY

In Patent Document 1, first, the connection between the first storage system and the host computer is cut off to establish another connection between the host computer and the second storage system. Then, data migration is performed from the first storage system to the second storage system. Once connected to the second storage system, the host computer issues an I/O request to the second storage system.

The concern here is that there is no disclosure in Patent Document 1 about how an access path is changed between the host computer and the corresponding storage system, especially about how to make settings to the second storage system for an access destination of the host computer.

At the time of data migration, if information about data access can be taken over from a migration source to a migration destination, the host computer can be allowed to make access to the migration destination under the same conditions as for the migration source. Accordingly, it is desired such taking-over is realized.

In the first aspect of the present invention, there is provided a storage system. The storage system comprises a plurality of storage nodes and a control device coupling unit. Each of the storage nodes includes at least one storage device configured to store data and at least one control device configured to control input and output of data for the storage device. The control device coupling unit is configured to connect the control devices without using an access path between the control device and a host computer connected to the storage system. The control devices connected by the control device coupling unit are included in mutually different storage nodes.

In the second aspect of the present invention, there is provided a storage system. The storage system comprises a plurality of storage nodes and a connection unit. Each of the storage nodes includes a storage device configured to store data and a control device configured to control input and output of data for the storage device. The connection unit is configured to connect the storage node to a host computer. The control device has an access target including information identifying the host computer which is an access source for a logical unit as a logical storage area formed by the storage device. The connection unit includes a virtual port and a management unit. The virtual port is a virtual access destination of the host computer. The management unit is configured to manage correspondence between the host computer and the virtual port and correspondence between the virtual port and the access target.

In the third aspect of the present invention, there is provided a storage system management method for managing a storage system. The storage system includes a plurality of storage nodes, a control device coupling unit, and a management console. Each of the storage nodes includes at least one storage device configured to store data and at least one control device configured to control input and output of data for the storage device. The control device coupling unit is configured to connect the control devices without using an access path between the control device and a host computer connected to the storage system. The control devices connected by the control device coupling unit are included in mutually different storage nodes. The management console is configured to manage structural components within the storage system. The management console includes a display unit configured to display a physical structure and a logical structure including a logical unit as a logical storage area in the storage system and an input unit configured to receive instructions from a user. The method comprises an inputting step, a defining step, a notifying step, and a setting step. The inputting step is the step of inputting from the input unit a selection of the logical unit and the storage device displayed on the display unit, and an instruction for executing correlation of the selected logical unit and the storage device by the user. The defining step is the step of defining correspondence between the logical unit and the storage device according to input at the inputting step by the management console. The notifying step is the step of notifying the defined correspondence of the logical unit and the storage device by the management console to the control device. The setting step is the step of setting the correspondence between the logical unit and the storage device according to the notification at the notifying step by the control device.

BRIEF DESCRIPTION OF THE DRAWINGS

FIGS. 5A to 5D are all a diagram showing an exemplary structure of an LU management table;

FIG. 35A and FIG. 35B are diagrams showing an overview of the virtual target management table 3124.

DESCRIPTION OF THE PREFERRED EMBODIMENTS

In the below, exemplary embodiments of the present invention are described. Note that these embodiments are no more than examples, and the present invention is not restricted thereby.

In the accompanying drawings, component names and numbers are each provided with a lower-case alphabetic character such as a, h, or c for component distinction among those plurally provided in the same structure. If no such component distinction is required, no alphabetic character is provided to the component numbers.

First Embodiment

1. Exemplary System Structure (FIG. 1)

Figure 1:
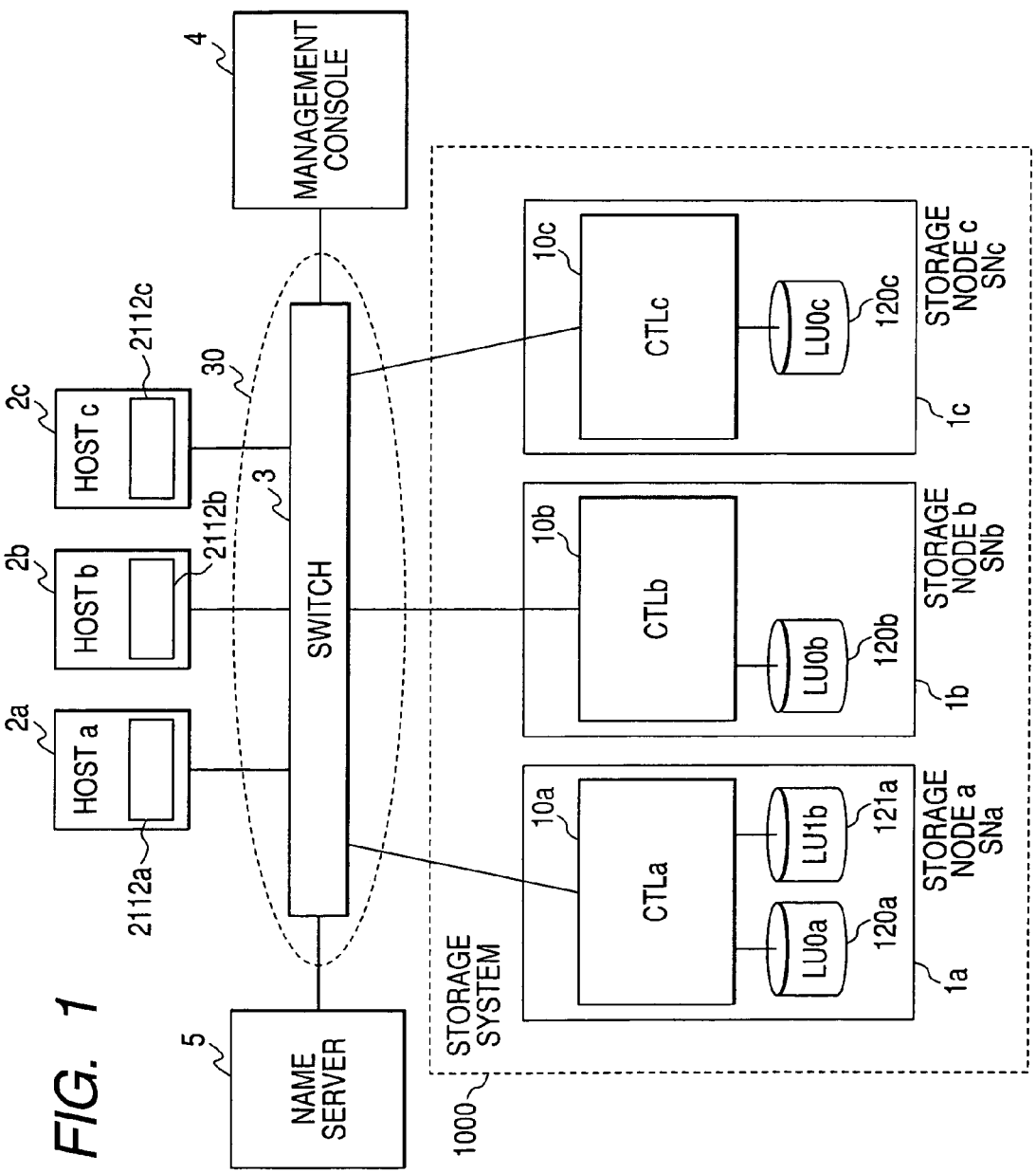
FIG. 1 is a diagram showing an exemplary structure of a computer system in a first embodiment of the present invention.

FIG. 1 is a diagram showing an exemplary system structure in a first embodiment.

A computer system includes: a plurality of storage nodes (in the below, simply referred to as SNs) 1, a plurality of host computers (in the below, hosts) 2, a network 30, a switch 3, a management console 4, and a name server 5. The switch 3 is used for establishing a connection over the network 30 among a plurality of network nodes. The network node is the collective expression including the SNs 1, the hosts 2, the management console 4, the name server 5, and others, all of which are connected to the network 30. The name server 5 is in charge of name management of the SNs 1 and the hosts 2, and their logical connections. The management console 4 is provided for managing a storage system 1000 structured by a plurality of SNs 1. Herein, the network 30 is a generic name for the switch 3 and a line for connecting the switch 3 with the hosts 2, the SNs 1, the management console 4, the name server 5, and others. In FIG. 1, the network 30 is encircled by a dashed line.

The SNs 1 are each provided with a controller (CTL) 10, and a logical unit (LU) 12Xx being a logical disk unit to be accessed by the hosts 2. Here, Xx denotes an identification of the corresponding LU, X is an integer of 0 or larger and x is a small letter of alphabet. The controller 10 exercises control over disks connected to the corresponding SN 1, and executes access requests coming from the hosts 2.

The hosts 2 are each a computer including a network controller for establishing a connection to a CPU, memory, and the network 30. The memory includes an initiator management table 2112, which will be described later.

Similarly to the hosts 2, the management console 4 is a computer including a network controller for establishing a connection to a CPU, memory, and the network 30. The memory stores a structure management program 4122, an LU management table 1111', an initiator management table 2112 or 1113, and a target management table 1112, all of which will be described later. The management console 4 includes input units such as a keyboard and a mouse, and output units such as a display.

2. Exemplary Structure of Storage Node (SN) (FIG. 2)

Figure 2:
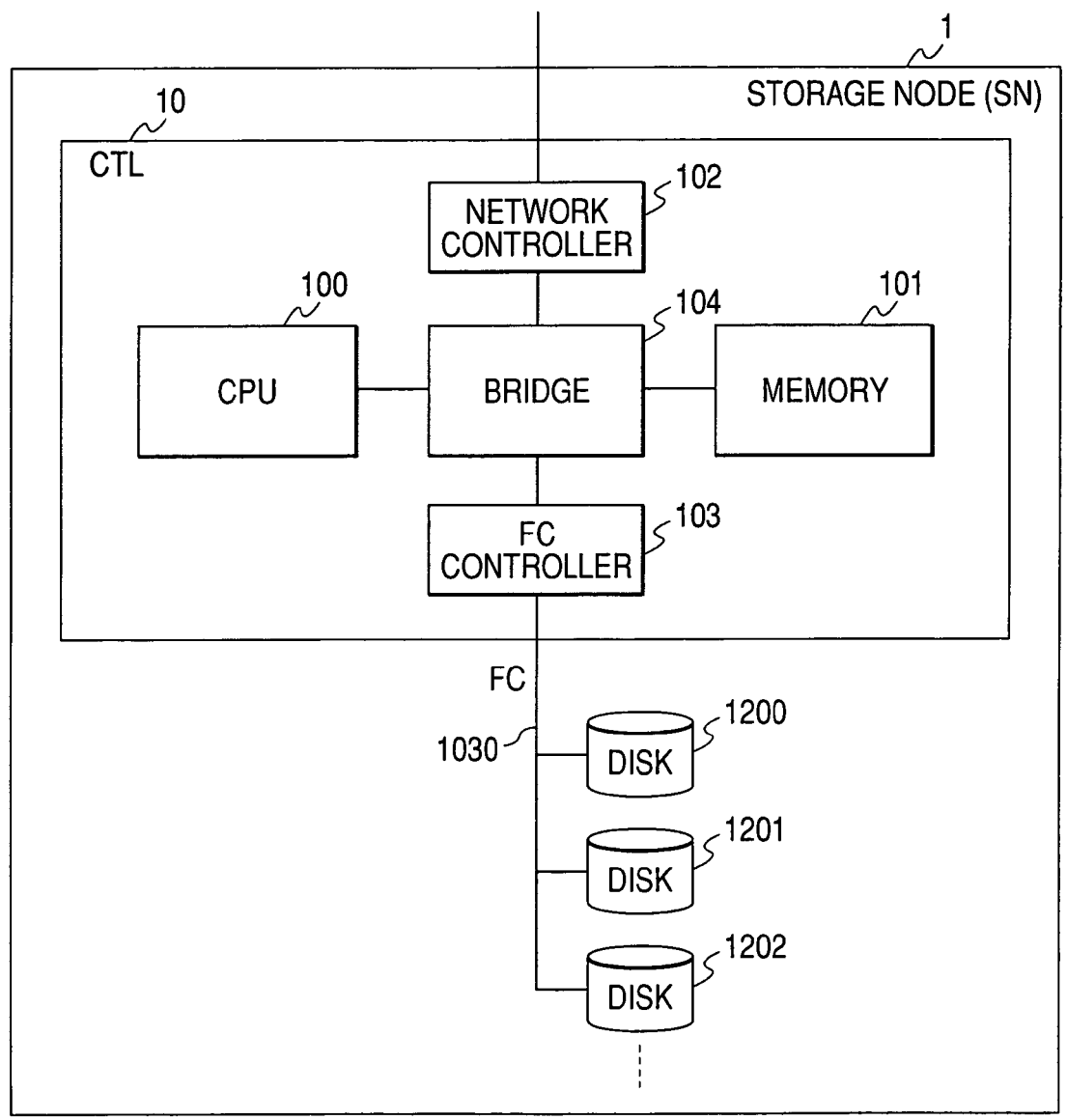
FIG. 2 is a diagram showing an exemplary structure of a storage node.

FIG. 2 is a diagram showing an exemplary hardware structure of the SN 1.

The SN 1 includes the controller (CTL) 10, and a plurality of disks 120y to be connected to the CTL 10 through a Fibre Channel 1030. The CTL 10 exercises control over input/output to/from the disks 120y.

The CTL 10 includes: a CPU 100 exercising control over the SN 1; memory 101; a network controller 102 for establishing a connection to the network 30; an FC controller 103; and a bridge 104. Specifically, the memory 101 stores control programs to be executed by the CPU 100 and control data, and serves as cache for increase the speed of disk access. The FC controller 103 is provided for controlling the Fibre Channel (FC) 1030 to be connected to the disks 120y. The bridge 104 exercises control over data or program transfer between the CPU 100 and the memory 101, data transfer between the network controller 102 and the memory 101, and data transfer between the FC controller 103 and the memory 101.

3. Exemplary Structure of Memory (FIG. 3)

Figure 3:
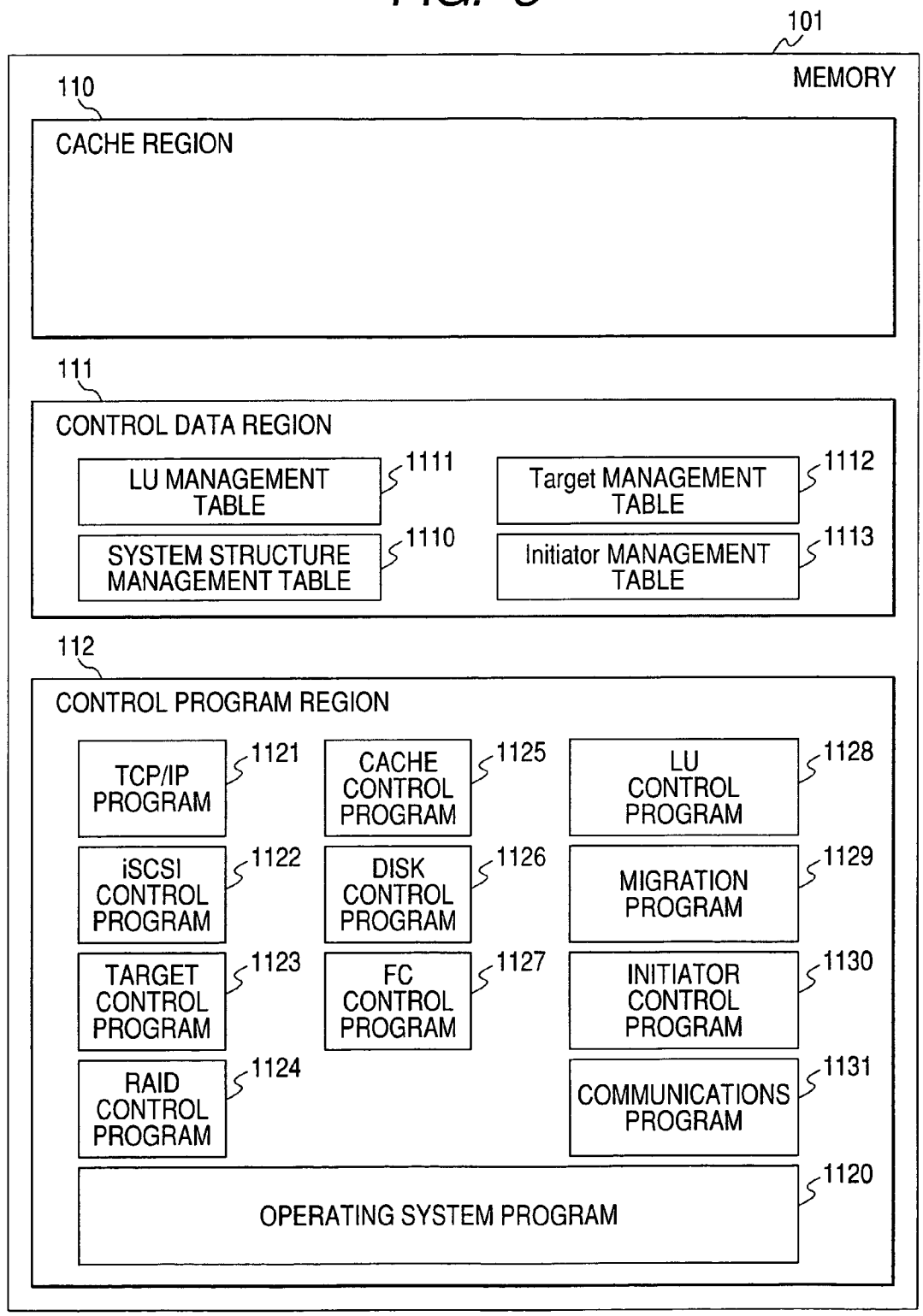
FIG. 3 is a diagram showing an exemplary structure of memory provided to the storage node.

FIG. 3 is a diagram showing an exemplary structure of the memory 101 provided in the SN 1.

The memory 101 is structured by a cache region 110, a control data region 111, and a control program region 112.

To increase the speed of disk access from the hosts, the cache region 110 serves as a disk cache (in the below, simply referred to as cache) for temporarily storing data of the disks 120y or copies thereof.

The control data region 111 is provided for storing various tables and others for reference by the CPU 100 at the time of execution of the control programs. The various tables include a system structure management table 1110, an LU management table 1111, a target management table 1112, and an initiator management table 1113. Specifically, the system structure management table 1110 stores structure information about the storage system 1000 that is structured by a plurality of SNs 1. The LU management table 1111 stores structure information about the LU 12Xx in the SN 1. The target management table 1112 stores a target name (in the below, simply referred to as target) being a logical address provided to the LU 12Xx. The initiator management table 1113 stores an initiator name (in the below, simply refereed to as initiator) being a logical address of an access sources from which the LU 12Xx is accessed.

Note here that the target name or initiator name is exemplified by an iSCSI name in any system using the iSCSI protocol, a WWN (World Wide Name) in any FC systems, and others. The target name is not restrictive thereto as long as being a globally unique identifier assigned to an access destination and showing no change after created until deleted. This is applicable also to the initiator name. Herein, the target address or the initiator address may be used as information for identifying the access destination or the access source. The target address is exemplified by but not restricted to a Destination ID in any system using the FC protocol, and the initiator address is exemplified by but not restricted to a Source ID and others in any system using the FC protocol. The target name and the target address are both information used for identification of address destination, and the initiator name and the initiator address are both information used for identification of address source. Thus, the target address can be an alternative option for the target name, and the initiator address for the initiator name. In consideration thereof, the target name and the target address are hereinafter collectively referred to as "target name", and this is true to the initiator.

The control program region 112 is provided for storing the control programs to be executed by the CPU 100. The control program region 112 stores various programs as follows. That is, an operating system program 1120 serves as a basic program to execute the control programs in the environment; a TCP/IP program 1121 for data transmission and reception over the network 30 using the TCP/IP protocol; an iSCSI control program 1122 for connecting between the hosts 2 and the SNs 1 using the iSCSI protocol; and a target control program 1123 for controlling a target process at the time of access reception from the host 2 being the initiator to the LU 12Xx being the target of the iSCSI. Herein, the target process includes command reception from the host 2, command interpretation after reception, and others. The various programs further include: a RAID control program 1124 for controlling RAID (Redundant Arrays of Inexpensive Disks) structured by a plurality of disks 120y of the SN 1; a cache control program 1125 for management control of the disk cache formed in the cache region 110; a disk control program 1126 for executing a disk control process such as command generation with respect to a single disk 120y; an FC control program 1127 for transmission and reception of command and data with the disk 120y via the FC through control over the FC controller 103; an LU control program 1128 for structuring the LU 12Xx being a logical volume through formation of RAID from the disks 120y; a migration program 1129 for executing a migration process for migrating data of the LU 12Xx among the SNs 1; an initiator control program 1130 for controlling the SN 1 to operate as initiator of iSCSI at the time of migration process to forward data of the LU 12Xx to any other SN 1; and a communications program 1131 for carrying out communications for name management with the name server 5 based on the iSCSI protocol specifications.

In the present embodiment, the network 30 is exemplified as an IP network for connection between the hosts 2 and the SNs 1, the network protocol as the TCP/IP protocol, and the data protocol between the hosts 2 and the SNs 1 as the iSCSI protocol being a block I/O interface. The present invention is not surely restrictive thereto.

4. Exemplary Structure of LU (FIGS. 4A and 4B)

Figure 4A:
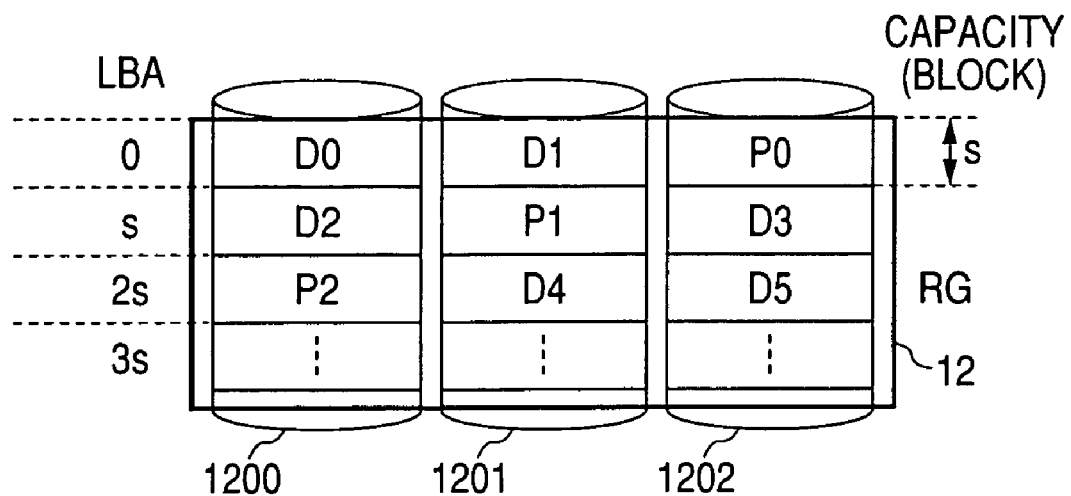
FIGS. 4A and 4B are both a diagram showing an exemplary structure of a logical unit.
Figure 4B:
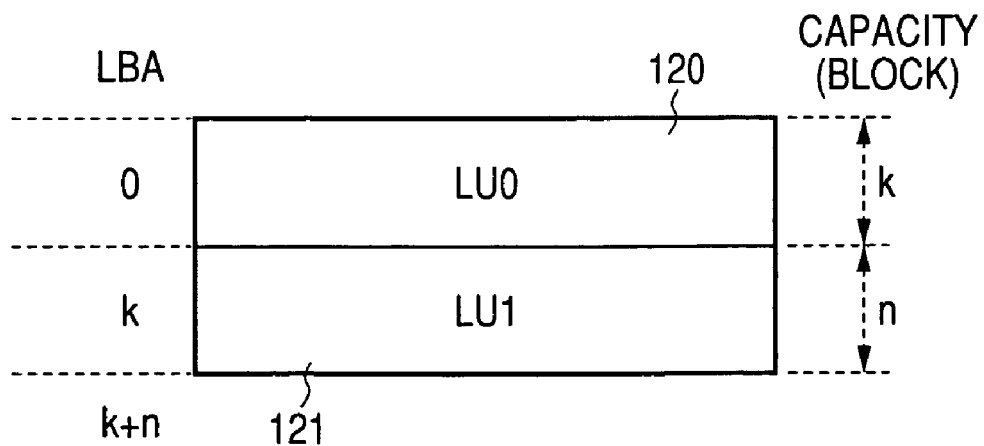

FIGS. 4A and 4B are both a diagram showing an exemplary structure of the LU 12Xx.

The SN 1 in the present embodiment is presumably provided with three disks of 1200, 1201, and 1202. Surely, the number of disks 120y provided to the SN 1 is not restrictive thereto, and any number will do as long as at least one or larger.

FIG. 4A is a diagram showing an exemplary structure of a RAID group (in the below, referred also to as RG).

The three disks of 1200, 1201, and 1202 structure a RAID group 12 of RAID 5 type, and the stripe size thereof is S block. Herein, the block means a logical block defined by the SCSI protocol specifications, and a disk sector or 512 bytes is often defined as a logical block. The block size is not restrictive, and surely any other value will do. In the RAID group 12, data is divided on the basis of S block for placement among other disks adjacent to one another. A stripe string includes three storage regions locating in each different disk. One of such storage regions stores parity data as a result of exclusive OR calculation from data in other two storage regions. That is, $$P0=D0+D1 \text{ (where + denotes exclusive OR)} \qquad \text{Equation 1}$$

The RAID group (RG) 12 structured as such includes two logical units LU0 and LU1. FIG. 4B is a diagram showing an exemplary structure of a logical unit. The LU0 (120) is a logical unit having the capacity of k block, and the LU1 (121) is a logical unit having the capacity of n block. In the RAID group, the logical block address (in the below, referred to as RG LBA) for the LU0 is in a range from 0 to k−1, and in a range from k to (k+n−1) for the LU1. Once LUs are structured, the LUs are each accessed from the hosts 2 using an LBA local to the corresponding LU (Local LBA) so that each LU can behave as if being an independent disk. That is, the Local LBA for the LU0(120) has the address starting from 0 to (k−1) being equal to the total Capacity −1, and separately therefrom, the Local LBA for the LU1(121) has the address starting from 0 to (n−1).

5. Exemplary Structure of LU Management Table (FIGS. 5A to 5D)

FIGS. 5A to 5D are all a diagram showing an exemplary structure of the LU management table 1111 stored in the memory 101 of the SN 1. In the table, LU denotes an LU number, and RG denotes identification information of a RAID group having LUs structured therein. Further, Start RG LBA denotes an RG LBA located at the LU head in the RG, LEN denotes the LU capacity (unit of which is block), Initiator denotes an initiator name of any initiator allowed to access the corresponding LU, e.g., initiator set to the host, and Target denotes a target name assigned to the corresponding LU.

FIG. 5A shows an exemplary LU management table 1111*a* of the SNa (1*a*). The LU0*a* is located in the RG0*a*, and having the Start RG LBA of 0, the capacity of k, the initiator allowed to access thereto is the host (Host a) 2*a* with the initiator name of Init-a0, and the target name of Targ-a0. Similarly, the LU1*a* is located in the RG0*a*, and having the Start RG LBA of k, the capacity of n, the initiator allowed to access thereto is the host (Host b) 2*b* with the initiator name of Init-b0, and the target name of Targ-a1.

Herein, although the LU and the target have a one-to-one relationship, there may be a case where a plurality of initiators are allowed to access a target. Once the LU management table is added with an initiator name into the column of Initiator, the target control program 1123 responsively allows access only to the LU 12X*x* corresponding to the initiator whose initiator name is thus entered. When a plurality of initiators are allowed to access any one specific LU 12X*x*, the column of Initiator in the LU management table 1111 is provided with a plurality of entries for registration of a plurality of initiator names. If there is no access limitation for the LU 12X*x*, i.e., if every initiator is allowed to access the LU 12X*x*, no name is entered into the column of Initiator corresponding to the LU 12X*x* (enter NULL). The details of interrelation between the initiator name and the target name are left for later description.

Figure 15A:
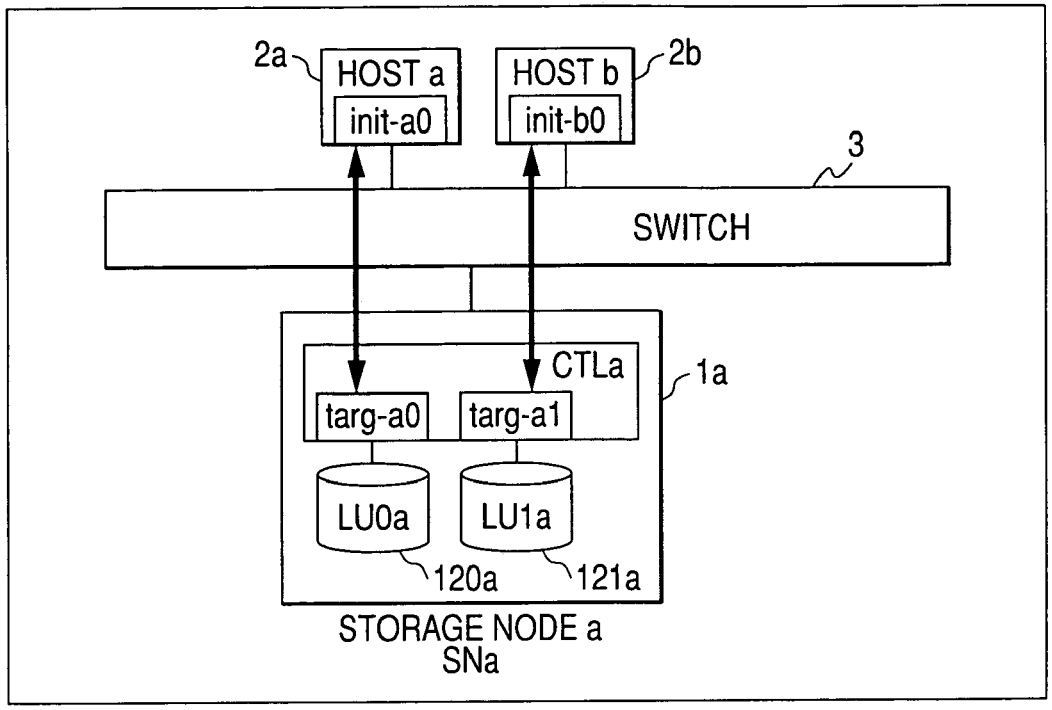
FIG. 15A is a diagram showing an exemplary display screen of a management console 4 having displayed thereon the system structure before data migration.
Figure 15B:
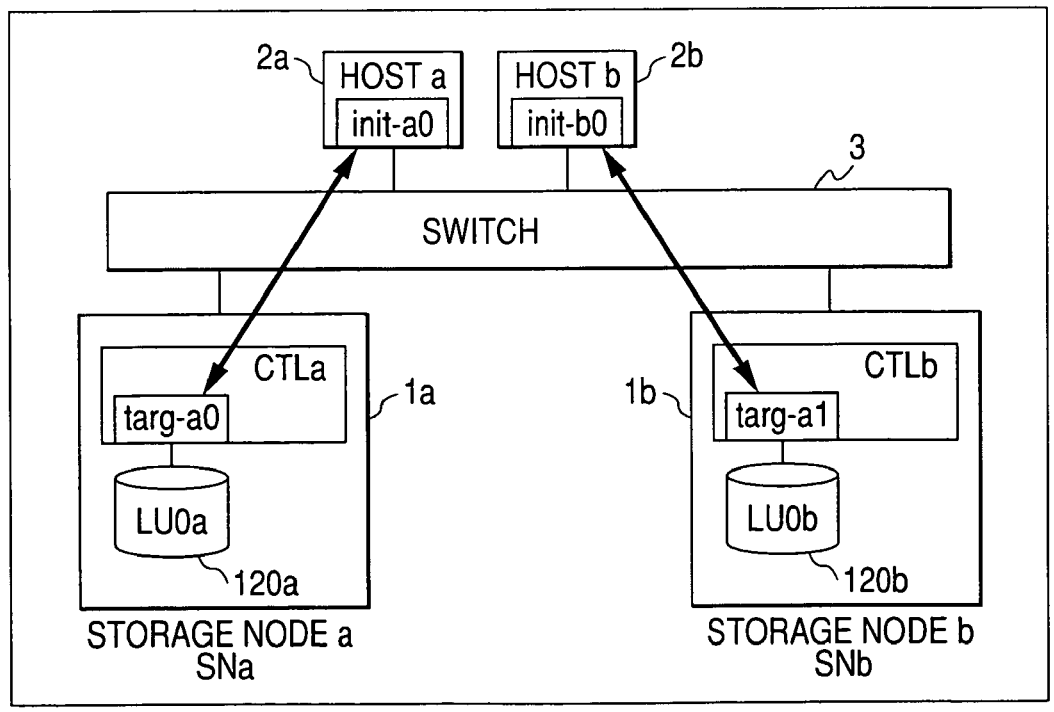
FIG. 15B is a diagram showing another exemplary display screen of the management console 4 having displayed thereon the system structure after data migration.
Figure 15C:
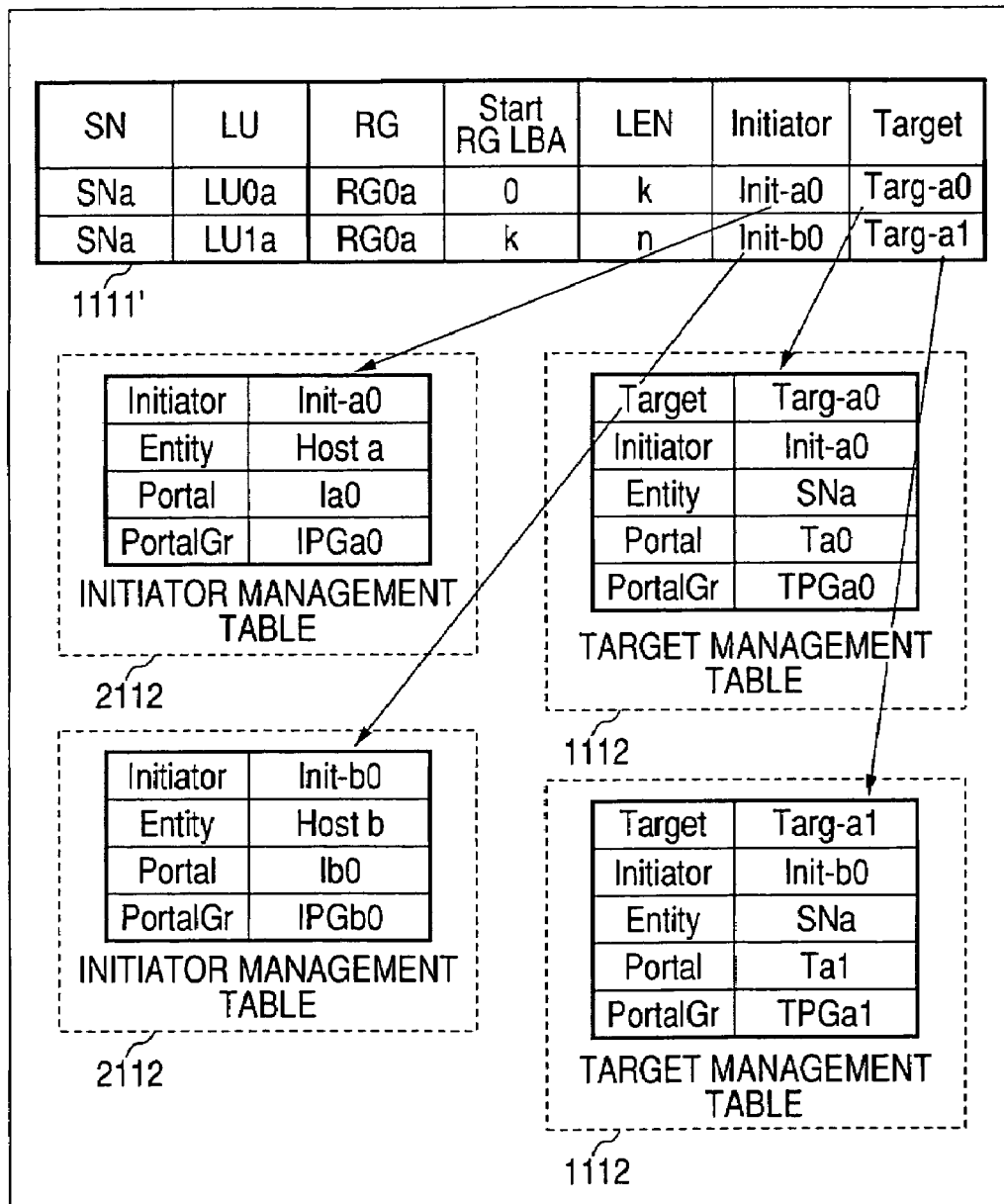
FIG. 15C is a diagram showing still another exemplary display screen of the management console 4 having displayed thereon the interrelation among an LU, a target, and an initiator before data migration.

The management console 4 also includes in the memory the LU management table 1111', which is a combination result of the LU management table 1111 each included in the SNs 1 connected to the network 30. Compared with the LU management table 1111, the LU management table 1111' is additionally provided with identification information for the corresponding SN 1 as shown in FIG. 15C.

6. Exemplary Structure of Name Server (FIG. 6)

Figure 6:
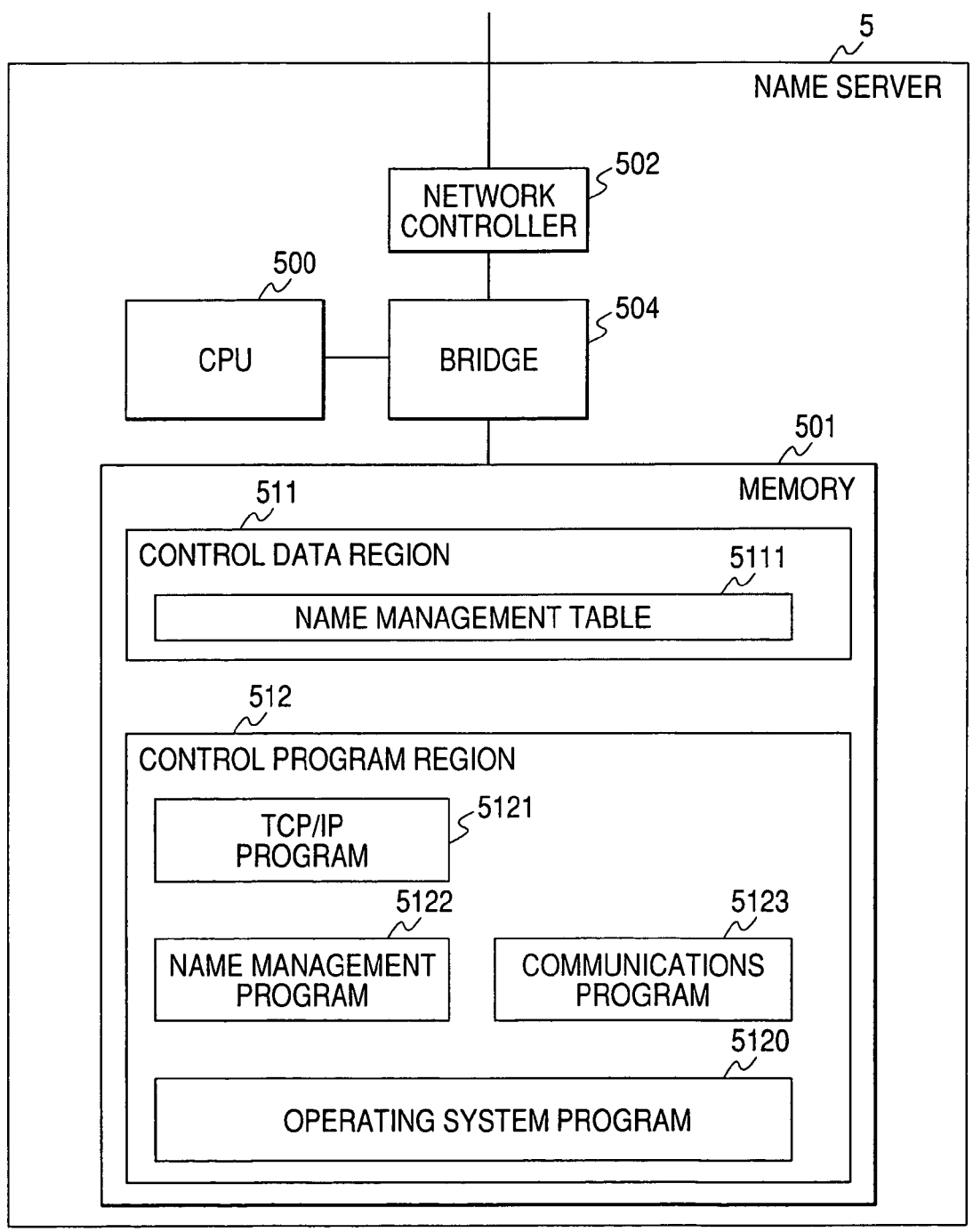
FIG. 6 is a diagram showing an exemplary structure of a name server.

FIG. 6 is a diagram showing an exemplary structure of the name server 5. The name server 5 is provided with: a CPU 500 in charge of control entirely over the name server 5; memory 501 for storing control programs to be executed by the CPU 500 and control data; a network controller 502 for connecting to the network 30; and a bridge 504 exercising control over data or program transfer between the CPU 500 and the memory 501, and data transfer between the network controller 502 and the memory 501.

The memory 501 has a control data region 511, and a control program region 512.

The control data region 511 is provided for storing various tables and others for reference by the CPU 500 when executing the control programs. The control data region 511 stores a name management table 5111 including initiator and target names for iSCSI, and the connection relation between the initiator and the target.

The control program region 512 is provided for storing the control programs to be executed by the CPU 500. The control program region 512 stores various programs as follows. That is, an operating system program 5120 serving as a basic program to execute the control programs in the environment; a TCP/IP program 5121 for data transmission and reception over the network 30 using the TCP/IP protocol; a name management program 5122 in charge of name management of the iSCSI nodes (i.e., hosts 2 and storage nodes SNs 1) to be connected over the network 30, and controlling the interrelation between the initiators and iSCSI nodes; and a communications program 5123 for carrying out communications for name management of initiators (e.g., hosts 2) and targets (e.g., SNs 1) based on the iSCSI protocol specifications.

In the present embodiment, the name server 5 is exemplified by an iSNS (iSCSI Name Server) of the iSCSI protocol specifications. This is not surely restrictive, and to realize the present embodiment, any other name server specifications can be used to construct a name server.

7. Exemplary Structure of Name Management Table (FIGS. 7A and 7B)

Figure 7A:
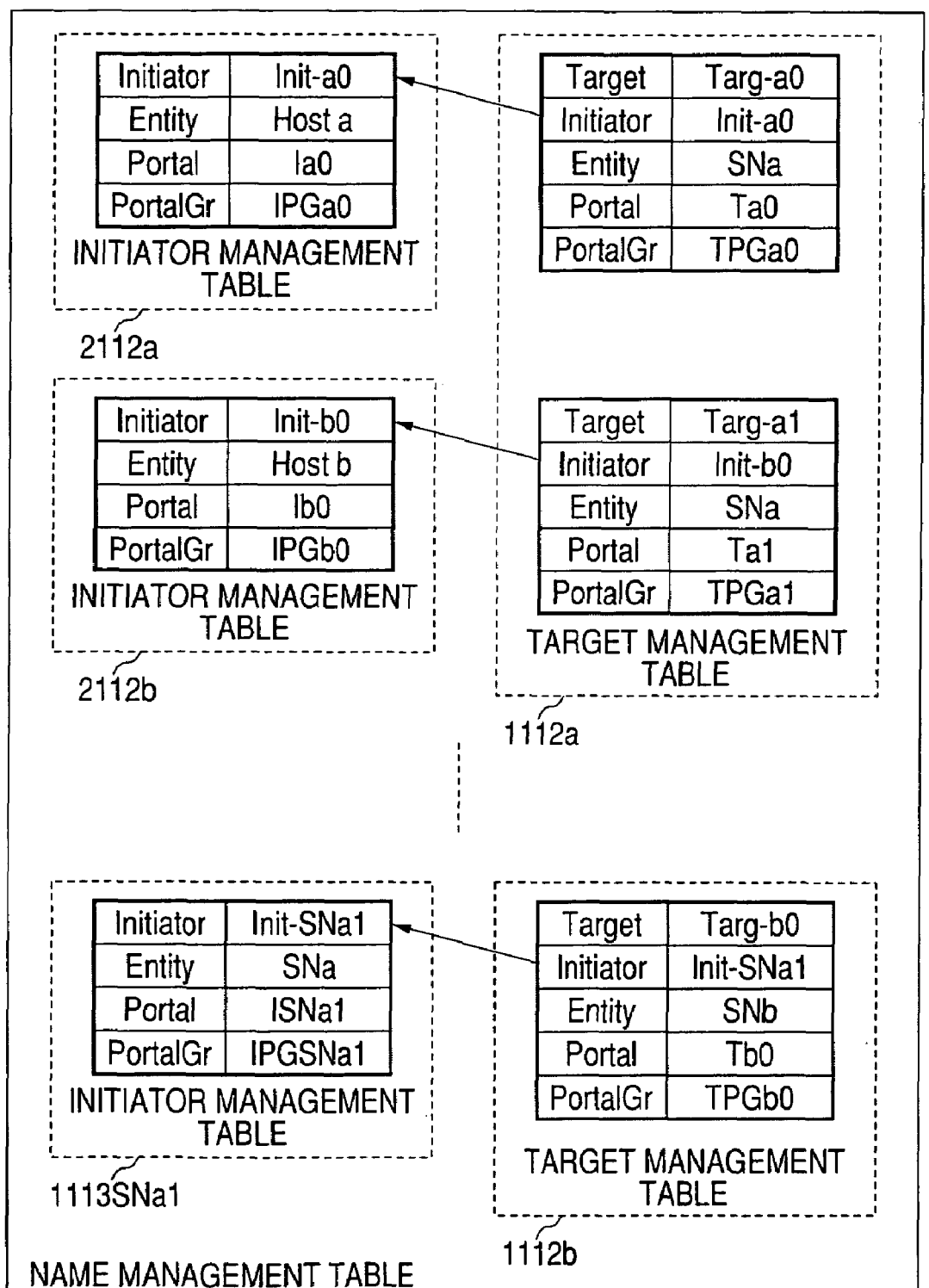
FIG. 7A is a diagram showing an exemplary name management table during data migration.
Figure 7B:
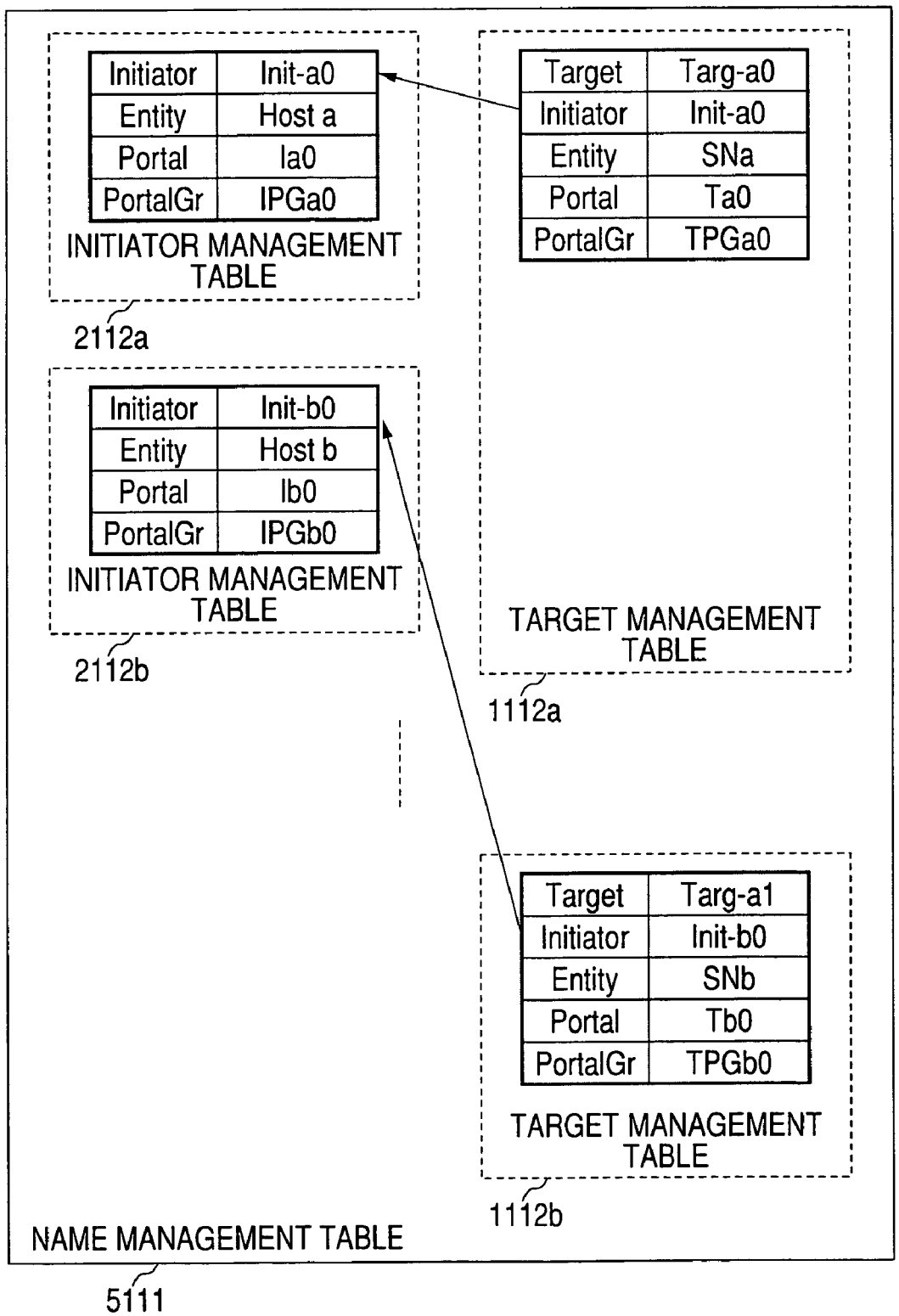
FIG. 7B is a diagram showing another exemplary name management table after data migration.

FIGS. 7A and 7B are both a diagram showing an exemplary name management table 5111 stored in the memory 501 of the name server 5. The name management table 5111 includes the initiator management table (2112 or 1113) and the target management table 1112.

In the initiator management table 2112 of FIGS. 7A and 7B, Initiator denotes an initiator name under the management of an entry of the table, Entity denotes an identifier specifying to which device the initiator belongs, Portal denotes a portal including the initiator, and PortalGr denotes a portal group including the portal.

In the target management table 1112 of FIGS. 7A and 7B, Target denotes a target name under the management of an entry of the table, Initiator denotes an initiator name allowed to access the target, Entity denotes an identifier specifying to which device the target belongs, Portal denotes a portal including the target, and PortalGr denotes a portal group including the portal.

Note that the initiator management table in the name management table 5111 is the same as the initiator management table stored in the memory of the device having the initiator. Similarly, the target management table in the name management table 5111 is the same as the target management table stored in the memory of the device having the target. Further, the management console 4 includes, in the memory, the initiator management table and the target management table being the same as those in the name server 5.

For example, initiator management tables 2112a and 2112b of FIG. 7A are both an initiator management table for an initiator of the host a(2a) or the host b(2b). The Host a(2a) includes in the memory the initiator management table 2112a similar to the one shown in FIG. 7A, and the Host b (2b) includes in the memory the initiator management table 2112b similar to the one shown in FIG. 7A. Similarly, the initiator management table 1113 of FIG. 7A is an initiator management table for an initiator located in the SNa (1a), and the SNa (1a) includes in the memory 101 the initiator management table 1113 similar to the one shown in FIG. 7A. Further, target management tables 1112a and 1112b of FIG. 7A are both a target management table for a target of the SNa (1a) or the SNb (1b). The SNa (1a) includes in the memory 101 the target management table 1112 similar as the target management table 1112a, and the SNb (1b) includes in the memory 101 a target management table 1112 similar to the target management table 1112b.

As is known from the above, the name server 5 uses the name management table 5111 to collectively manage the initiator management tables of the initiators connected to the network 30, and the target management tables of the targets connected to the network 30.

Refer back to FIG. 7A, which exemplarily shows three pairs of initiator and target.

A first pair includes an initiator Init-a0 and a target Targ-a0. The initiator Init-a0 is located in a portal Ia0 of the Host a(2a), and belonging to a portal group IPGa0. The target Targ-a0 is located in a portal Ta0 of the SNa (1a), and belonging to a portal group TPGa0 to allow the initiator Init-a0 to access thereto.

A second pair includes an initiator Init-b0 and a target Targ-a1. The initiator Init-b0 is located in a portal Ib0 of the Host b(2b), and belonging to a portal group IPGb0. The target Targ-a1 is located in a portal Ta1 of the SNa (1a), and belonging to a portal group IPGa1 to allow the initiator Init-a0 to access thereto.

A third pair includes an initiator Init-SNa1 and a target Targ-b0. The initiator Init-SNa1 is located in a portal ISNa1 of the SNa (1a), and belonging to a portal group IPGSNa1. The target Targ-b0 is located in a portal Tb0 of the SNb (1b), and belonging to a portal group IPGb0.

Herein, the portal denotes a logical portal located in the Host 2 or the network controller of the SN 1, and structured by a pair of an IP address of a physical port and a TCP port number. The portal can be plurally provided if any one specific physical port is provided with a plurality of TCP ports. The portal group includes a plurality of portals as an aggregate to be used as a single communications path. In the below, no mention is made to the portal group except for the group name.

The pairs of initiator and target are made between any initiators and targets connected to the network 30, and managed by the name management table 5111.

8. Exemplary SN Add-In and LU Migration Process

Described now is a process of achieving the load balance among the SNs 1 through addition of a new storage node 1 to the storage system 1000, and through data migration from the LU 12Xx of any existing storage node 1 to the newly-provided SN 1.

Figure 8:
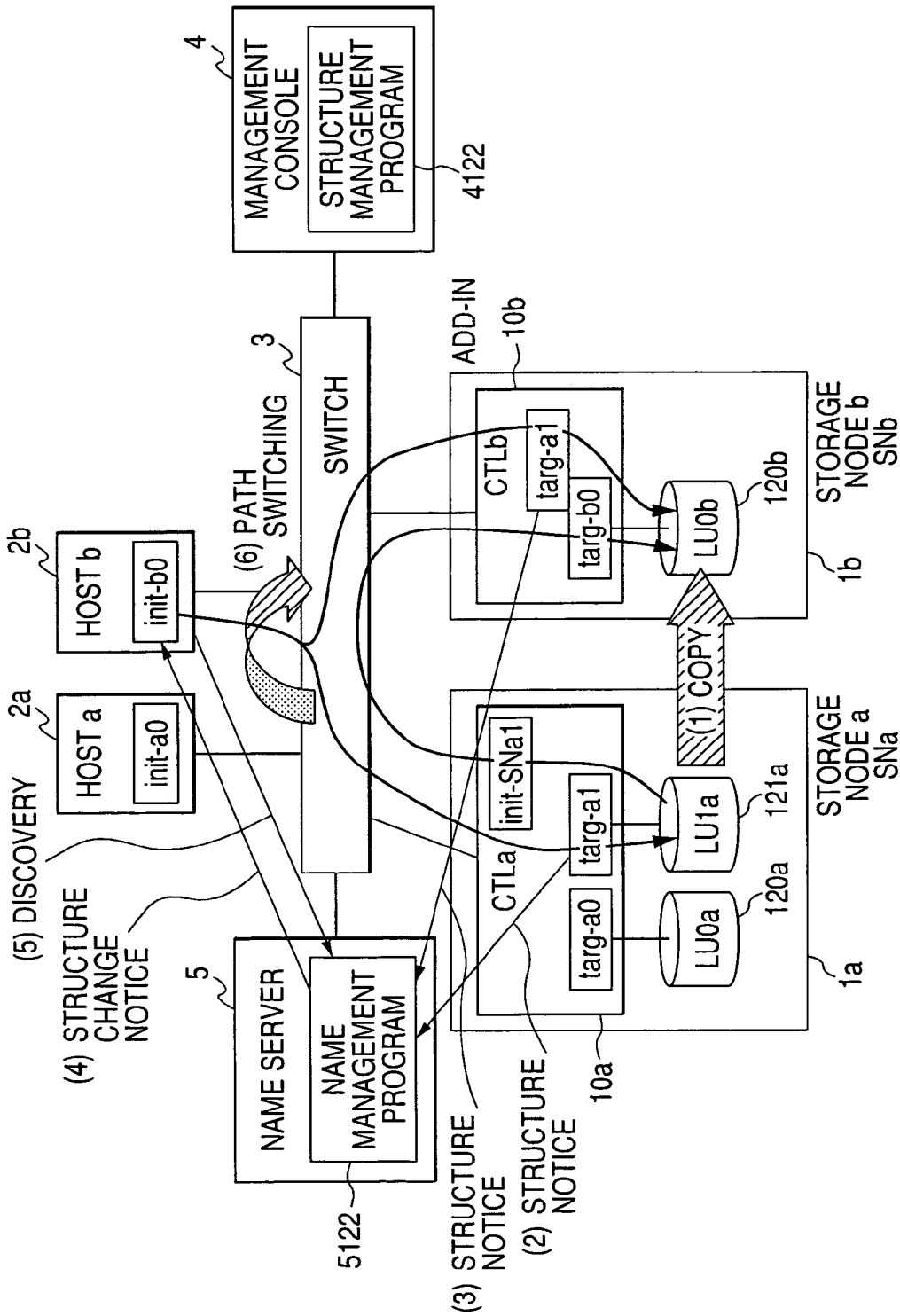
FIG. 8 is a schematic diagram showing an exemplary process of migrating data in a logical unit from a storage node to another.

FIG. 8 is a schematic diagram showing, through addition of a new SN 1 to the storage system 1000, an exemplary process of data migration from the LU 12Xx of any existing SN 1 to the newly-added SN 1. Note that FIG. 8 shows the state halfway through the construction process of the system of FIG. 1.

Assuming here is that, as the first stage, the storage system 1000 does not include the SNb (1b) but only the SNa (1a), and includes the Host a(2a) and Host b(2b).

The Host a(2a) is making access to an LU0a(120a) of the SNa(1a), and the Host b(2b) is making access to an LU1a (121a) of the SNa (1a).

The Host a(2a) includes an initiator, which is entered to, as the initiator name of Init-a0, both the initiator management table 2112a of the Host a(2a) and the name management table 5111 of the name server 5. Similarly, the Host b(2b) includes an initiator, which is entered to, as the initiator name of Init-b0, both the initiator management table 2112b of the Host b(2b) and the name management table 5111 of the name server 5.

The LU0a(120a) of the SNa(1a) is added as the target name of Targ-a0 to the target management table 1112 of the SNa(1a) and the name management table 5111 of the name server 5. Also added to the target management table 1112 and the name management table 5111 is Init-a0 as the initiator allowed to access the target Targ-a0. Similarly, the LU1a (121a) of the SNa(1a) is added as the target name of Targ-a1 to the target management table 1112 of the SNa(1a) and the name management table 5111 of the name server 5. Also added to the target management table 1112 and the name management table 5111 is Init-b0 as the initiator allowed to access the target of Targ-a1.

As such, two pairs of Init-a0 and Targ-a0, and Init-b0 and Targ-a1 are made. FIG. 7A shows the name management table 5111 under such pair making. The target management table 1112 and the name management table 5111 are added with initiators in accordance with the iSCSI protocol specifications. Assuming here is that the Host a(1a) is already operating under the state accessible to the LU0a(120a), and the Host b(1b) under the state accessible to the LU1a(121a). That is, as shown in FIG. 5A, the LU management table 1111 in the memory 101 of the SNa(1a) includes Targ-a0 as the target name of the LU0a(120a), and Init-a0 as the initiator in the Host a(1a) that is allowed to access the Lu0a(120a). Similarly, the LU management table 1111 includes Targ:a1 as the target name of the LU1a(121a), and Init-b0 as the initiator in the Host b(1b) allowed to access the Lu1a(121a).

Figure 9:
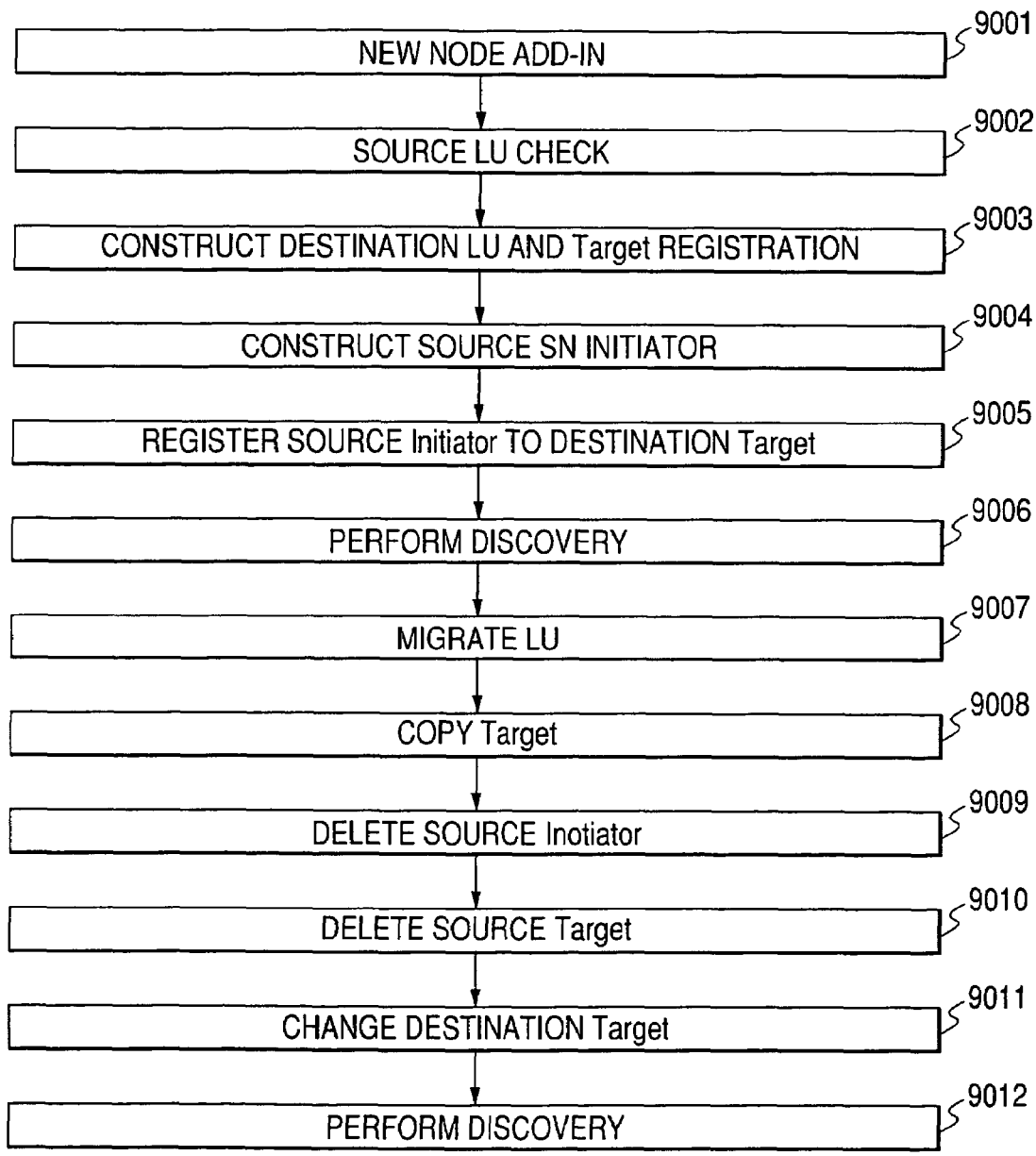
FIG. 9 is a flowchart of an exemplary process of, through addition of a new SN (storage node) to the storage system of the first embodiment, migrating data from an LU (logical unit) of any existing SN to an LU of the newly-added SN.

By referring to FIGS. 8 and 9, described next is a process of data migration from the LU1a(121a) to the SNb(1b) newly added to the storage system 1000 due to overloaded SNa(1a), for example. FIG. 9 is a flowchart of an exemplary process of, through addition of a new SN 1 to the storage system 1000, migrating data from an LU 12Xx of any existing SN 1 to an LU 12Xx of the newly-added SN 1.

9. Add-In of Storage Node SNb (step 9001 of FIG. 9)

First, the SNb(1b) is connected to the switch 3 to add the SNb(1b) to the storage system 1000 (step 9001 of FIG. 9). The SNb(1b) is assumed to have a storage region enough for storage of data in the LU1a(121a) of the SNa(1a).

10. Study of Migration Source LU (step 9002 of FIG. 9)

The CPU of the management console 4 goes through the structure management program 4122 to acquire information about the LU1a(121a), which is the destination LU (step 9002). In the below, when a process is executed by the CPU going through any corresponding program, simply referred to as "the program goes through the process".

To be specific, the structure management program 4122 asks the SNa(1a) for structure information of the LU1a (121a). In response to such a request, the LU control program 1128 of the SNa(1a) refers to the LU management table 1111 to forward the applicable structure information of the LU1a (121a) to the management console 4. The structure information includes information in the LU management table 1111 of the SNa(1a), and information about the RG structure (RAID structure) including the LU1a(121a) structured therein. The structure management program 4122 enters, into the LU management table 1111' stored in its own memory, the information received from the SNa(1a) together with the identification information of the SNa(1a). Then, based on thus received information, the LU1a(121a) is identified as being the LU having the capacity of n block in the RAID group of RAID5 structure.

Herein, the structure management program 4122 may skip step 9002 if the management console 4 already has information about the SNs 1 in the storage system 1000, i.e., information in the LU management table 1111, and the RAID structure of the respective LUs, and if the management console 4 is exercising control over the structure information using its own LU management table 1111'.

11. Construction of Migration Destination LU and Target Registration (Step 9003 of FIG. 9)

Next, the structure management program 4122 of the management console 4 instructs the SNb(1b) to construct an LU0b(120b) having the same capacity as the LU1a(121a) being the migration source to any appropriate RAID group of the newly added SNb(1b). Here, the RAID group considered appropriate may be the one having the same RAID structure as the LU1a(121a).

The structure management program 4122 also instructs the SNb(1b) to set thus newly constructed LU0b(120b) as a target to the portal Tb0 of the physical port and the portal number designated by the SNb(1b), and the Portal group TPGb0.

When the SNb(1b) receives such an instruction, the LU control program 1128 constructs the LU0b(120b) so that a target having the target name of Targ-b0 is created to the portal Tb0 and the portal group TPGb0. Then, as shown in FIG. 5B, the LU management table 1111b is added with Targ-b0 for target name, LU0b for LU, RG0b for RG, 0 for Start RG LBA, and n for LEN.

The communications program 1131 of the SNb(1b) forwards a request to the name server 5 to enter any new target thereto. Upon reception of such a request, the name server 5 registers the target management table 1112b of FIG. 7A to the name management table 5111 as information about the new target. At this point, the target management table 1112b is storing Targ-b0 for target name, SNb for Entity, Tb0 for Portal, and TPGb0 for PortalGroup, and the column of Initiator is vacant, which will be filled in step 9005 that is described later.

The target control program 1123 of the SNb(1b) enters, also to the target management table 1112 in its own memory 101, the same contents as stored in the target management table 1112b in the name management table 5111 of the name server 5, i.e., Targ-b0 for target name, SNb for Entity, Tb0 for Portal, and TPGb0 for PortalGroup (step 9003 of FIG. 9).

In the above manner, by the SNb(1b), the LU0b(120b) is constructed, and the target Targ-b0 is registered. The construction information about the LU0b(120b) and the contents of the target management table 1112 of the target Targ-b0 are forwarded from the SNb(1b) to the structure management program 4122 of the management console 4. In this manner, the information is also registered into the LU management table 1111' and the target management table 1112 of the management console 4. Here, the structure information about the LU0b(120b) includes the RAID structure of the RAID group of the LU0b(120b), and the information of the LU0b (120b) entered to the LU management table of the SNb(1b).

12. Construction of Initiator to Migration Source SN (step 9004 of FIG. 9)

Next, the structure management program 4122 of the management console 4 instructs the SNa(1a) being the migration source for initiator construction to the portal ISNa1 having the designated physical portal and port number, and the portal group IPGSNa1.

When the SNa(1a) receives such an instruction, the initiator control program 1130 responsively creates an initiator having the initiator name of init-SNa1 to the portal ISNa1, and the portal group IPGSNa1. Then, the communications program 1131 asks the name server 5 to enter the resulting initiator thereto.

Upon reception of such a request, the name server 5 registers to the name management table 5111 an initiator management table 1113SNa1 of FIG. 7A as information about thus newly-constructed initiator. The initiator management table 1113SNa1 already has init-SNa1 for initiator name, SNa for Entity, ISNa1 for Portal, and IPGSNa1 for PortalGroup.

Here, the initiator control program 1130 of the SNa(1a) enters, also to the initiator management table 1113 in its own memory 101, the same contents as stored in the initiator management table 1113SNa1 in the name management table 5111 of the name server 5, i.e., init-SNa1 for initiator name, SNa for Entity, ISNa1 for Portal, and IPGNa1 for PortalGroup.

In the above manner, the SNa(1a) is through with initiator construction, and the contents of the initiator management table 1113 of the initiator init-SNa1 are forwarded from the SNa(1a) to the structure management program 4122 of the management console 4 so as to be entered to the initiator management table 1113 of the management console 4.

13. Initiator Registration of Migration Source SN to Target of Migration Destination SN (Step 9005 of FIG. 9)

Next, the structure management program 4122 of the management console 4 issues an instruction towards the SNb(1b) to provide the initiator init-SNa1 of the SNa(1a) with an access permission for the target Targ-b0.

After the SNb(1b) receives such an instruction, as shown in FIG. 5B, the LU control program 1128 enters an initiator of Init-SNa1 to the LU management table 111b as an initiator for access permission to the target Targ-b0, i.e., the LU0b. Further, the target control program 1123 of the SNb(1b) enters the initiator of Init-SNa1 to the target management table 1112 of the target Targ-b0 as an initiator for access permission to the target Targ-b0.

Then, the SNb(1b) asks the name server 5 to enter an initiator of Init-SNa1 to the target management table 1112b as an initiator allowed to access the target Targ-b0. Here, the target management table 1112b is the one registered into the name management table 5111 in step 9003. In this manner, on the name management table 5111 of the name server 5, the relation between the initiator Init-SNa1 and the target Targ-b0(LU0b) is established.

As such, the initiator of the migration source SN is successfully entered to the target of the migration destination SN.

Here, also to the LU management table 1111' in the memory and the target management table 1112 of the target Targ-b0, the structure management program 4122 of the management console 4 enters Init-SNa1 as an initiator allowed to access the target Targ-b0.

14. Execution of Discovery (Step 9006 of FIG. 9)

Through registration of a new pair of initiator and target to the name management table 5111 of the name server 5 in step 9005, the initiator-target relation under the management of the name server 5 shows some change. To deal with such a change, the name management program 5122 of the name server 5 issues a State Change Notification (SCN) to the corresponding initiators, i.e., devices such as the hosts 2 and SNs 1 each including an initiator. The initiators received such an SCN go through a process referred to as discovery. During discovery, the initiators each make an inquiry to the name server 5 whether any change has occurred to the targets accessible thereby, i.e., whether the accessible target(s) have been added or deleted. Upon reception of such an inquiry, the name server 5 responsively makes a search of the name management table 5111 based on the initiator name included in the inquiry. After the search, a response is made about the target management information about any target(s) accessible by the inquiring initiator, i.e., information having been registered in the target management table.

In step 9006, as for the initiators located in the hosts 2, no change is observed for the targets accessible by the corresponding initiator. Thus, even if the host 2 goes through discovery, no target change is discovered, and nothing happens.

On the other hand, after the SNa(1a) receives the SCN, the initiator control program 1130 asks the iSCSI control program 1122 to go through discovery. As a result, the iSCSI control program 1122 is notified, by the name server 5, of a new target Targ-b0 corresponding to the initiator Init-SNa1 of the SNa(1a).

In response thereto, the initiator control program 1130 of the SNa(1a) instructs the TCP/IP program 1121 to establish any new TCP connection between the TCP port of the SNa(1a) and the TCP port of the SNb(1b).

Then, the initiator control program 1130 instructs the iSCSI control program 1122 to go through an iSCSI log-in process to establish a new iSCSI session between the portal ISNa1 and the portal Tb0 of the SNb(1b). In this manner, a communications path using iSCSI is established between the SNa(1a) and the SNb(1b).

Next, the initiator control program 1130 of the SNa(1a) issues an iSCSI Inquiry command to the target Targ-b0 of the SNb(1b) to detect an LU0b. This allows the SNa(1a) to access the LU0b(120b) of the SNb(1b).

15. Execution of LU Migration (Step 9007 of FIG. 9)

The structure management program 4122 of the management console 4 issues an instruction toward the SNa(1a) to migrate data in the LU1a(121a) to the LU0b(120b) of the SNb(1b).

Upon reception of such an instruction, the SNa activates the migration program 1129. Using the TCP session established in step 9006, the migration program 1129 communicates with the migration program 1129 of the SNb(1b) under any specific protocol to check the state of LU0b(120b), and whether the LU1a(121a) and the LU0b(120b) are in the same size or not, for example. Then, the SNb(1b) is notified that migration is now started.

Then, the migration program 1129 of the SNa(1a) issues a command to the target control program 1123. In response thereto, the target control program 1123 reads, to the cache 110, data of the LU1a(121a) by any appropriate size. The migration program 1129 issues another command to the initiator control program 1130. In response, the initiator control program 1130 issues an iSCSI writing command to the LU0b(120b) of the SNb(1b) to write the data read to the cache 110.

After receiving the writing command and the data, the SNb(1b) stores the data into the cache 110, and then writes the data thus stored in the cache 110 to the LU0b(120b). By repeating such a procedure, the data in the LU1a(121a) is completely copied into the LU0b(120b) ((1) of FIG. 8).

Note here that during such a copying process, the initiator init-b0 of the Host b(2b) keeps accessing the LU1a(121a) of the SNa(1a), i.e., target Targ-a1.

During the copying process, if the SNa(1a) receives from the Host b(2b) the writing command and the writing data to the LU1a(121a), the migration program 1129 of the SNa(1a) writes the writing data to the LU1a(121a), and also forwards the writing data to the LU0b(120b) of the SNb(1b). Then, the SNa(1a) reports the Host b(2b) that the writing process is through, i.e., periodical data writing to the LU0b(120b).

As an alternative manner, storage regions storing different data between the migration source LU1a(121a) and the migration destination LU0b(120b) may be managed by the SNa(1a) using a differential bit map. To be specific, the SNa(1a) makes a registration of a differential bit for any storage region on the differential bit map. Here, the storage region is the one not yet through with data copying from the LU1a(121a) to the LU0b(120b), and the one through with copying but thereafter showing no data coincidence between the LU1a(121a) and the LU0b(120b) due to data update in the LU1a(121a). This update is caused by reception of writing data addressed to the LU1a(121a) from the Host b(2b). Based on the differential bit map, the SNa(1a) may write the data stored in the LU1a(121a) to the LU0b(120b) after the data copying process is through only for the storage region having been registered with the differential bit. In this manner, the writing data received from the Host b(2b) during the copying process can be copied to the LU0b(120b) being the migration destination.

As such, by the time when the copying process is through, the data in the LU1a(121a) and the data in the LU0b(120b) are to be the same ((1) of FIG. 8). This is the end of data copying.

16. Copying of Target (step 9008 of FIG. 9)

Once the copying process is through, the migration program 1129 of the SNa(1a) instructs the LU control program 1128 to refer to the LU management table 1111 so that the target of the LU1a(121a), i.e., Targ-a1, and the initiator thereof, i.e., Init-b0, are acquired from the LU management table 1111a of FIG. 5A. Then, the migration program 1129 of the SNa(1a) uses any new or existing TCP connection between the SNa(1a) and the SNb(1b), e.g., the TCP connection established in step 9006, to transfer information about thus acquired initiators and targets of the LU1a(121a).

Then, the migration program 1129 of the SNb(1b) issues an instruction to the LU management program 1128. The LU management program 1128 responsively enters, to the LU management table 1111 of the LU0b(120b) of FIG. 5C, Targ-a1 to Target, and Init-b0 to Initiator. More in detail, the LU management program 1128 enters the target and initiator of the LU1a received from the SNa(1a) to the LU management table of the LU0b(120b) to change the target and initiator of the LU0b(120b) to those of the LU1a(121a). In this manner, the data and the access information, i.e., target and initiator, of the LU1a(121a) of the SNa(1a) are taken over by the LU0b(120b) of the SNb(1b), and this is the end of LU migration.

After completion of LU migration as such, a completion notice is forwarded by the SNb(1b) to the SNa(1a), and by the SNa(1a) to the structure management program 4122 of the management console 4. Upon reception of the completion notice, the management console 4 enters, also the its own LU management table 1111', Targ-a1 to the Target of the LU0*b* (120*b*), and Init-b0 to the Initiator thereof.

As such, the LU migration process is completed.

17. Deletion of Initiator being Migration Source (Step 9009 of FIG. 9)

After receiving the completion notice of LU migration, the structure management program 4122 of the management console 4 instructs the SNa(1*a*) to go through initiator deletion. The SNa(1*a*) responsively instructs the initiator control program 1130 to cut off the connection between the initiator Init-SNa1 and the target Targ-b0 used for data migration, and delete the initiator Init-SNa1. The initiator control program 1130 instructs the iSCSI control program 1122 to cut off the session between the initiator Init-SNa1 and the target Targ-b0. Also, the initiator control program 1130 deletes the initiator management table 1113 about the initiator Init-SNa1 from the memory 101, and instructs the name server 5 to delete the initiator management table 1113SNa1 about the initiator Init-SNa1.

The name server 5 instructed as such accordingly deletes the initiator management table 1113SNa1 having been registered in the name management table 5111.

As such, the initiator Init-SNa1 is deleted by following, in reverse, steps 9004 and 9005 of initiator registration.

The structure management program 4122 of the management console 4 also deletes the initiator management table 1113 of the initiator Init-SNa1 stored in its own memory.

18. Deletion of Migration Source Target (Step 9010 of FIG. 9)

The structure management program 4122 of the management console 4 instructs the SNa(1*a*) to cut off the session established between the target Targ-a1 set to the LU1*a*(121*a*) being the migration source and the initiator Init-b0 located in the Host b(2*b*), and to delete the target Targ-a1 set to the migration source LU1*a*(121*a*).

The LU control program 1128 of the SNa(1*a*) instructed as such then responsively issues an instruction toward the iSCSI control program 1122 to cut off the session between the initiator Init-b0 of the Host-b(2*b*) and the target Targ-a1 of the SNa(1*a*), and the iSCSI program 1122 responsively executes the instruction. The LU control program 1128 deletes, from the LU management table 1111*a* of FIG. 5A, any entry relating to the LU1*a*(121*a*). As a result, the LU management table in the memory 101 of the SNa(1*a*) looks like an LU management table 1111*a* of FIG. 5D. Further, the SNa(1*a*) deletes the entry of Targ-a1 from the target management table 1112 in the memory 101.

The communications program 1131 of the SNa(1*a*) instructs the name server 5 to delete, also from the name management table 5111, any entry relating to the target Targ-a1 in the target management table 1112. The name server 5 then responsively goes through deletion as instructed ((2) of FIG. 8).

Here, the structure management program 4122 of the management console 4 deletes any entry relating to the LU1*a* (121*a*) from the LU management table 1111' in its own memory, and also deletes the target management table relating to the target Targ-a1.

19. Change of Migration Destination Target (Step 9011 of FIG. 9)

The structure management program 4122 of the management console 4 then instructs the SNb(1*b*) to enter, to the name server 5, the target Targ-a1 having been set to the migration destination LU0*b*(120*b*) in step 9008.

The communications program 1131 of the SNb(1*b*) instructed as such notifies, in a similar manner to step 9003, the name server 5 to change the target name and the initiator name in the target management table 1112*b* of the name management table 5111 into target: Targ-a1, and initiator: Init-b0 ((3) of FIG. 8). The name management program 5122 of the name server 5 changes the name management table 5111 as notified. The resulting name management table 5111 looks like the one shown in FIG. 7B.

The target control program 1123 of the SNb(1*b*) also applies the same change to be done by the name server 5. That is, the target management table 1113 stored in the memory 101 of the SNb(1*b*) is changed similarly. Specifically, in the target management table 1113, target is changed from Targ-b0 to Targ-a1, and initiator is changed from Init-SNa1 to Init-b0 so as to include Target: Targ-a1, Initiator: Init-b0, Entity: SNb, Portal: Tb0, and PortalVr: TPGb0.

The structure management program 4122 of the management console 4 stores, into its own memory, a new target table 1113 of the target Targ-a1, which is including Target: Targ-a1, Initiator: Init-b0, Entity: SNb, Portal: Tb0, and PortalVr: TPGb0.

20. Execution of Discovery (Step 9012 of FIG. 9)

In consideration of the initiator-target relation changed in step 9011, the name management program 5122 of the name server 5 issues a State Change Notification (SCN) to the initiators ((4) of FIG. 8). In response to such an SCN, the initiators each execute discovery to inquire the name server 5 whether any change has occurred to their own accessible targets.

After the Host b(2*b*) receives the SCN, and after an inquiry is issued to the name server 5 through execution of discovery ((5) of FIG. 8), the Host b(2*b*) is notified from the name server 5 of management information about the target Targ-a1 relating to the initiator Init-b0. Here, the management information is the one registered in the target management table 1112*b* of the target Targ-a1. Accordingly, this tells the Host b(2*b*) that the target Targ-a1 relating to the initiator Init-b0 has moved to the SNb(1*b*).

Thus, a TCP/IP program (not shown) of the Host b(2*b*) establishes a new TCP connection between the TCP port of the Host b(2*b*) and the TCP port of the SNb(1*b*).

Then, the iSCSI control program (not shown) of the Host b(2*b*) goes through an iSCSI log-in process to the SNb(1*b*) to establish a new iSCSI session between the portal Ib0 of the Host b(2*b*) and the portal Tb0 of the SNb(1*b*). As a result, a communications path using iSCSI is established between the Host b(2*b*) and the SNb(1*b*), and thus path switching is completed ((6) of FIG. 8). Accordingly, hereinafter, if the initiator Init-b0 of the Host b(2*b*) forwards a writing command and writing data to the target Targ-a1, the SNb(1*b*) including the target Targ-a1 receives the command and data. The writing data is thus stored in the LU0*b*(120*b*) including the target Targ-a1.

In the present embodiment, when data stored in the LU1*a* (121*a*) of the SNa(1*a*) is migrated into the LU0*b*(120*b*) of the SNb(1*b*) being the migration destination, the LU0*b*(120*b*) takes over not only the data but also access information. Here, the access information includes target names of targets set to the LU1*a*(121*a*) being the migration source, and initiator names of initiators allowed to access the targets. Therefore, the Host b(2*b*) having gone through discovery acknowledges that the target Targ-a1 corresponding to its initiator init-b0 is changed in location from SNa(1*a*) to SNb(1*b*). That is, the Host b(2*b*) does not acknowledge that the target has been changed. This is because the target name Targ-a1 corresponding to the initiator Init-b0 shows no change even after data migration. Thus, in the present embodiment, as long as the target name Targ-a1 is not changed, even if the location of the target is changed, the data stored in the LU corresponding to the target is guaranteed as not having been changed. That is, the Host 2 can access the same data as long as accessing the target having the same target name.

If the session is temporarily cut off In step 9010 between the initiator Init-b0 of the Host b(2b) and the target Targ-a1 of the SNa(1a), the session from the Host b(2b) is temporarily cut off until a session is established in step 9012 between the initiator Init-b0 of the Host b(2b) and the target Targ-a1 of the SNb(1b). However, the iSCSI command process generally has a retry mechanism, and thus if no command is received by the target, the Host b(2b) continuously retries for duration of 10 seconds. During this duration, if an SCN is issued, if discovery is completed, and if a new session is established between the initiator Init-b0 of the Host b(2b) and the target Targ-a1 of the SNb(1b), the application executed by the Host b(2b) does not acknowledge such a momentarily cut-off. Thus, without interrupting the application of the Host 2, data migration can be performed from any specific SN 1 to another SN 1. In such a manner, without interrupting the application of the Host 2, the SN 1 can be additionally provided, and the load can be distributed among a plurality of SNs 1 connected to the switch 3.

What is better, the programs applying control over layers lower to the operating system of the Host b(2b) such as the TCP/IP program and the iSCSI control program acknowledge that the location of the target Targ-a1 is changed due to data migration as above. The issue here is that, the TCP/IP program and the iSCSI control program establish a TCP connection and an iSCSI session. Thus, the operating system of the Host b(2b) does not necessarily have to acknowledge the location of the target as long as the LU is acknowledged as a logical volume. In view thereof, the operating system of the Host b(2b) and the application program operating thereon do not acknowledge that data migration has been executed. That is, data migration can be favorably performed without causing the operating system of the Host 2 and the application program to notice data migration among the SNs 1.

21. Method for Target Generation

Next, the method for target generation is described in more detail. The target name has to be a unique identifier. To retain such a uniqueness of the target name, an exemplary method is described below.

Assuming here is that a target name is a character string of an appropriate length. An exemplary character string is a combination of various codes and numbers, e.g., a code identifying a manufacturing company, a code identifying a specific organization in the manufacturing company, a code for identifying a storage system, a code for identifying the type of a storage node, a code of a revision of the storage node, a serial number of the storage node, and a sequential number assigned to a target in the storage node. With such a structure, even if any new target is generated in a certain storage node, the newly-generated target can be provided with a target name unique thereto only by incrementing the sequential number.

In the present embodiment above, when data in the LU 12Xx is migrated from a specific SN 1 to another, the LU 12Xx being the migration destination takes over the target name of the LU 12Xx being the migration source. As such, even if the target name is passed between the SNs, the target name remains unique. Thus, the target name can be continuously used by the SN 1 being the migration destination after taken over.

Herein, it is preferable to use nonvolatile memory such as Flash memory for the CTL 10 of the storage node 1 for storing the maximum value of the sequential number used at the time providing a target name to the target in the SN 1. Here, the maximum value of the sequential number is the maximum value of the sequential number already in use. With such a structure, even if power failure or error occurs to the SN 1, the Flash memory has stored the sequential number. Thus, after recovery, the SN 1 can keep generating a series of unique numbers to any new targets set in the SN 1 only by incrementing thus stored sequential number.

Note here that, shown in the above embodiment is the example of taking over a target name provided to any specific LU 12Xx in response to data migration from the LU 12Xx to another. Alternatively, at the time of data migration, the LU 12Xx being the migration destination may be provided with any new target name. If this is the case, to the LU 12Xx being the migration destination, a target name unique to the destination SN 1 can be set using a sequential number of the SN 1, the serial number of the SN 1, a revision code of the SN 1, and others. If any new target name is set to the LU 12Xx being the destination, the LU control program 1128 of the SNb(1b) enters in step 9008 of FIG. 9 thus newly-set target name to the LU management table 1111. Also in step 9011, the SNb(1b) is required to enter the newly-set target name to the name server 5. As a result, at the time of discovery of step 9012, the initiator Init-b0 of the Host b(2b) detects the new target, enabling the initiator to construct a session with the target.

22. Setting of Target

In the above embodiment, shown is the example that the SN 1 generates target or initiator for registration into the name server 5. Instead of the SNs 1 generating the target and initiator as such, the name server 5 may generate those. If this is the case, the SNs 1 issue an instruction for the name server 5 to enter the target and initiator, and in return, the name server 5 forwards the target and initiator back to the corresponding SN 1. Then, the SN 1 makes an entry of the target and initiator received by the name server 5.

23. Display Screen of Management Console (FIG. 15)

FIG. 15 shows an exemplary display screen of the management console 4.

Figure 15D:
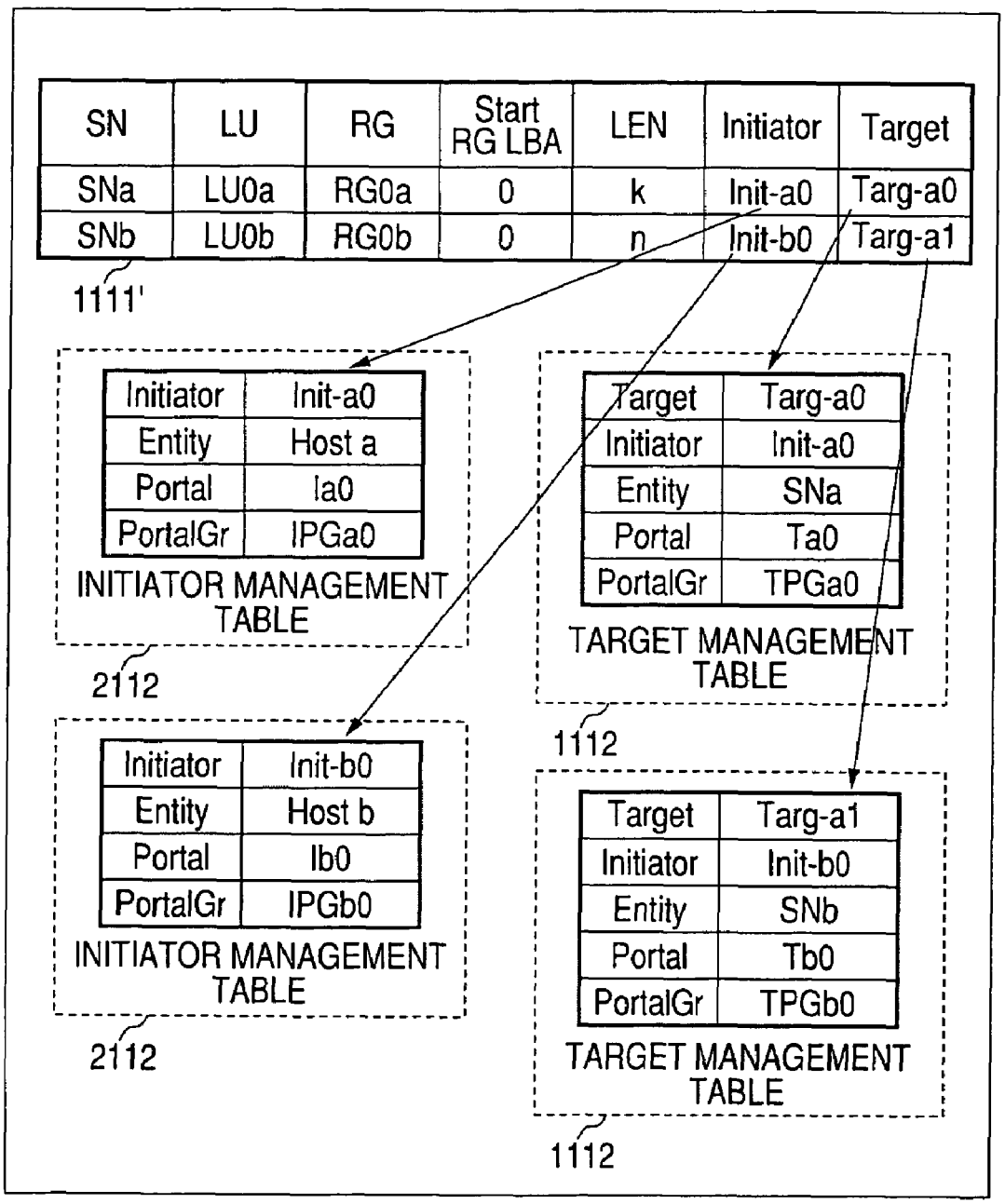
FIG. 15D is a diagram showing still another exemplary display screen of the management console 4 having displayed thereon the interrelation among the LU, the target, and the initiator after data migration.

The structure management program 4122 of the management console 4 displays on its screen the LU management table 1111', the target management table 1112, and the initiator management table 2112 or 1113, all of which are stored in the memory of the management console 4. FIGS. 15C and 15D both show such a display screen. Specifically, FIG. 15C shows an exemplary display screen before data migration, and FIG. 15D shows an exemplary display screen after data migration.

The structure management program 4112 displays on its screen the LU management table 1111', the target management table 1112, the initiator management table 2112 or 1113, and pointers therefor. Thus, a manager using the management consoler 4 can easily grasp the relationship between the LU and the initiator or the target from the information displayed on the display screen.

The structure management program 4112 also displays the system structure on its screen based on the LU management table 1111', the target management table 1112, and the initiator management table 2112 or 1113 stored in the memory of the management console 4. FIGS. 15A and 15B both show such a display screen. Specifically, FIG. 15A shows the system structure before data migration, and FIG. 15B shows the system structure after data migration.

FIGS. 15A and 15B both show a display screen in a case where the LU-b(120b) being the migration destination takes over the target name set to the LU1a(121a) being the migration source. Once data migration is performed, the target name is taken over from the migration source LU to the migration destination LU, causing the target Targ-a1 to be changed in location on the display screen before and after data migration. However, the combination of initiator and target remains the same, i.e., pair of init-a0 and Targ-a0, and pair of init-b0 and Targ-a1. As such, even if data migration is performed between the SNs 1, no change occurs to the combination of initiator and target. Accordingly, this eases the management of initiators and targets for the manager in the system using the management console 4.

Note here that the information displayed on the display screen is updated every time the LU management table 1111', the target management table 1112, or the initiator management table 2112 or 1113 is updated. Such update is performed responding to an instruction coming from the structure management program to the SNs 1 as described by referring to FIG. 9, or a notification received by the structure management program from the SNs 1 about any change applied to the system structure.

Second Embodiment

Figure 10:
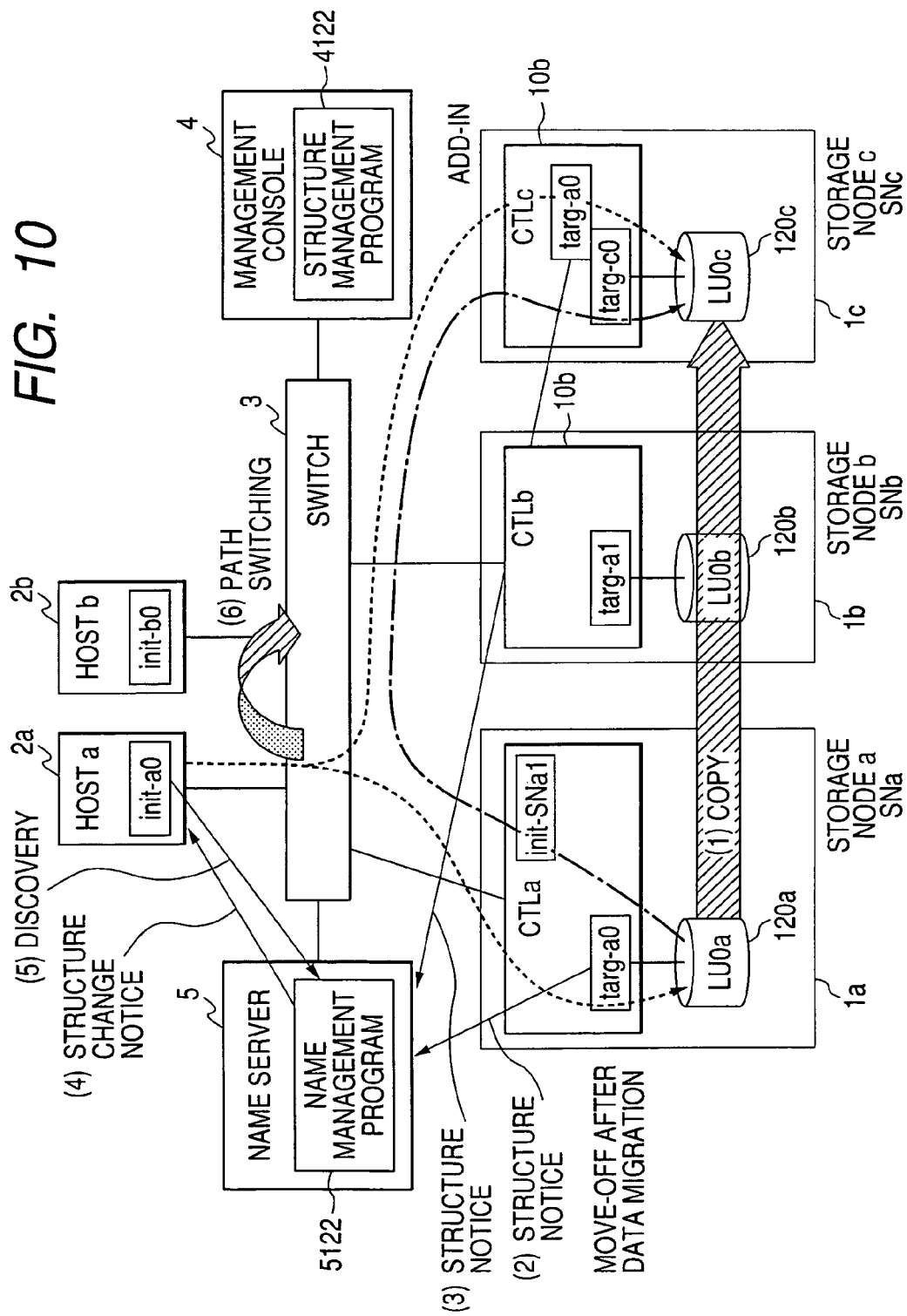
FIG. 10 is a diagram of an exemplary process of, through addition of a new SN to a network in a second embodiment of the present invention, migrating data from an LU of any existing SN to an LU of the newly-added SN.

Described next is a second embodiment. In the first embodiment, exemplified is the case of migrating data stored in the LU1a(121a) of the SNa(1a) to the SNb(1b), which is newly added. In the second embodiment, as shown in FIG. 10, an SNc(1c) is additionally added to the switch 3, and the LU0a(120a) left in the SNa(1a) is migrated to thus newly-added SNc(1c).

The LU0a(120a) with the target Targ-a0 in the SNa(1a) is connected with the initiator Init-a0 of the Host a(2a). Thus, in the second embodiment, the initiator-target relationship is different from that in the first embodiment, and the discovery and other processes are to be executed by the Host a(2a). The procedure, however, remains the same that the data in the LU0a(120a) of the SNa(1a) is migrated to the LU0c(120c) of the SNc(1c), the LU0c(120c) being the migration destination takes over the target Targ-a0 of the LU0a(120a), and the access path is changed between the initiator Init-a0 and the target Targ-a0.

After completion of such data migration, the SNa(1a) has no LU 12Xx to be accessed by the Hosts 2. Accordingly, the SNa(1a) can be removed from the switch 3, leading to reduction of the SN.

Utilizing the process as such, the SNa(1a) can be replaced to the SNc(1c) without interrupting access from the Hosts 2. More in detail, during the process of changing the access path from the Hosts 2 by migrating the data stored in the LU0a (120a) of the SNa (1a) to the newly-added SNc(1c), the Hosts 2 can be accessible to the data stored in these both LUs. Thus, even if data storage is required for a longer time than the SN lasts, i.e., if data lasts longer than the SN, due to law, for example, data remains available through exchange of any out-of-life storage node 1 instead of replacing the storage system 1000 in its entirety.

According to the present embodiment, data storage can be achieved over a long period of time as long as data lasts while suppressing cost increase required for system replacement without temporary data saving, and without interrupting data access.

Third Embodiment

Figure 11:
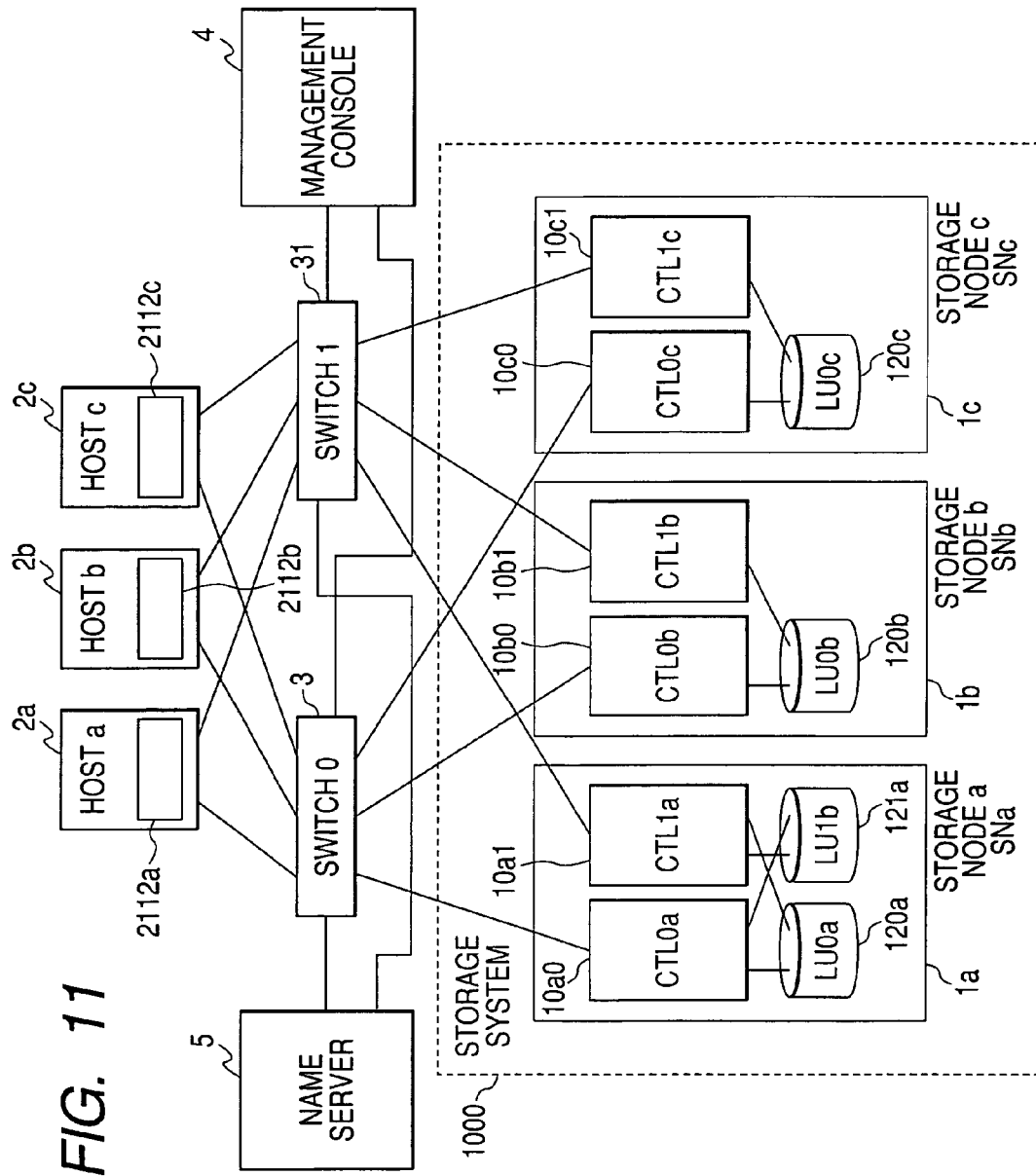
FIG. 11 is a diagram showing an exemplary system structure in a third embodiment of the present invention.

FIG. 11 is a diagram showing another exemplary system structure. A third embodiment has differences from the first and second embodiments that the storage node 1 has two controllers of CTL0 and CTL1, and LU120x are so structured as to be accessible by these two controllers 10. Moreover, the network 30 is provided with two switches of 0(3) and 1(31), and the Hosts 2 and the storage nodes 1 are each connected to these two switches. In the present embodiment, the wiring between the LU120x and CTL10, the wiring between the SN 1 and the switch, and the wiring between the Hosts 2 and the switch are all doubly provided. In such a manner, the resulting storage system can be high in reliability. The method for replacing the storage node 1 and the load distribution through LU migration is the same as that in the first and second embodiments.

Fourth Embodiment

Figure 12:
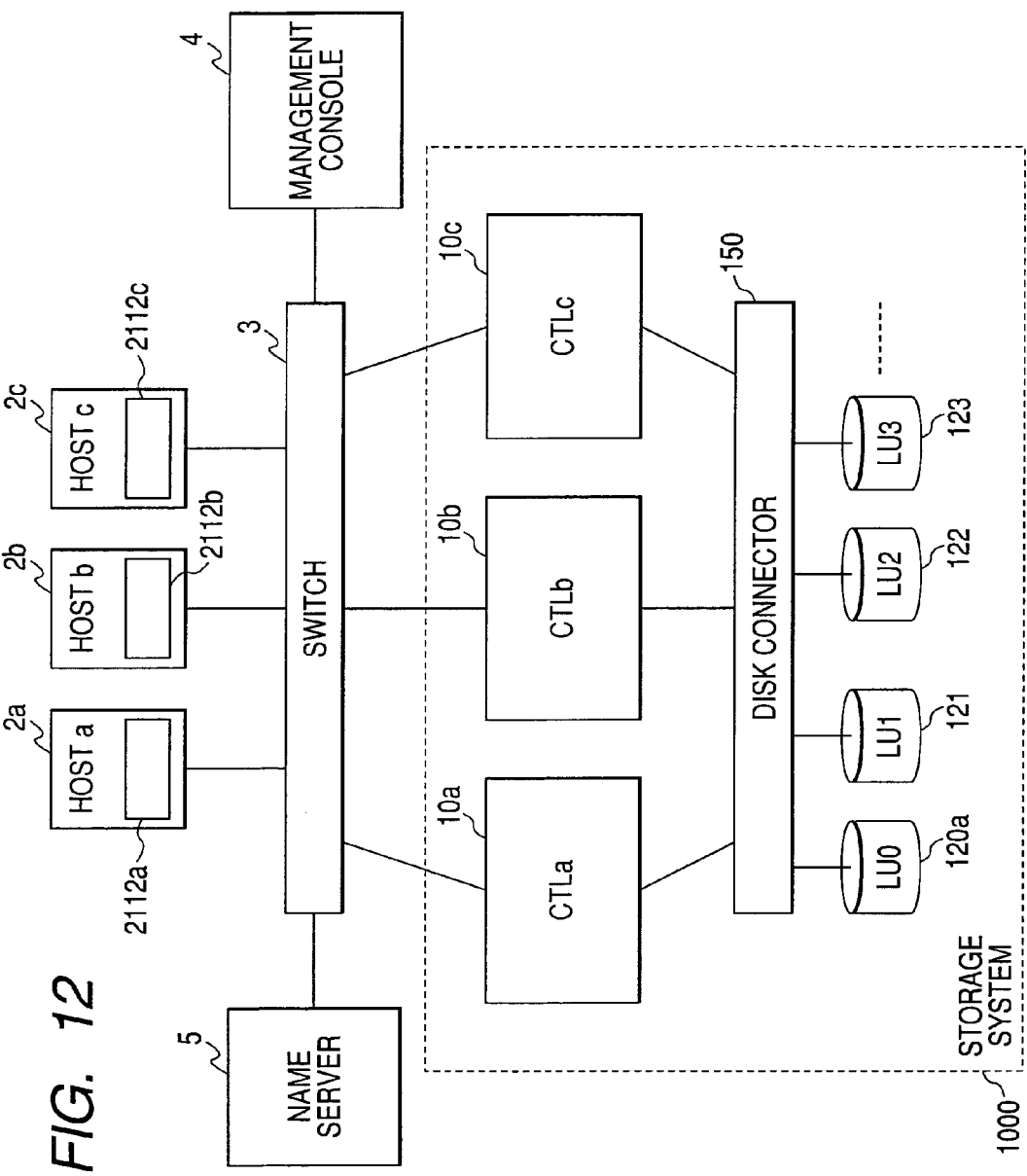
FIG. 12 is a diagram showing an exemplary system structure in a fourth embodiment of the present invention.

FIG. 12 is a diagram showing another exemplary system structure. In the present embodiment, the storage system 1000 is provided with a plurality of CTL 10, and these CTL 10 share the LU 12Xx via a disk connector 150. Add-in and removal of the SNs in the first and second embodiments correspond to add-in and removal of the CTL 10. As an example, a CTLc(10c) may be added as a replacement for the out-of-life CTLa(10a), and after thus newly-added CTLc (10c) takes over the LU 12Xx that was under the control of the CTLa(10a), the CTLa(10a) is removed. At this time, the procedure taken for taking over the LU management information in the LU management table 1111 of the CTLa(10a), for taking over the target in the target management table 1112 of the CTLa(10a), and for changing the access path is executed in the same manner as that in the first and second embodiments. Herein, the CTLs 10 are each connected to the corresponding LU 12Xx via the disk connector 150, thus there is no need for data migration from the LU 12Xx. For example, to take over the LU0(120a) that was under the control of the CTLa(10a) to the CTLc(10c), the CTLc(10c) is allowed to access the LU0(120a) through the disk connector 150. Here, exclusive control is to be exercised, and thus the same procedure in the first and second embodiments are to be executed for the CTLc(10c) to take over the LU management information about the LU0(120a) from the CTLa(10a), take over target information set to the LU(120a), i.e., contents of the target management table 1112 about the target, and others. The procedure can skip the data copying process. In this manner, cost efficiency and system change can be swiftly done to a greater degree.

Fifth Embodiment

Figure 13:
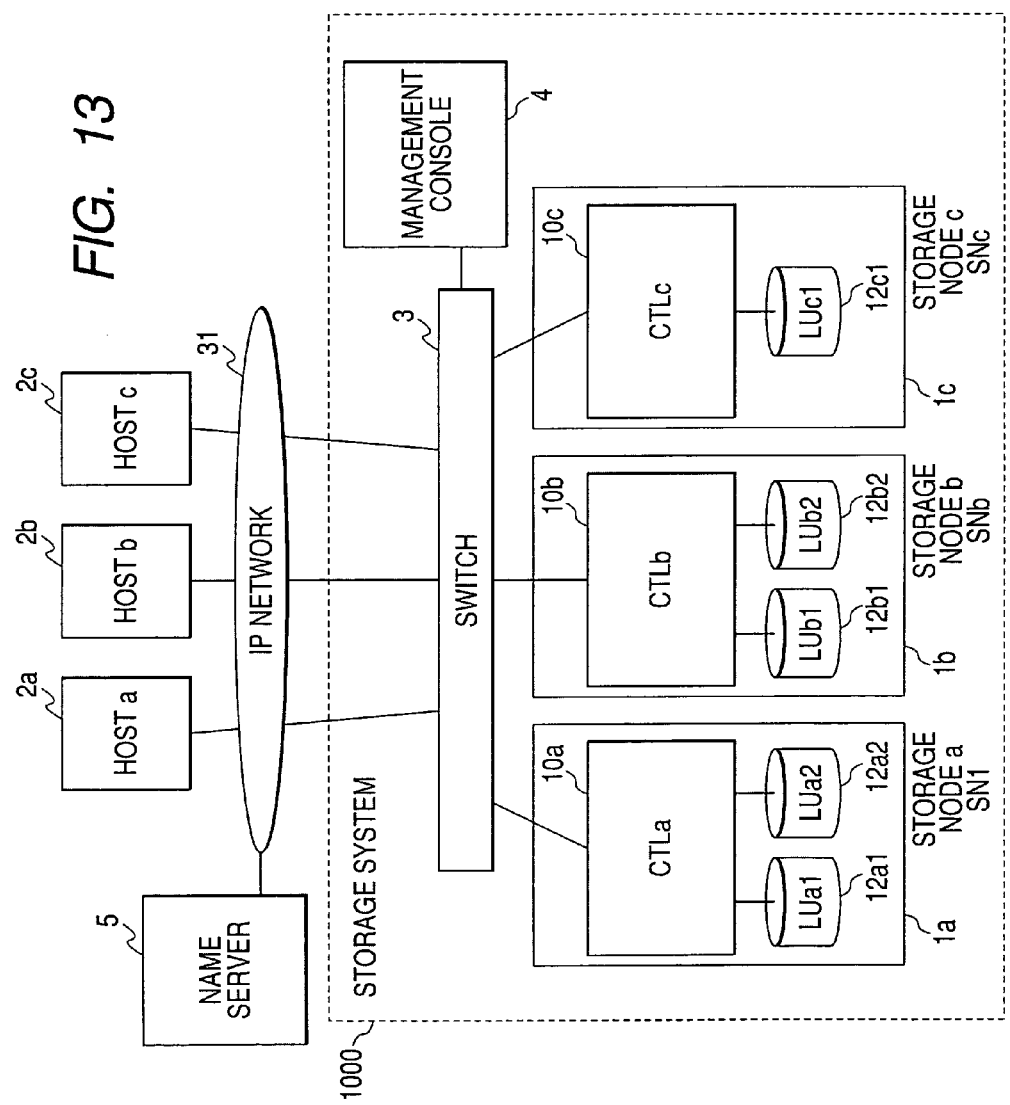
FIG. 13 is a diagram showing an exemplary system structure in a fifth embodiment of the present invention.

FIG. 13 is a diagram showing still another exemplary system structure. In the present embodiment, the switch 3 and the management console 4 are included in the storage system 1000. The switch 3, the management console 4, and the SN 1 are all components of the storage system 1000, and the user is provided those as a set. As a preferred embodiment, these components are so structured as a unit, providing the user with better manageability.

Sixth Embodiment

Figure 14:
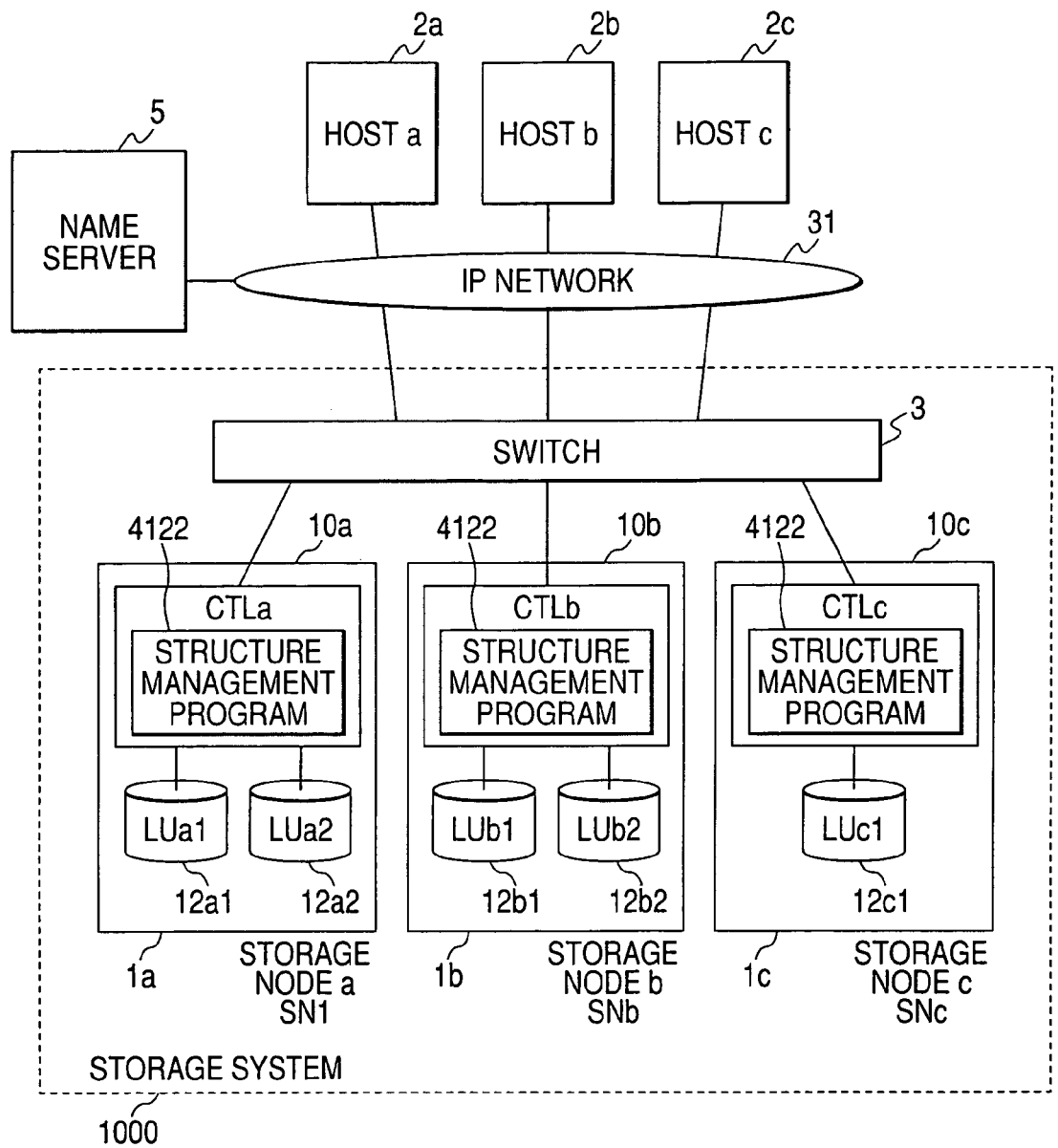
FIG. 14 is a diagram showing an exemplary system structure in a sixth embodiment of the present invention.

FIG. 14 is a diagram showing still another exemplary system structure. In the present embodiment, the management console 4 of FIG. 13 is not provided, and the structure management program 4122 in the management console 4 of the above embodiments is provided to the CTL(10) of the respective storage nodes. Whenever any structure change occurs, the structure management program 4122 communicates with other structure management programs 4122 to see what structure change has occurred. Further, prior to structure change, exclusive control is applied to any needed resources. Such a structure eliminates the management console 4, leading to the storage system with better cost efficiency.

In the above embodiments, the access path from the host is changed after LU data migration is performed. This change may be done in the following order:

1. Migrate LU information (target information and initiator access permission information included)
2. Switching of access path from host to migration destination (migration of target name, and registration change of name server included)
3. LU data migration If this is the case, data access during migration can be handled in the same manner as the background technology. Also in this case, the same effects as the other embodiments can be successfully achieved. Specifically, LU migration can be performed without causing the operating system and the applications of the hosts to notice, which is the characteristics of the present invention.

Seventh Embodiment

Figure 16:
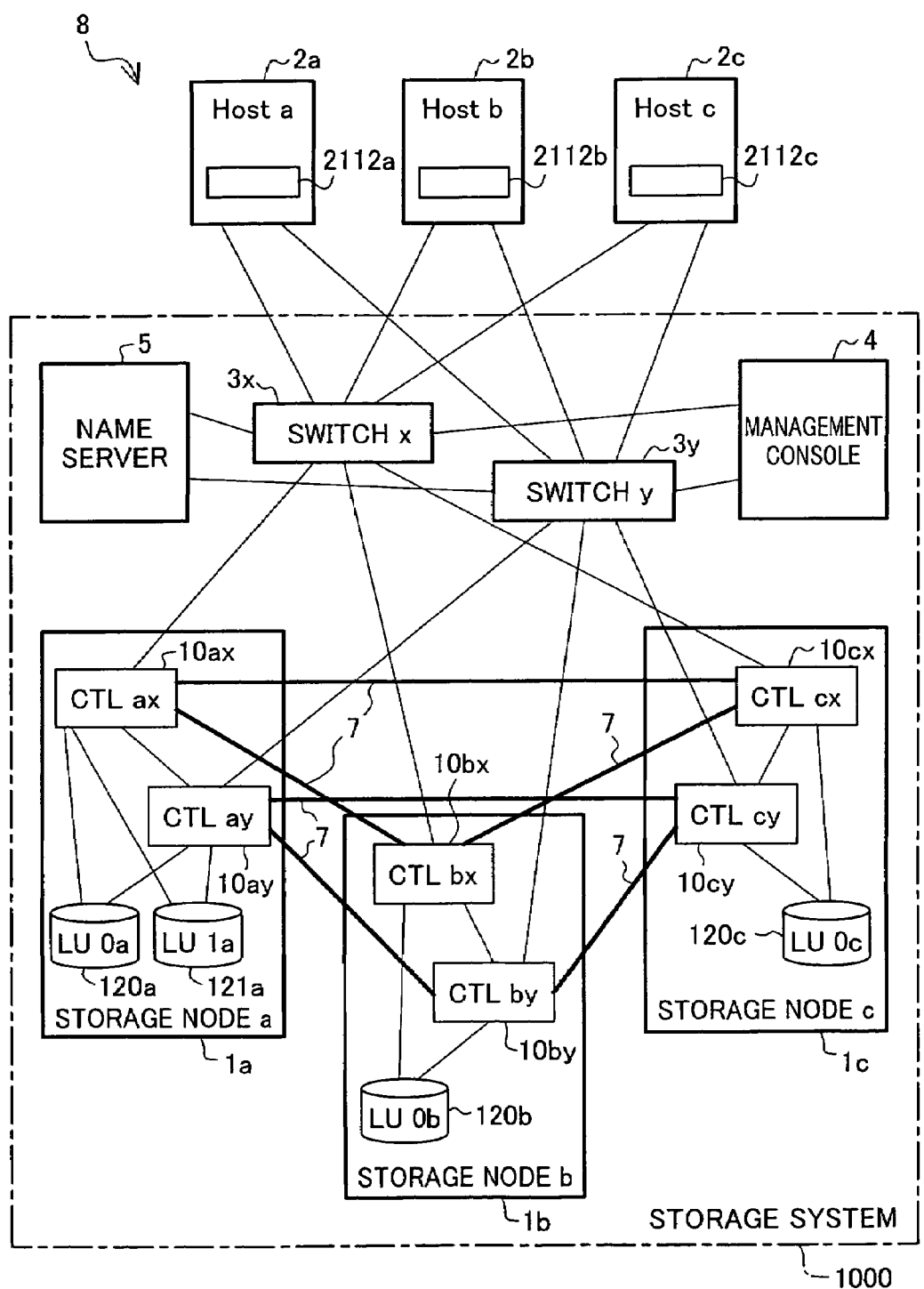
FIG. 16 is a schematic diagram showing a structure of a computer system which includes a storage system as a seventh embodiment of the present invention.

Next, seventh embodiment of the present invention will be described in the following sequence.
(1) System Structure:
(2) Management Screen:
(3) Storage Node Addition and LU Migration Process:
(4) Setting of the Storage System Using the Management Screen:
(5) Variation of Seventh Embodiment:

(1) System Structure:
FIG. 16 is a schematic diagram showing a structure of a computer system which includes a storage system as a seventh embodiment of the present invention. A computer system 8 comprises three host computers 2 (hosts 2) and a storage system 1000 connected with the host computers 2. The difference between the computer system 8 in this embodiment and the computer system in the first embodiment shown in FIG. 1 is in the structure of the storage system 1000. In this figure, an "In Band" communication scheme is adopted with which the management console 4 communicates with each CTL 10 through a network via the switch 3, but each CTL 10 may have a management interface to connect to a management network (not illustrated) provided exclusively for management and an "Out of Band" communication scheme may be adopted with which the management console 4 connects to the management interface of each CTL 10 via the management network for communication.

The storage system 1000 in this embodiment includes three storage nodes 1 (SN 1), two switches 3, a management console 4, and a name server 5. This point is the difference from the computer system in the first embodiment for which the switches 3, the management console 4, and the name server 5 are independent from the storage system 1000. In this embodiment, it is also possible to have the switches 3, the management console 4, and the name server 5 be structural components which are independent from the storage system 1000 as is the case with the first embodiment.

The same as with the first embodiment shown in FIG. 1, the storage node 1 in this embodiment includes disks as the storage device for storing data, and controllers 10 (CTLs 10) as the control device for controlling input and output of data for the storage device according to access requests from the host 2. As described in FIG. 4, the disks form a logical unit 12 (LU 12) as a logical storage area accessed from the host 2.

As with the first embodiment, subscripts a, b, and c are added to the reference characters representing the hosts 2, the storage nodes 1 and their internal components. The meaning of subscripts x and y added to the reference characters representing the CTLs 10 and the switches 3 will be described later.

The difference from the storage node 1 in the first embodiment is that the three storage nodes 1 in this embodiment each has two CTLs 10 so that there is redundancy in the CTLs 10. Each CTL 10 is set to belong within one of two CTL affiliations. Here, "affiliation" means a group of CTLs 10, and two affiliations are called "x affiliation" and "y affiliation", or "x series" and "y series." It is also possible to set each CTL 10 to belong to any of three or more affiliations or series.

The CTL 10 series are set so that two CTLs 10 within one storage node 1 belong to different series. For example, one CTL 10a within the storage node 1a belongs to the x series, and the other belongs to the y series. The two CTLs 10 within the storage node 1b and the storage node 1c as well are allocated to x series and y series in the same manner. With the specification and the drawings, a subscript of "x" is added to the reference characters and drawing displays representing the CTL 10 belonging to the x series, and the subscript "y" is added to the reference characters and drawing displays representing the CTL 10 belonging to the y series. For example, the CTL 10 belonging to the x series within the storage node 1a is represented as "CTL 10ax (CTL ax)."

The two CTLs 10 within one storage node 1 are mutually connected. Also, the two CTLs 10 within one storage node 1 are each connected to all the LUs 12 within that storage node 1. For example, the two CTLs 10a (CTL 10ax and CTL 10ay) within the storage node 1a are each connected to the LU 120a and the LU 121a. The detailed structure of the storage node 1 will be described later.

The switches 3 function as an interface for connecting the storage system 1000 and the hosts 2. Also, the switches 3 mutually connect each structural component within the storage system 1000, that is, the storage node 1, the management console 4, and the name server 5. Here, the two switches 3 within the storage system 1000 in this embodiment are respectively connected to the two CTLs 10 included in each storage node 1. That is, one switch 3 (represented as "switch 3x(switch x)") is connected to CTLs 10 belonging to the x series included in each storage node 1, and the other switch 3 (represented as "switch 3y (switch y)") is connected to another CTLs 10 belonging to the y series included in each storage node 1. The two switches 3 are also connected to the management console 4 and the name server 5.

The structure of the management console 4 and the name server 5 is the same as in the first embodiment.

The storage system 1000 in this embodiment includes inter-node CTL coupling units 7. The inter-node CTL coupling units 7 connect CTLs 10 belonging to the same CTL series in plural storage nodes 1. That is, with the inter-node CTL coupling units 7, the three CTLs 10 (CTL 10ax, CTL 10bx, and CTL 10cx) belonging to the x series included in each storage node 1 are mutually connected. Similarly, with the inter-node CTL coupling units 7, the three CTLs 10 (CTL 10ay, CTL 10by, and CTL 10cy) belonging to the y series included in each storage node 1 are mutually connected. Then, these inter-node CTL coupling units 7 make a connection between CTLs 10 without going via the switches 3, that is, without going through an access path between the CTL 10 and the host 2. Details of the inter-node CTL coupling unit 7 will be described later.

Figure 17:
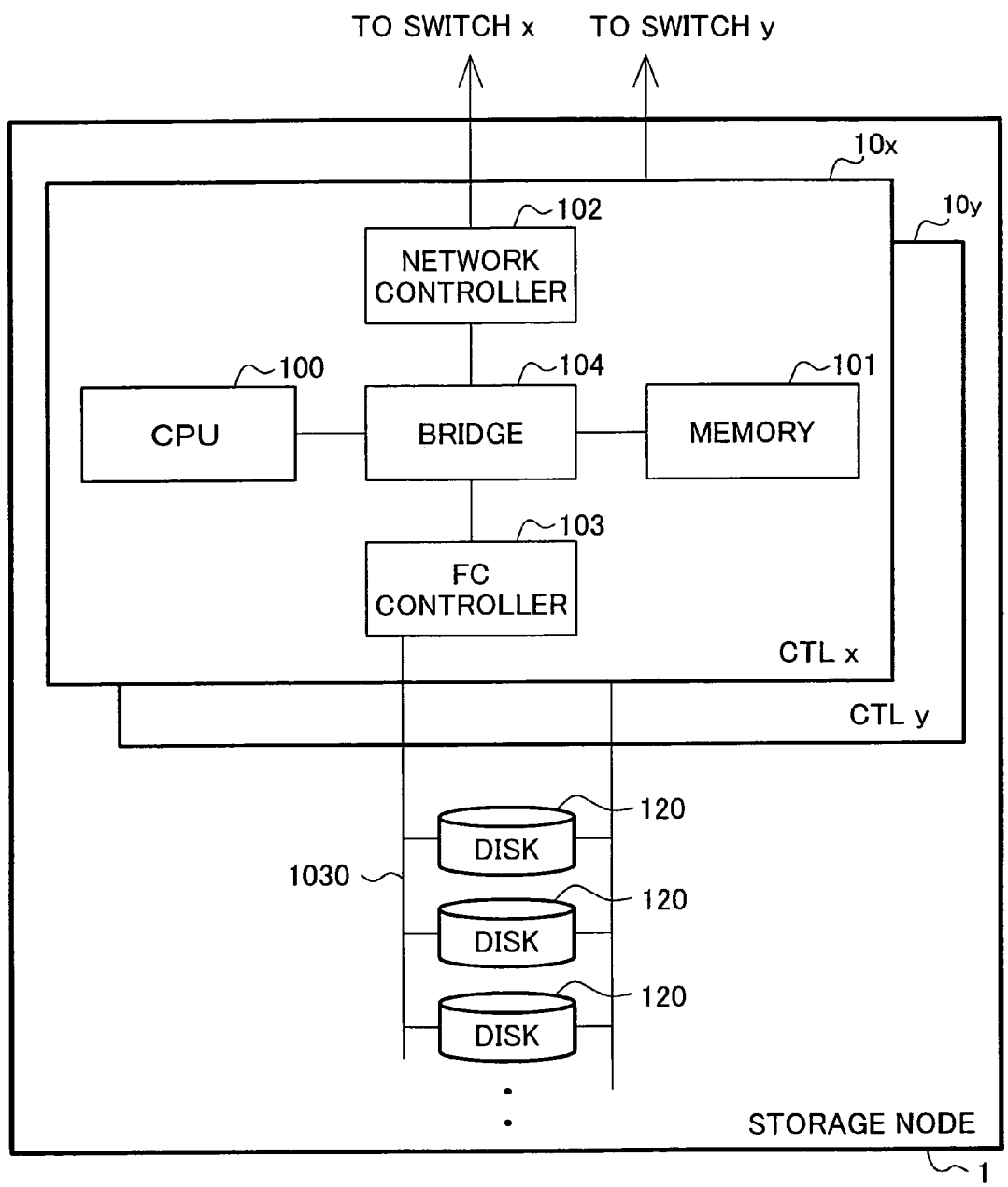
FIG. 17 is a schematic diagram showing a structure of the storage node in the seventh embodiment.

FIG. 17 is a schematic diagram showing a structure of the storage node in the seventh embodiment. The difference from the storage node 1 in the first embodiment shown in FIG. 2 is that the storage node 1 in the seventh embodiment includes two CTLs 10, and the other structure is the same as that of the storage node 1 of the first embodiment. The two CTLs 10 (CTL 10x and CTL 1y) in the seventh embodiment share a plurality of disks 120. As shown in FIG. 16, the two CTLs 10 within one storage node 1 are mutually connected, and one CTL 10 within the storage node 1 is connected via the inter-node CTL coupling unit 7 to another CTL 10 of another storage node 1. There is no illustration of these connections in FIG. 17, and the details will be described below with reference to FIG. 18.

Figure 18:
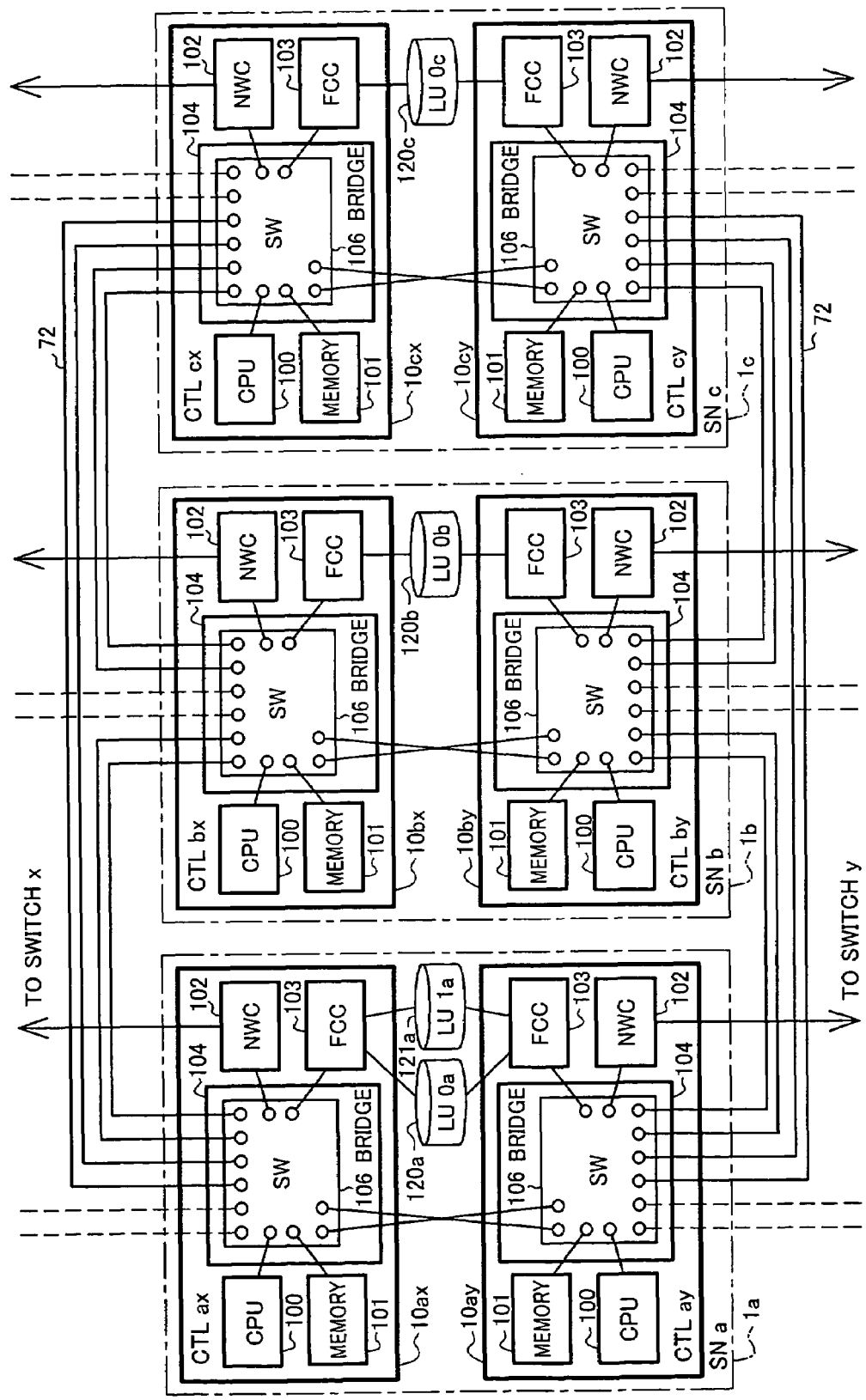
FIG. 18 is a schematic diagram showing details of the inter-node CTL (controller) coupling unit within the storage node.

FIG. 18 is a schematic diagram showing details of the inter-node CTL coupling unit within the storage node. As shown in FIG. 18, a bridge 104 included in the CTL 10 within each storage node 1 has a switch 106 (illustrated as "SW"). Between storage nodes 1, using a connecting line 72 (hereafter called "inter-node CTL connecting line 72") that connects between switches 106, CTLs 10 belonging to the same CTL series are mutually connected. For example, the three CTLs 10 (CTL 10ax, CTL 10bx, and CTL 10cx) belonging to the x series are mutually connected by the inter-node CTL connecting lines 72 that connect the switches 106.

With the example in FIG. 18, each of the inter-node CTL connecting lines 72 consists of a set of two lines. Consequently, it is possible to improve the reliability of the inter-node CTL connecting line 72. Also, by using one of the two lines exclusively for the upward direction and the other line exclusively for the downward direction, it is possible to divide the usage bands of each and to improve the communication performance for the inter-node CTL coupling unit 7. Each of the inter-node CTL connecting lines 72 may also be formed by a single line. The connecting lines shown by the broken line in FIG. 18 are inter-node CTL connecting lines to be provided when further storage nodes 1 are added in the future.

Within one storage node 1, the two CTLs 10 are mutually connected by the connecting line that connects the switches 106 (hereafter called "intra-node CTL connecting line"). With the example in FIG. 18, the intra-node CTL connecting line is also formed by a set of two lines. Also, within one CTL 10, the bridge 104 and other structural components including the CPU 100, the memory 101, the network controller ("NWC") 102, and the FC controller (fiber channel controller, or "FCC") 103 are connected via the switch 106.

Figure 19:
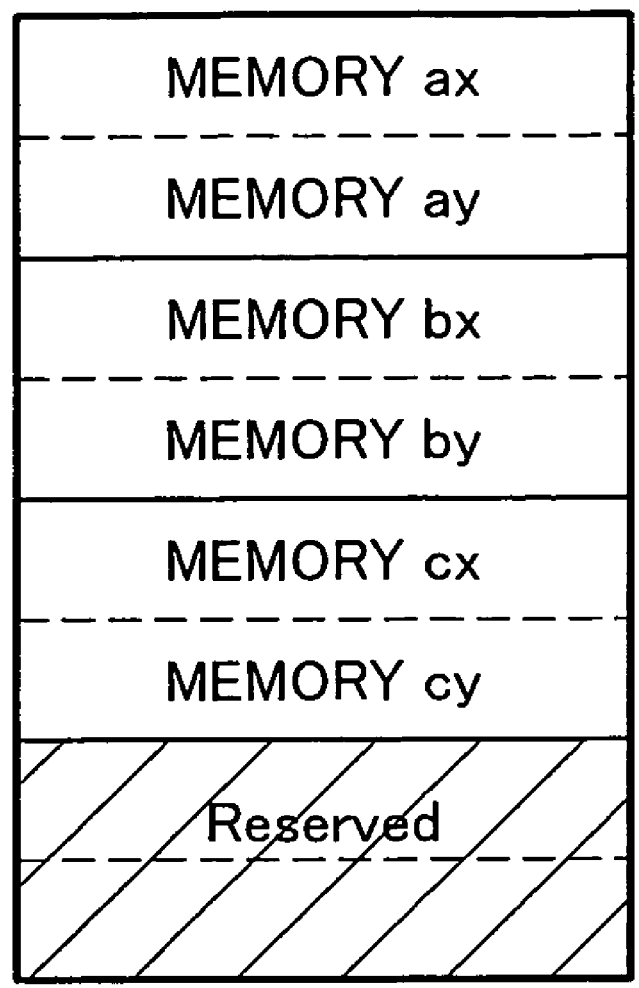
FIG. 19 is a schematic diagram showing a memory map in the seventh embodiment.

FIG. 19 is a schematic diagram showing a memory map in the seventh embodiment. Since the storage system 1000 in this embodiment comprises inter-node CTL coupling units 7, the memory space for the memories 101 included in plural CTLs 10 within plural storage nodes 1 may be treated by each CTL10 as a single memory space as shown in the memory map of FIG. 19. Consequently, each of the CPUs 100 contained in all the CTLs 10 within each storage node 1 are capable of accessing all the memory spaces. Also, for example, when copying data or the like within the memory 101 of a certain CTL 10 to the memory 101 of another CTL 10, the copying of the data or the like will be carried out between the memories 101 via the inter-node CTL connecting line. Consequently, it is possible to execute copying at higher speed than transferring data via a switch 3 (FIG. 1) that forms the network 30 as shown in the first embodiment. With FIG. 19, for example, the memory 101 contained in the CTL 10ax is displayed as "memory ax," and the other memories 101 are displayed in the same manner.

Figure 20:
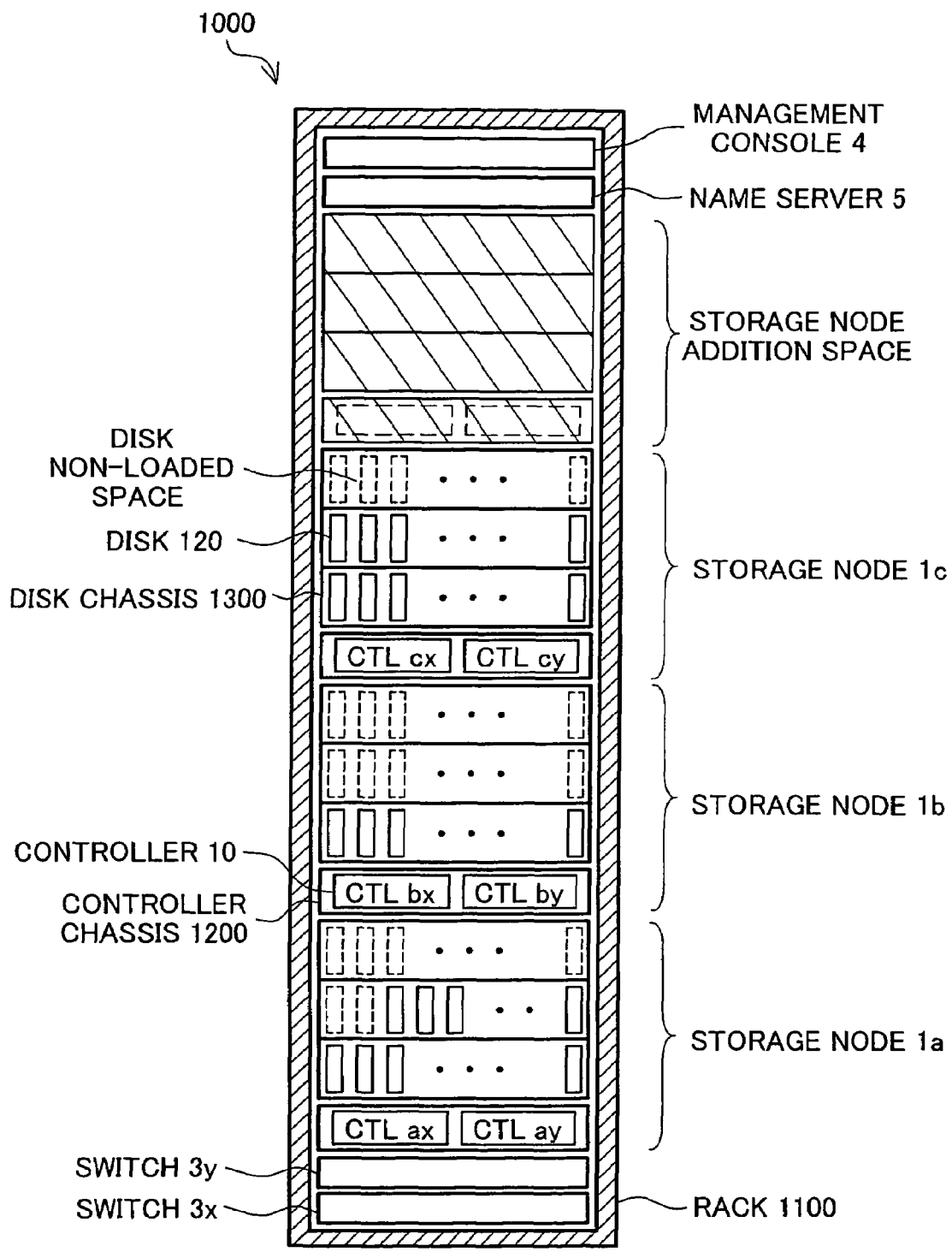
FIG. 20 is a diagram showing an example of the product aspect of the storage system 1000 in the seventh embodiment.

FIG. 20 is a diagram showing an example of the product aspect of the storage system 1000 in the seventh embodiment. The example in FIG. 20 is a so-called rack mount type example. At the bottom level of a 19 inch rack 1100, a switch 3x and a switch 3y are installed, and three storage nodes 1 are installed at the level above the switches 3 in the order storage node 1a, storage node 1b, and storage node 1c. Each of the storage nodes 1 is formed from a controller chassis 1200 and a disk chassis 1300, the CTLs 10 are loaded in the controller chassis 1200, and the disks 120 are loaded in the disk chassis 1300. The space enclosed by the broken line in the disk chassis 1300 of FIG. 20 shows a space that is not loaded with the disks 120. Space for adding the storage nodes, that is, a space in which the controller chassis 1200 or the disk chassis 1300 is not incorporated (shown with cross hatching) space, is provided at the upper level of the storage node 1c, and further at the upper level are installed the name server 5 and the management console 4.

Figure 21:
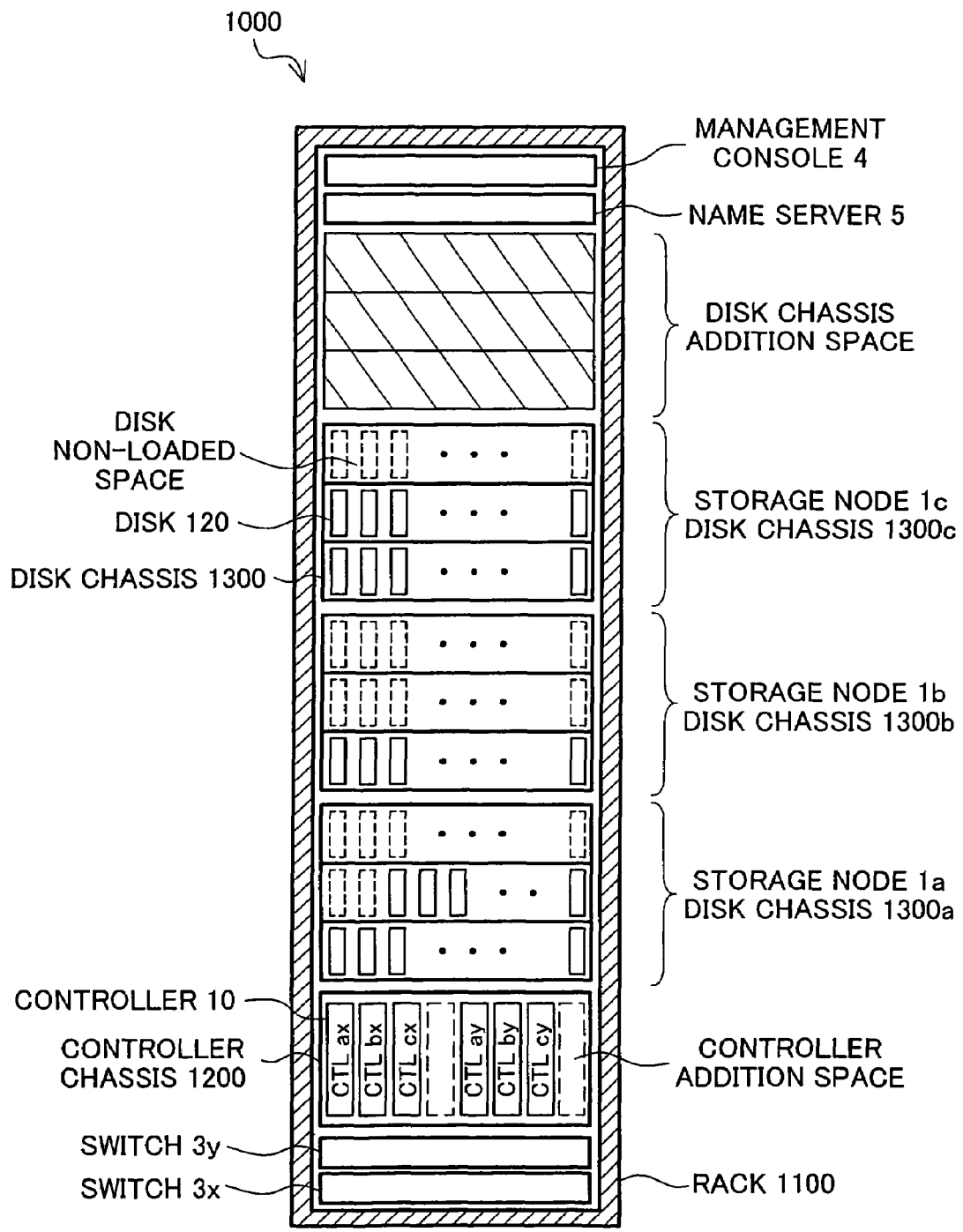
FIG. 21 is a diagram showing an example of another product aspect of the storage system 1000 in the seventh embodiment.

FIG. 21 is a diagram showing an example of another product aspect of the storage system 1000 in the seventh embodiment. The example in FIG. 21 is an example of a so-called blade type. At the bottom level of the 19 inch rack 1100 are installed the switch 3x and the switch 3y. At the level above that, the controller chassis 1200 shared by all the storage nodes 1 is installed, and all the CTLs 10 within the storage system 1000 are loaded into the controller chassis 1200. The space enclosed by a broken line in the controller chassis 1200 of FIG. 21 indicates a space for adding the CTL 10. At the level above the controller chassis 1200, the disk chassis 1300 of the three storage nodes 1 are installed in the order for the storage node 1a (1300a), the storage node 1b (1300b), and the storage node 1c (1300c), and disks 120 are loaded into each disk chassis 1300. The space enclosed by a broken line for the disk chassis 1300 in FIG. 21 indicates a space that has not been loaded with disks 120. At the level above the disk chassis 1300c for the storage node 1c, a space for adding the disk chassis 1300, that is, a space in which a disk chassis 1300 is not incorporated (indicated by cross hatching) is provided, and further at the level above that, the name server 5 and the management console 4 are provided.

Figure 22:
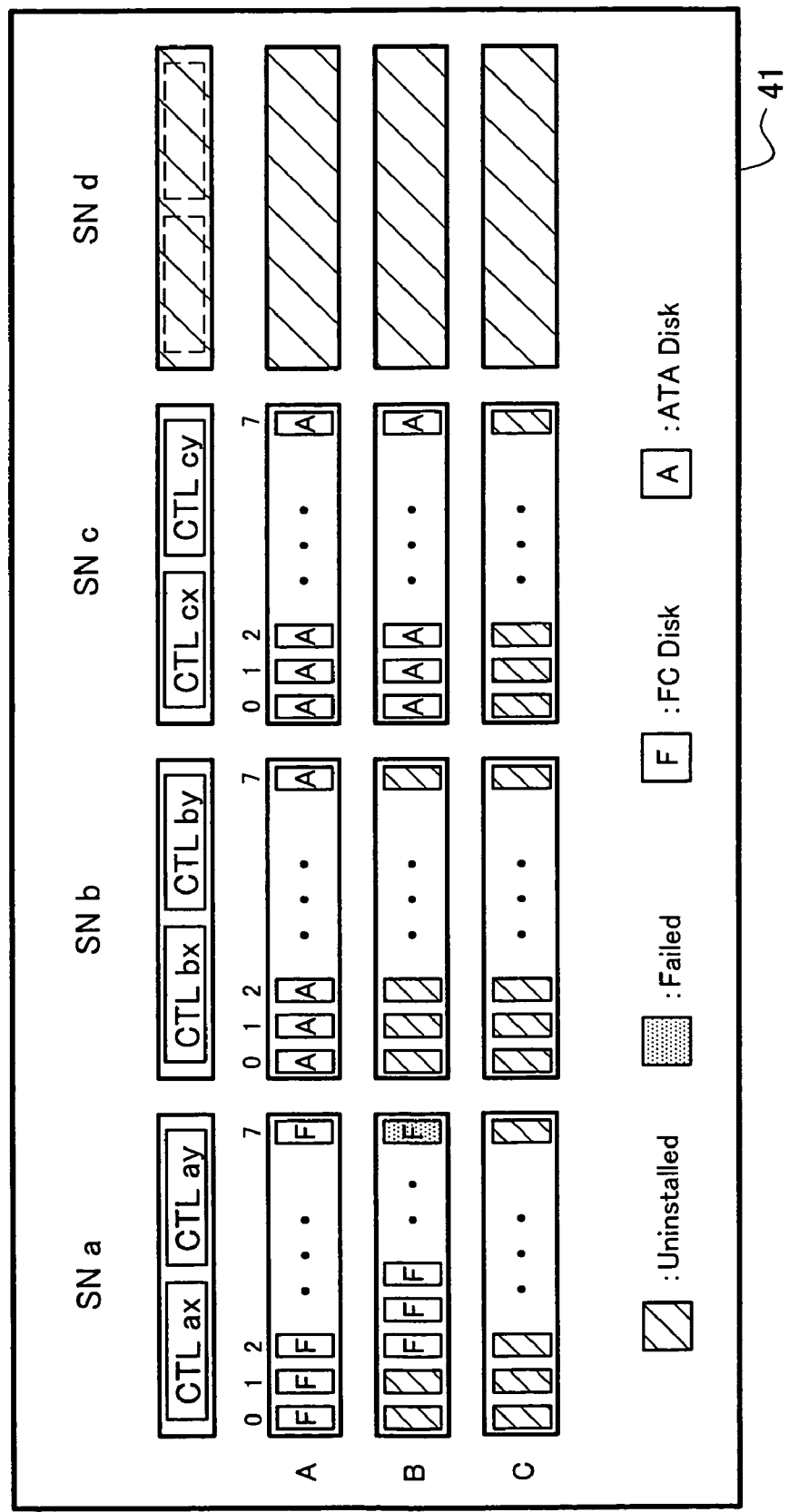
FIG. 22 is a diagram showing a first example of a management screen of the storage system.

(2) Management Screen:

FIG. 22 is a diagram showing a first example of a management screen of the storage system. Here, the management screen is displayed on a display device provided to the management console 4 (FIG. 16) of the storage system 1000. It is not absolutely necessary for the display device to be provided to the management console 4 itself, and that it is also possible to display on a display device of a terminal by doing remote access from another terminal (not illustrated) via a network. The first example of a management screen 41 shown in FIG. 22 displays the physical structure of each storage node 1 within the storage system 1000. Displayed in the management screen 41 in order from the left are the physical structures of actual storage nodes 1a, 1b, 1c, and a possible storage node id to be added in the future. For the display of the physical structure of each storage node 1, at the topmost level, the CTLs 10 loaded into the controller chassis 1200 (see FIG. 20) are indicated. Also, below that, the disks 120 loaded into the disk chassis 1300 (see FIG. 20) are indicated. With the example in FIG. 22, the disk chassis 1300 has a disk 120 loading space for 3 rows (row A to row C), and eight (No. 0 to No. 7) disks 120 can be loaded into each row. With the example of the management screen 41 of FIG. 22, the disk 120 type (FC disk, ATA disk or the like) is indicated using the alphabet (A, F or the like). Also, the fact that a space within the disk chassis 1300 is not loaded with disks 120 is indicated by cross hatching to the display corresponding to that space. Similarly, the fact that a failure has occurred in the disk 120 is indicated by another type of shading of the display corresponding to that disk. In this way, through the display on the management screen 41, the user is able to understand the status of the physical structure (disk 120 installation status or the like) or failure occurrence of the storage system 1000.

Figure 23:
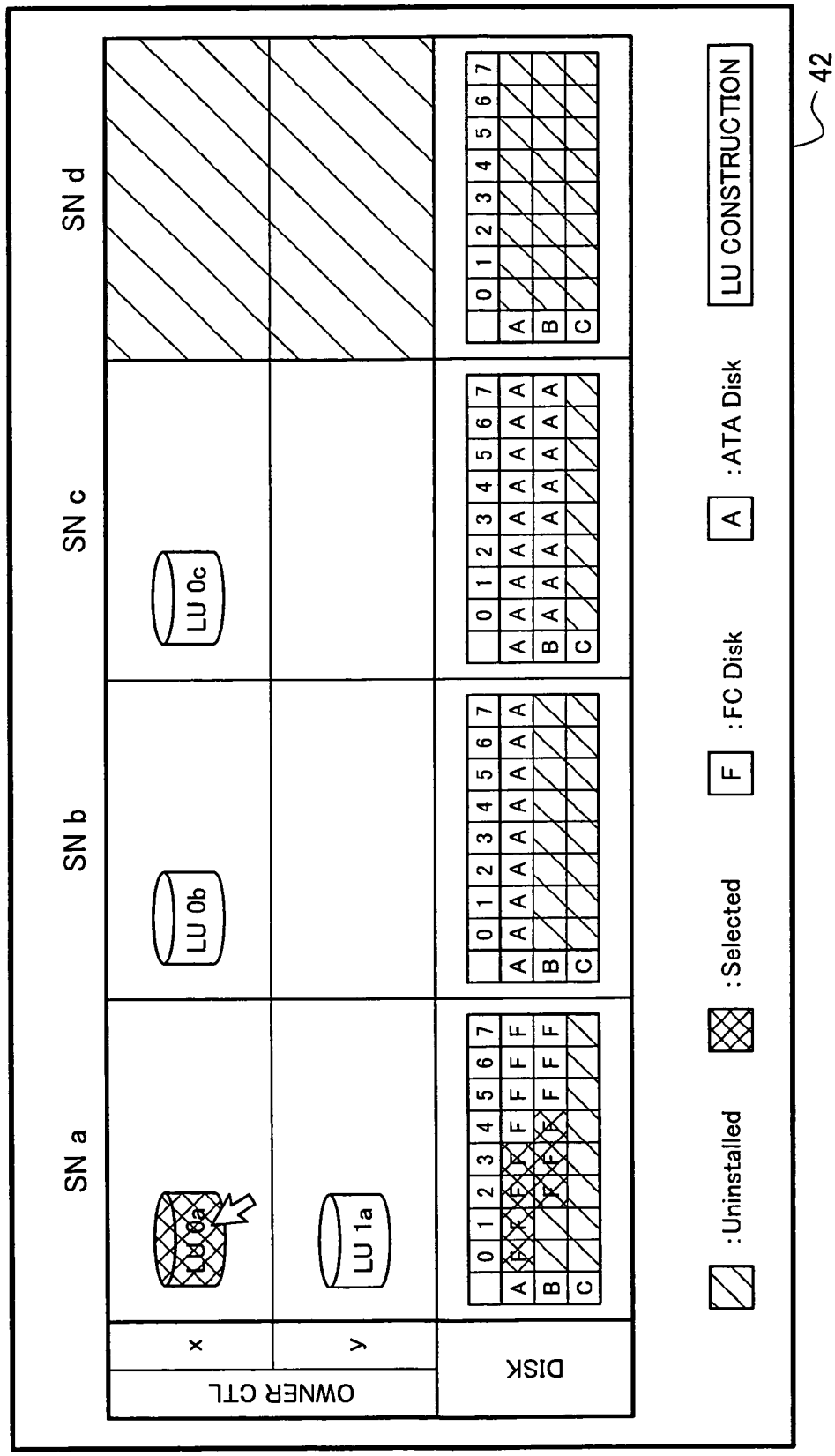
FIG. 23 is a diagram showing a second example of a management screen of the storage system.

FIG. 23 is a diagram showing a second example of a management screen of the storage system. The second example of the management screen 42 shown in FIG. 23 displays the logic structure of each storage node 1 within the storage system 1000. In management screen 42 are displayed in order from the left the logic structure of the actual storage nodes 1a, 1b, 1c, and a possible storage node 1d. For the display of the logic structure of each storage node 1, at the top level is indicated the relationship between the storage node 1 and the LUs 12, and the relationship between the CTL 10 and the LUs 12. That is, the LUs 12 contained in the storage node 1 is displayed in the space corresponding to the CTL 10 which has the ownership rights to the LUs 12. For example, with the example in FIG. 23, the storage node 1a (SNa) has the two LUs 12 (LU 120a (LU 0a) and LU 121a (LU 1a)), and the ownership rights of the LU 120a (LU 0a) among these is held by the CTL 10ax. For display of the logic structure, at the bottom level is displayed the loading status of the disks 120 into the disk chassis 1300 (see FIG. 20), as is the case with the management screen 41. Then, when the user selects the LU 12 display on the management screen 42, identification display (e.g. cross hatching display) of the disk 120 corresponding to that LU 12 is performed, and it becomes possible to understand the correspondence or logical relationship between the LU 12 and the disk 120. For example, with the example in FIG. 23, the selected LU 120a (LU 0a) is indicated as being formed from a total of seven disks 120 including the disks 120 of row A No. 0 to No. 3 and the disks 120 of row B No. 2 to No. 4, and the correspondence between this LU 12 and the disk 120 is displayed. In this way, with the display of the management screen 42, the user is able to understand the relationship between the storage node 1 within the storage system 1000 and the LU 12, the relationship between the LU 12 and the disk 120, and the relationship between the LU 12 and the CTL 10 (ownership rights). Furthermore, for the management screen 42 may also be used for the user to make settings for the storage system 1000, but this will be described later. The ownership rights are the management authority for each LU 12, and with this embodiment, only one CTL 10 has the ownership rights for each LU 12. Only the CTL 10 which has the ownership rights is able to update management information of cache, and the LU 12. A CTL 10 which does not have the ownership rights of that LU 12 may also access the LU 12, but it is necessary at that time to inquire with the CTL 10 which does have the ownership rights, and to consign processing such as updating of cache management information, and locking. The meaning of the "LU CONSTRUCTION" icon displayed on the management screen 42 will be described later.

Figure 24:
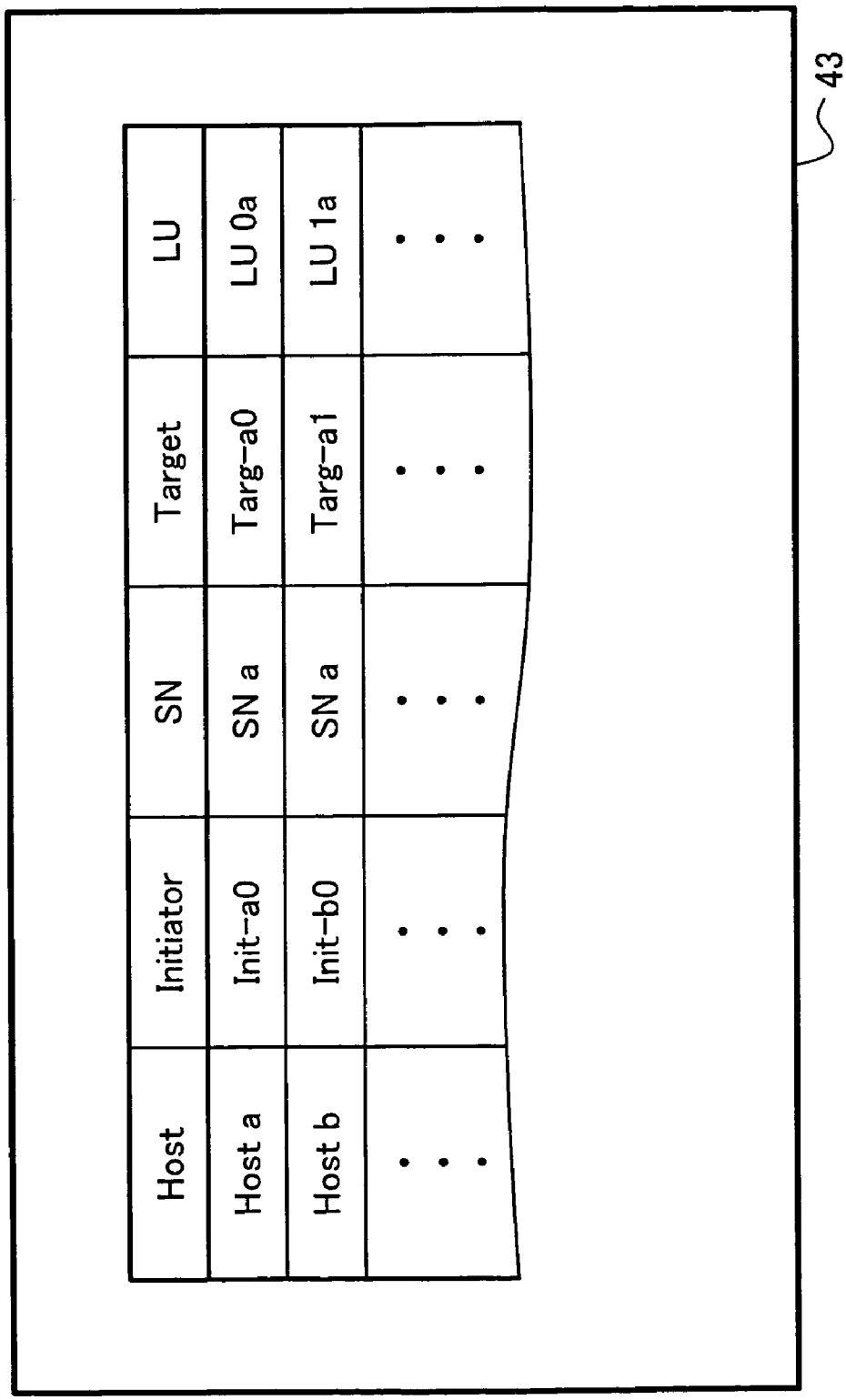
FIG. 24 is a diagram showing a third example of a management screen of the storage system.

FIG. 24 is a diagram showing a third example of a management screen of the storage system. The third example of the management screen 43 shown in FIG. 24 displays the logic structure of the host 2 and the storage system 1000. That is, displayed in the management screen 43 are the relationship between the host 2 and the LU 12, the relationship between the initiator and the target, and the relationship between the storage node 1 and the target and the LU 12. With the display of the management screen 43, the user is able to understand these logical relationships. In specific terms, it is indicated that an initiator port with the name Init-a0 is provided in the Host a, and this Init-a0 may access the LU 0a which is mapped in the target port with the name Targ-a0 of the storage node SNa.

Figure 25:
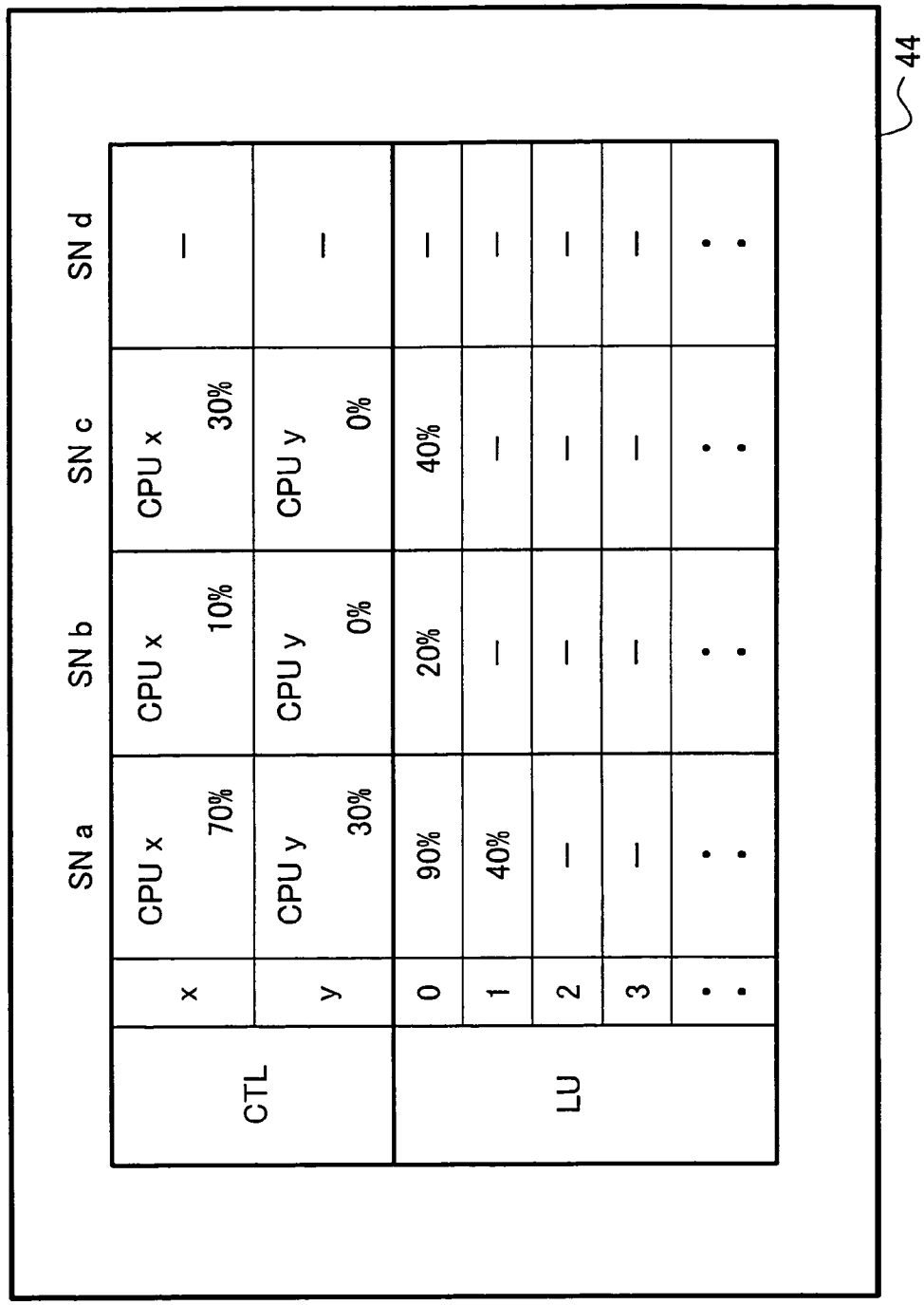
FIG. 25 is a diagram showing a fourth example of a management screen of the storage system.

FIG. 25 is a diagram showing a fourth example of a management screen of the storage system. The fourth example of the management screen 44 shown in FIG. 25 displays the operating status of each storage node 1 within the storage system 1000. In the management screen 44 are displayed the operating status in order from the left of the actual storage nodes 1a, 1b, 1c, and the possible storage node id. For the display of the operating status of each storage node 1, at the top level, the operating rate of the CPU 100 within each CTL 10 is indicated, and at the bottom level, the operating rate of each LU 12 is indicated. Here, for the CPU 100, the operating rate is calculated, for example, assuming that an operation time is differential between a certain measured time and an idle routine time in the measured time. For the LU 12, the operating rate is calculated, for example, assuming that an operation time is a time from receipt of a command from the host 2 to sending of a command completion report to the host 2. The operation rate is calculated for each passing of a predetermined time, for example, and the display of the management screen 44 is updated. As display items for the operating status, it is also possible to use the number of accesses from the host 2, the ratio of read requests and write requests, the transfer length, and the like. With the display of the management screen 44, the user is able to understand the operating status (size of the load) of the storage node 1 within the storage system 1000.

Figure 26:
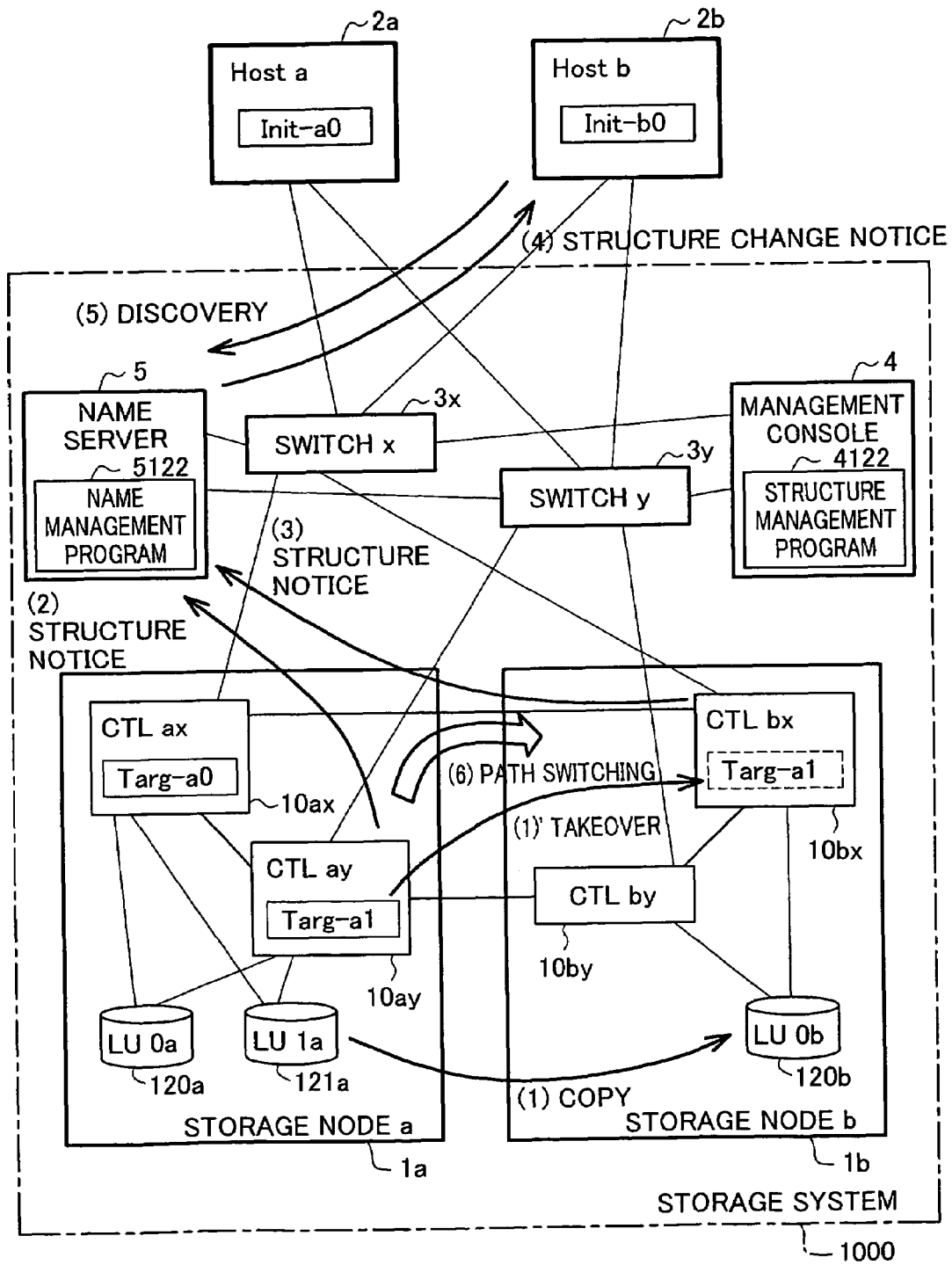
FIG. 26 is a schematic diagram showing an overview of a storage node addition and LU migration process for the computer system using the storage system in the seventh embodiment.
Figure 27:
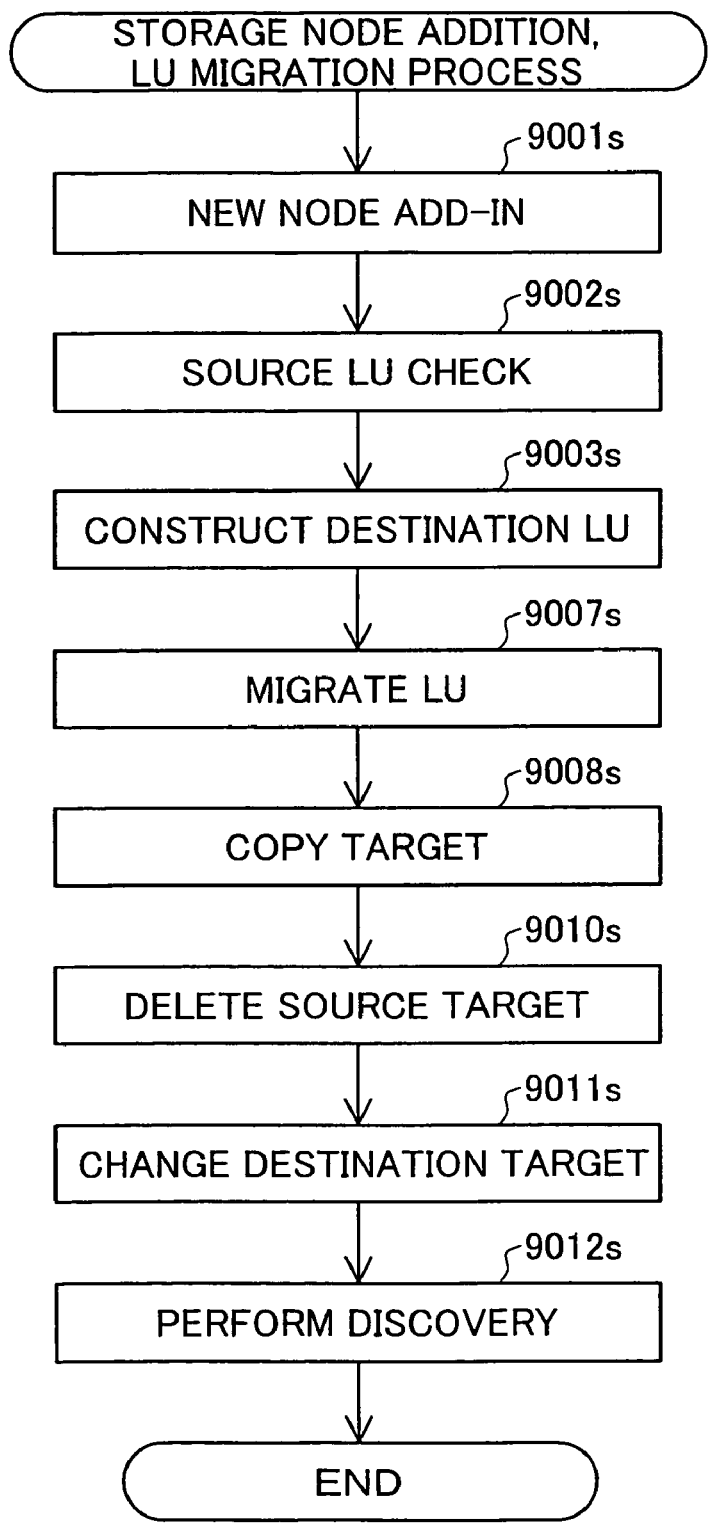
FIG. 27 is a flowchart showing the flow of a storage node addition and LU migration process for the computer system using the storage system in the seventh embodiment.

(3) Storage Node Addition and LU Migration Process:

FIG. 26 is a schematic diagram showing an overview of a storage node addition and LU migration process for the computer system using the storage system in the seventh embodiment. FIG. 27 is a flowchart showing the flow of a storage node addition and LU migration process for the computer system using the storage system in the seventh embodiment. The storage node addition and LU migration process is the same process as that in the first embodiment described using FIG. 8 and FIG. 9. That is, this is a process whereby the storage node 1 is added within the storage system 1000, the data of the existing storage node 1 is copied to the added storage node 1, and the access destination of the host 2 is switched to the added storage node 1. In specific terms, with the example in FIG. 26, a new storage node 1b is added in the storage system 1000 having the storage node 1a, and the data stored in the LU 121a (LU 1a) of the existing storage node 1a is copied to the LU 120b (LU 0b) of the added storage node 1b. Also, the access destination of the host 2b is switched from the LU 121a (LU 1a) to the LU 120b (LU 0b). With this embodiment, the ownership rights of the LU 121a (LU 1a) of the storage node 1a are held by the CTL 10ay, and the ownership rights of the LU 120b (LU 0b) of the added storage node 1b are held by the CTL 10bx (see FIG. 23).

Steps 9001s and 9002s in this embodiment shown in FIG. 27 are the same process as the steps 9001 and 9002 in the first embodiment shown in FIG. 9. That is, at step 9001s, the manager adds the storage node 1b within the storage system 1000, and at step 9002s, the structure management program 4122 of the management console 4 (FIG. 26) performs a check of the LU 121a (LU 1a) which is the migration source LU 12. Here, as described above, the storage system 1000 in this embodiment includes inter-node CTL coupling units 7 for connecting to each other CTL 10 belonging to the same CTL series among the CTLs 10 within each storage node 1. Because of this, when adding the storage node 1b at step 9001s as well, an inter-node CTL coupling unit 7 is provided between the existing storage node 1a and the added storage node 1b. In specific terms, as shown in FIG. 26, the CTL 10ax of the storage node 1a and the CTL 10bx of the storage node 1b are connected by the inter-node CTL coupling unit 7.

Similarly, the CTL 10ay of the storage node 1a and the CTL 10by of the storage node 1b are connected by the inter-node CTL coupling unit 7.

At step 9003s, the structure management program 4122 performs construction of the migration destination LU. The construction process of the migration destination LU in this embodiment is the same process as the step 9003 in the first embodiment shown in FIG. 9.

Here, the storage system 1000 in this embodiment includes an inter-node CTL coupling unit 7, so copying of data between storage nodes 1 may be executed using the inter-node CTL coupling unit 7. This embodiment differs in this regard from the first embodiment, which executes copying of data via the switches 3 (see FIG. 8). Consequently, with this embodiment, the target registration and initiator registration performed just for copying data in the first embodiment are unnecessary. That is, with this embodiment, from part of step 9003 in the first embodiment (the target registration part) up to step 9006 shown in FIG. 9 may be abolished.

At step 9007s, the data stored within the LU 121a (LU 1a) is migrated to the LU 120b (LU 0b). The data migration is performed in the same way as step 9007 in the first embodiment shown in FIG. 9.

Since the storage system 1000 in this embodiment includes an inter-node CTL coupling unit 7, the data migration is performed not with the path via the switches 3, but rather using the inter-node CTL coupling unit 7; this is different from the first embodiment. In specific terms, the migration program (FIG. 3) of the CTL 10ay within the storage node 1a reads the data stored in the LU 121a (LU 1a) on the memory 101 (FIG. 17), and via the inter-node CTL coupling unit 7, writes the read data onto the memory 101 within the CTL 10bx of the storage node 1b. After that, the data written on the memory 101 is stored in the LU 120b (LU 0b) by the CTL 10bx of the storage node 1b.

At step 9008s, the information of the target Targ-a1 set in the LU 121a (LU 1a) held by the CTL 10ay of the storage node 1a is copied to the CTL 10bx of the storage node 1b. Copying of the target information is performed in the same way as step 9008 in the first embodiment shown in FIG. 9. However, with this embodiment, as is the case with the data migration described above, copying of the target information is performed not using a path via the switches 3, but rather using the inter-node CTL coupling unit 7.

The seventh embodiment may abolish the process of migration source initiator deletion performed in the first embodiment (step 9009 in FIG. 9), since initiator registration for the migration source for copying of data is unnecessary. Consequently, with this embodiment, when step 9008s is completed, the process proceeds to step 9010s.

The process from step 9010s to 9012s in this embodiment shown in FIG. 27 is the same as that from step 9010 to 9012 in the first embodiment shown in FIG. 9. That is, at step 9010s, the target Targ-a1 information set in the migration source LU 121a (LU 1a) is deleted. At step 9011s, the target Targ-a1 information set in the migration destination LU 120b (LU 0b) is changed. At step 9012s, discovery processing is performed.

With the process described above, with this embodiment, like with the first embodiment, the data and access information (target and initiator information) are taken over from the migration source LU 121a (LU 1a) by the migration destination LU 120b (LU 0b).

With this embodiment, migration of data and access information is performed using the inter-node CTL coupling unit 7. That is, migration of data and access information is performed without going through an access path between the host 2 and the CTL 10. Consequently, it is possible to suppress an adverse effect of moving the data and access information on access between the host 2 and the CTL 10. Also, the migration of data and access information is performed by copying between the memories 101 of the CTLs 10, so it is possible to accelerate the migration process. Furthermore, since registration of the initiator and target used only for moving the data and access information is not necessary, it is possible to simplify and accelerate the migration process.

Figure 28:
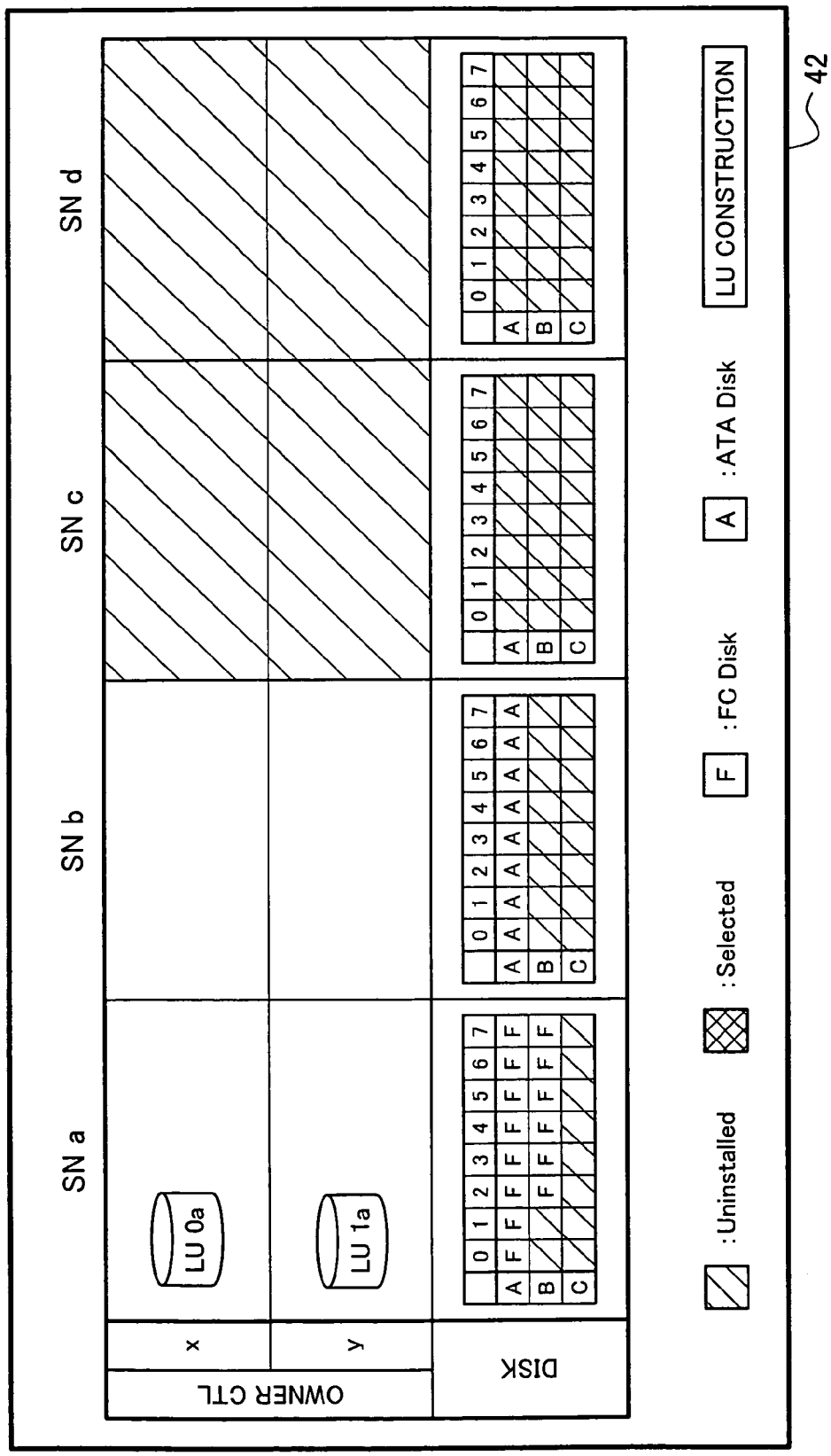
FIG. 28 is a diagram showing exemplary setting of the storage system using the management screen.
Figure 29:
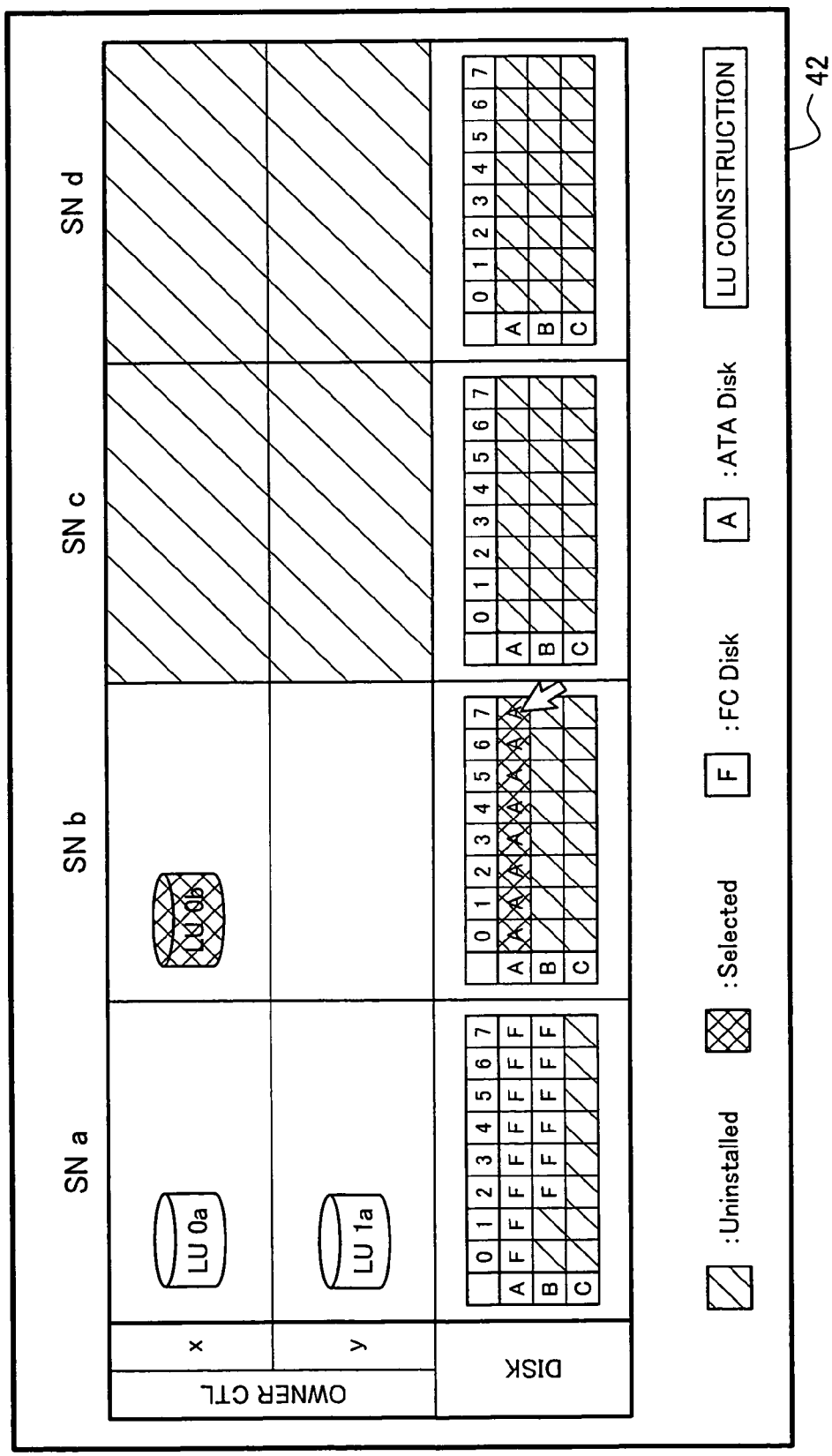
FIG. 29 is a diagram showing exemplary setting of the storage system using the management screen.
Figure 30:
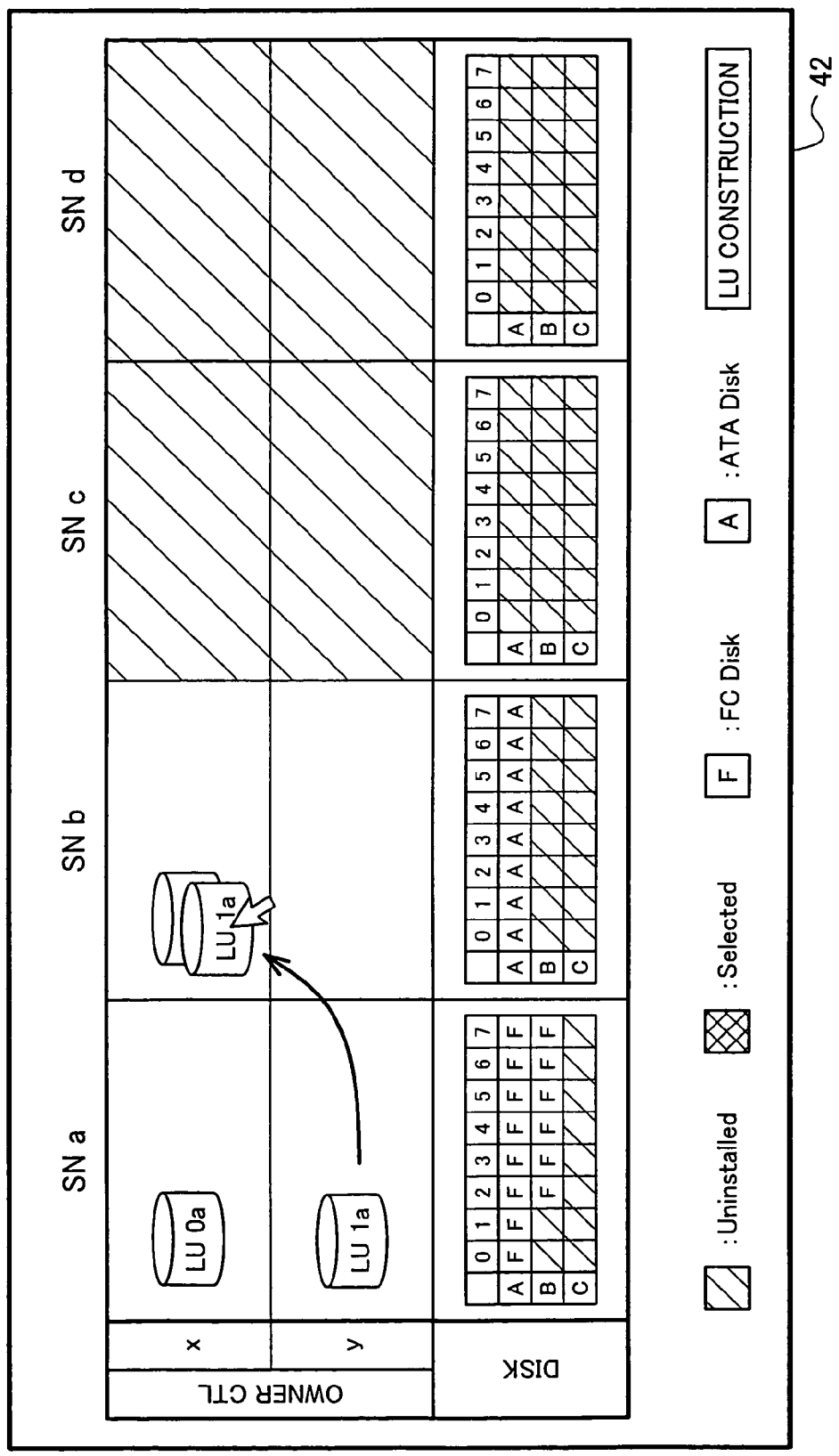
FIG. 30 is a diagram showing exemplary setting of the storage system using the management screen.

(4) Setting of the Storage System Using the Management Screen:

As described above, the management screen in this embodiment is also used when the user is setting the storage system 1000. FIG. 28 to FIG. 30 are diagrams showing exemplary setting of the storage system using the management screen. FIG. 28 to FIG. 30 show the operating status of the management screen 42 (see FIG. 23) when executing the storage node addition and LU migration process described using FIG. 26 and FIG. 27.

FIG. 28 shows the status of the management screen 42 immediately after adding the storage node 1b in the storage system 1000. At this point in time, the CTL 10 and disk 120 of the storage node 1b within the storage system 1000 are installed, but construction of the LU 12 for the storage node 1b has not been implemented. Because of this, in the management screen 42 shown in FIG. 28, for the added storage node 1b, only the structure of the disk 120 is displayed, and the structure of the LU 12 is not displayed.

FIG. 29 shows the status of the management screen 42 when executing construction of the LU 12 for the storage system 1000. For example, for the user to create a new LU 21 (LU 0b) in the LU 12 forming display space for the storage node 1b on the management screen 42, the disk 120 for forming the LU 12 (LU 0b) is selected in the disk 120 forming display space. After that, the "LU CONSTRUCTION" menu of the screen is selected to create the LU 12 (LU 0b). By working in this way, the user is able to correlate the LU 12 and the disk 120 for the storage node 1b and perform execution instructions for creating the LU 12.

FIG. 30 shows the status of the management screen 42 when executing the LU 12 migration process for the storage system 1000. For example, on the management screen 42, the user drags and drops the display of the migration source LU 12 (LU 1a) onto the display of the migration destination LU 12 (LU 0b). By working in this way, the user is able to input instructions to copy data from the LU 12 (LU 1a) to the LU 12 (LU 0b) and to migrate access information from the LU 12 (LU 1a) to the LU 12 (LU 0b). At this time, it is preferable to support the migration of data reliably and safely by having display of a confirmation screen to the effect that data is being moved. As described above, as shown by example with this embodiment, it is possible to do management and operation of a storage system, which is constructed by loading a plurality of storage nodes SN onto a single rack or one set of a plurality of racks, as a single large scale storage device or with a single image on the single screen of a management console.

Figure 31:
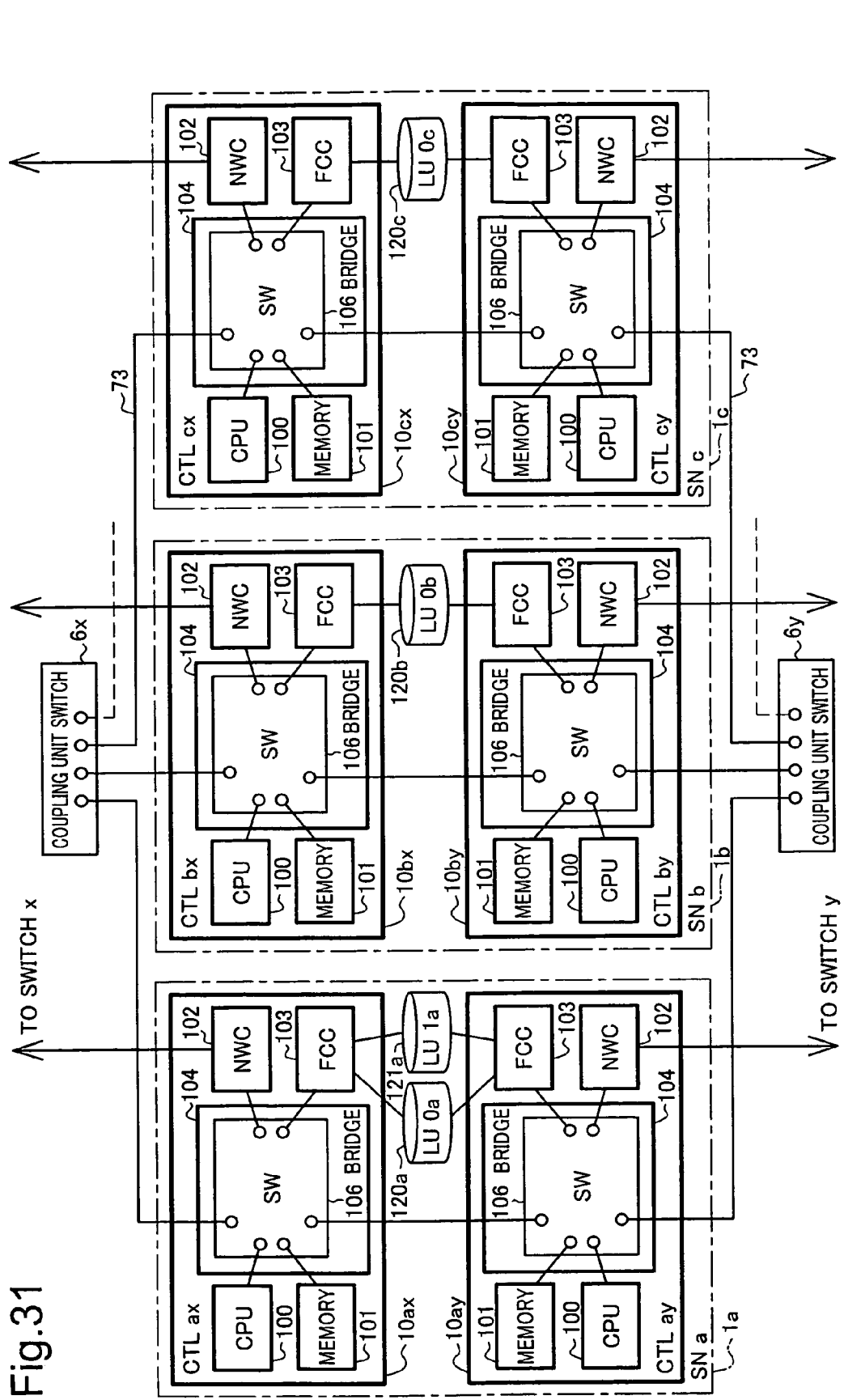
FIG. 31 is a schematic diagram showing details of the inter-node CTL coupling unit as a first variation example of the seventh embodiment.

(5) Variation of Seventh Embodiment:

For the details of the inter-node CTL coupling unit 7 in this embodiment described using FIG. 18, variations such as the following are also possible. FIG. 31 is a schematic diagram showing details of the inter-node CTL coupling unit as a first variation example of the seventh embodiment. With the first variation example shown in FIG. 31, two coupling unit switches 6 (6x and 6y) are provided. The two coupling unit switches 6 are respectively connected to the two CTL series of the CTLs 10 (the x series and the y series). The coupling unit switch 6x for the x series is connected to the switches 106 of each CTL 10 belonging to the x series by a connecting line 73. Similarly, the coupling unit switch 6y for the y series is connected to the switches 106 of each CTL 10 belonging to the y series by the connecting line 73. That is, with this variation example, for each CTL series, the inter-node CTL coupling unit 7 is formed from a coupling unit switch 6, and a connecting line 73 for connecting the coupling unit switch 6 and the switch 106. By working in this way, it is possible to simplify the structure for connecting between the CTLs 10. With the example in FIG. 31, each of the connecting lines 73 for connecting the coupling unit switch 6 and the switch 106 and each of the intra-node CTL connecting lines for connecting between the CTLs 10 within the storage node 1 are formed by a single line, but as shown in FIG. 18, it is also possible to form these with sets of two lines.

Figure 32:
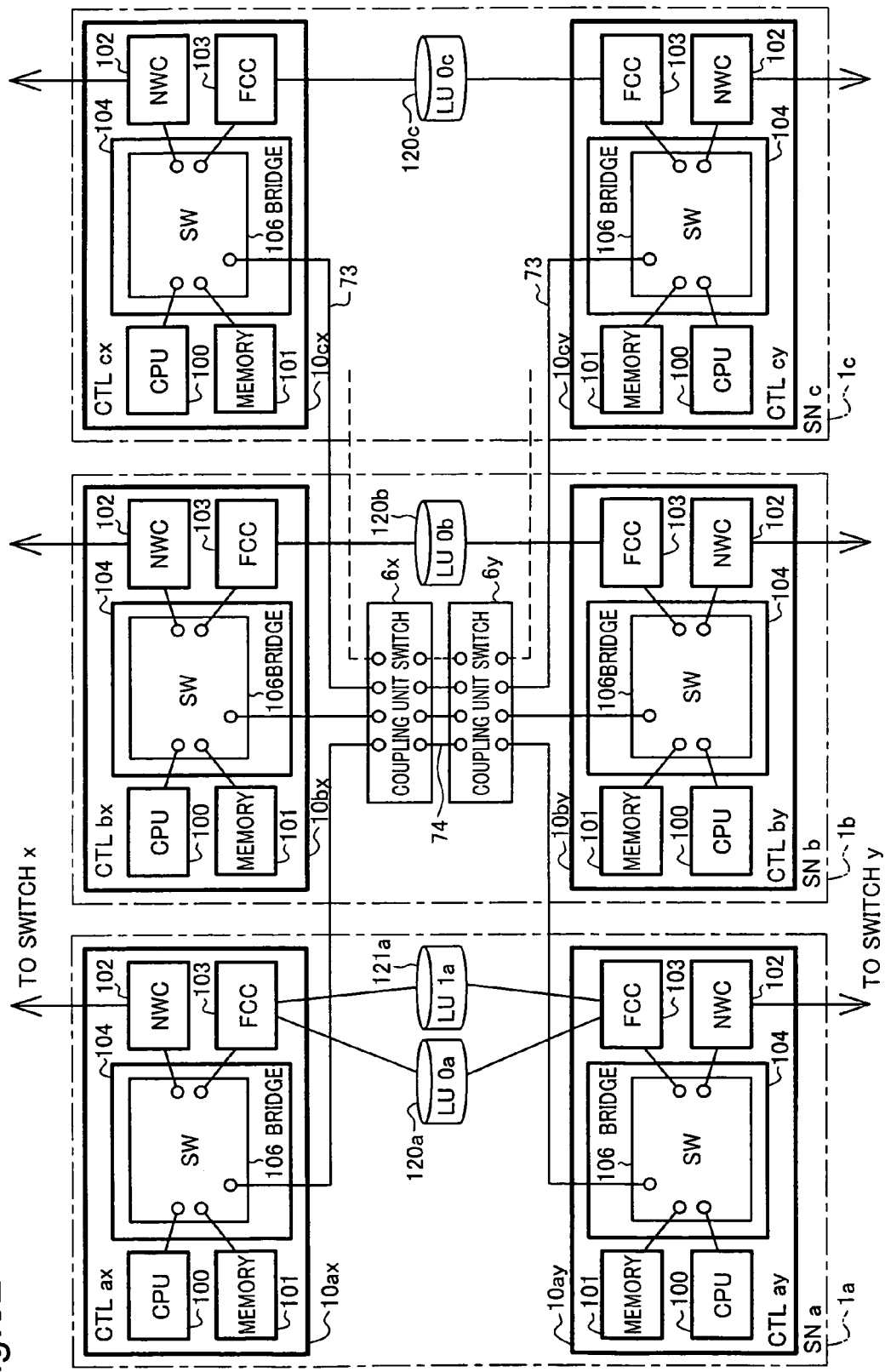
FIG. 32 is a schematic diagram showing details of the inter-node CTL coupling unit as a second variation example of the seventh embodiment.

FIG. 32 is a schematic diagram showing details of the inter-node CTL coupling unit as a second variation example of the seventh embodiment. With the second variation example shown in FIG. 32, as is the case with the first variation example shown in FIG. 31, two coupling unit switches 6 are provided, and for each CTL series, the inter-node CTL coupling unit 7 is formed from the coupling unit switch 6 and from connecting lines 73 for connecting the coupling unit switch 6 and the switch 106. Furthermore, with the second variation example, the two coupling unit switches 6 are connected by a connecting line 74, and the two CTLs 10 within the storage node 1 are connected via this connecting line 74. By working in this way, it is possible to further simplify the structure for connecting between the CTLs 10. For the second variation example as well, it is possible to form each connecting line using sets of two lines.

Figure 33:
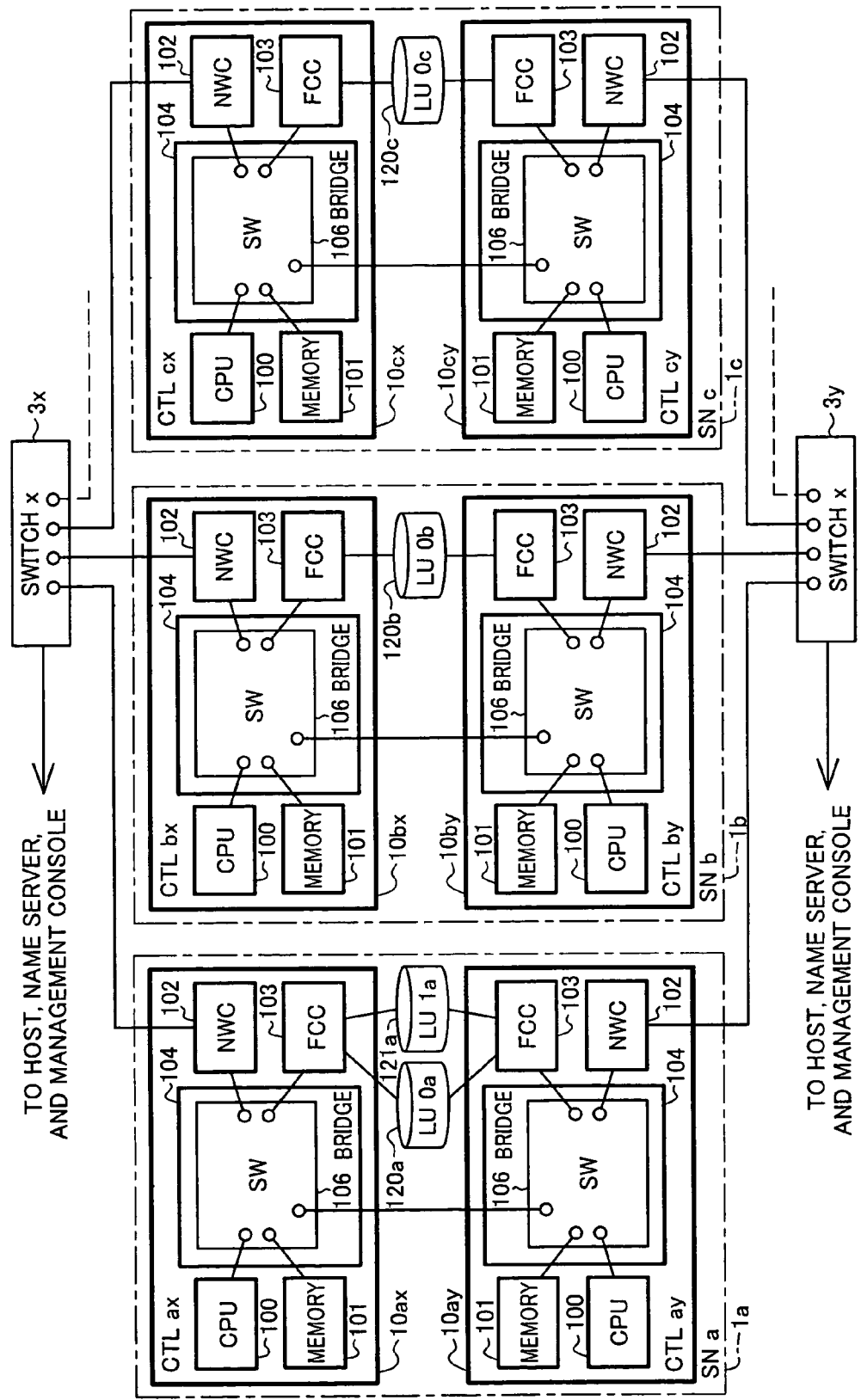
FIG. 33 is a schematic diagram showing details of the inter-node CTL coupling unit as a third variation example of the seventh embodiment.

FIG. 33 is a schematic diagram showing details of the inter-node CTL coupling unit as a third variation example of the seventh embodiment. With the third variation example shown in FIG. 33, for each CTL series, the inter-node CTL coupling unit 7 is formed from a switch 3 (see FIG. 16) for connecting with the host or the like, and from a connecting line for connecting the switch 3 and the switch 106. With the third variation example, the CTLs 10 in the storage node 1 are connected via the switches 3, so copying of data or access information between the storage nodes 1 is performed in the same way as in the first embodiment.

Eighth Embodiment

Figure 34:
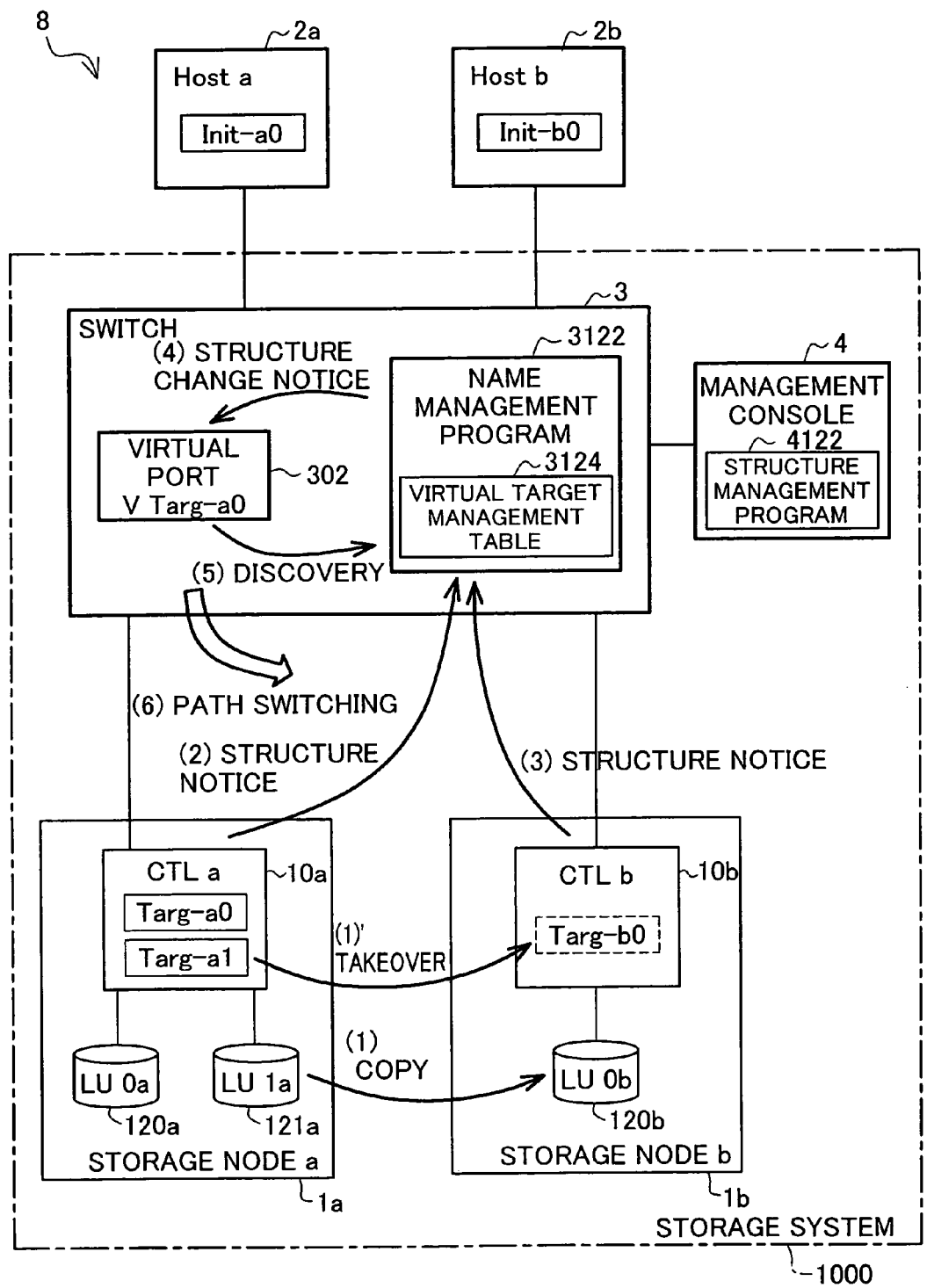
FIG. 34 is a schematic diagram showing an overview of a storage node addition and LU migration process for the computer system 8 which can be used for the storage system as an eighth embodiment of the present invention.

FIG. 34 is a schematic diagram showing an overview of a storage node addition and LU migration process for the computer system 8 which can be used for the storage system as an eighth embodiment of the present invention. The storage node addition and LU migration process in this embodiment are the same process as that in the first embodiment described using FIG. 8 and FIG. 9. That is, this is a process whereby the storage node 1b is added within the storage system 1000, the data stored in the existing storage node 1a is copied to the added storage node 1b, and the access destination of the host 2b is switched to the added storage node 1b.

The storage system 1000 in this embodiment has a connection scheme between the host 2 and the storage node 1 that is different from that in the first embodiment. In specific terms, with the first embodiment, the host 2 and the storage node 1 are connected by an IP network, and the iSCSI protocol is used as the data protocol between the host 2 and the storage node 1. In contrast to this, with this embodiment, the host 2 and the storage node 1 are connected by an FC (fiber channel), and the FC protocol is used as the data protocol between the host 2 and the storage node 1.

Here, when using the FC protocol, as described above, WWN (World Wide Name) is used as the target name. Since WWN is uniquely given within the system, when the target of a certain storage node 1 is copied to another storage node 1, that target name will be changed. For example, as shown in FIG. 34, when the target Targ-a1 within the storage node 1a is copied to the storage node 1b, that target name changes to Targ-b0. The storage node 1b in this state is not able to take over access from the initiator Init-bo of the host 2b. Because of this, with this embodiment, takeover of access with the host 2 and the storage node 1 is performed using a virtual target (VTarg) of a virtual port 302. This will be described hereafter.

As shown in FIG. 34, the switches 3 within the storage system 1000 in this embodiment include the virtual port 302 and a name management program 3122. The virtual target VTarg-a0 is set in the virtual port 302. The name management program 3122 is the same program as the name management program 5122 of the name server 5 in the first embodiment. The storage system 1000 in this embodiment does not include the name server 5, but the storage system 1000 in this embodiment may also include the name server 5, and that name server 5 may also include the name management program 3122.

The name management program 3122 includes a virtual target management table 3124. FIG. 35A and FIG. 35B are diagrams showing an overview of the virtual target management table 3124. In FIG. 35A is shown the virtual target management table 3124 before taking over access of the host 2 and the storage node 1. As shown in FIG. 35A and FIG. 35B, the virtual target management table 3124 defines the relationship between the initiator and the virtual target as well as the relationship between the virtual target and the actual target. For example, with the status of FIG. 35A, the virtual target VTarg-a0 is correlated as the access destination of the initiator Init-b0 that the host 2b has by the virtual target management table 3124. Also, the virtual target VTarg-a0 and the actual target Targ-a1 set in the LU 121a (LU 1a) that the storage node 1a has are correlated. Consequently, the initiator Init-b0 and the target Targ-a1 are correlated via the virtual target VTarg-a0 of the virtual port 302 by the virtual target management table 3124.

When the target Targ-a1 of the storage node 1a is copied to the CTL 10b of the storage node 1b, the target name of that target is changed to Targ-b0. Here, when the name management program 3122 receives a structure notice from the storage nodes 1a and 1b, the virtual target management table 3124 is updated based on that notice. FIG. 35B shows the updated virtual target management table 3124. The actual target correlated with the virtual target VTarg-a0 of the virtual port 302 is defined as being the target Targ-b0 set in the LU 120b (LU 0b) included in the storage node 1b by the updated virtual target management table 3124.

After the virtual target management table 3124 has been updated, the name management program 3122 notifies the virtual port 302 that there has been a change in the virtual target management table 3124. The virtual port 302 which has received this notice executes discovery processing, and sets the Targ-b0 as the target correlated to the virtual target VTarg-a0 of the virtual port 302. Because of this, the fact that the access destination of the initiator Init-b0 is the virtual target VTarg-a0 of the virtual port 302 is unchanged, but the initiator Init-b0 and the target Targ-b0 are correlated via the virtual target VTarg-a0. By working as described above, it is possible to take over access of the host 2 and the storage node 1 even for the storage system 1000 for which the host 2 and the storage node 1 are connected by the FC.

With the storage system in the seventh embodiment and eighth embodiment described above, even when addition of a storage node SN is repeated, the manager is able to manage the storage system with a single system image. Consequently, compared to the chassis of the conventional type storage system for which a plurality of systems were managed individually, it is possible to significantly reduce the storage system management cost.

Also, with the storage systems in the first through eighth embodiments described above, the following four effects may be obtained. First, by combining a plurality of storage nodes SN formed at low cost on a small scale, it is possible to provide a storage system with good cost performance at a large scale. Second, as the demand for capacity and performance increases, it is possible to add storage node SN units, making it possible to always provide a scalable storage system formed at the optimal cost. Third, it is possible to realize data migration that is permeable for an application program of the host computer when adding or decreasing the storage nodes SN, so even when it is necessary to replace the storage node SN due to its product life, since there is no stopping of the operation, it is possible to attain long term data storage that exceeds the life of the storage node SN. Fourth, by combining the storage nodes SN, it is possible to realize a system structure from small scale to large scale that is flexible according to various application programs, so it is possible to reduce the types of products (the number of products in a product line) when developing products.

What is claimed is:

1. A storage system comprising:
    a plurality of storage nodes each including at least one storage device configured to store data and plural control devices, each control device comprising:
        a network controller for communication with a host computer;
        a disk controller coupled to the at least one storage device for controlling input and output of data for the at least one storage device; and
        a memory for storing control information used for input and output of data with the at least one storage device; and
    a control device coupling unit configured to connect control devices from among mutually different ones of the storage nodes without using access paths between the control devices and any host computers,
    each of the control devices configured to access a combined memory area having a single address space, the combined memory area comprising the memories of each of the control devices,
    wherein each of the control devices among the storage nodes in the storage system is associated with a control device affiliation such that each of the control devices in a storage node is associated with a different control device affiliation, and the control device coupling unit connects only those control devices among the storage nodes that are associated with the same control device affiliation.

2. A storage system according to claim 1, wherein
    the control devices among the storage nodes in the storage system each includes a control device switch for connecting with the control device coupling unit, and
    the control device coupling unit includes a connecting line for connecting to the control device switches.

3. A storage system according to claim 1, wherein
    the control devices among the storage nodes in the storage system each includes a control device switch for connecting with the control device coupling unit, and
    the control device coupling unit includes a coupling switch associated with a control device affiliation and a connecting line for connecting the coupling switch and the control device switch.

4. A storage system according to claim 3, further comprising:
    a connecting line for connecting the coupling switch,
    the control devices of a storage node are connected by the connecting line for connecting the coupling switch.

5. A storage system according to claim 1, further comprising
    a management console configured to manage structural components within the storage system.

6. A storage system according to claim 1, further comprising:
    a management console configured to manage structural components within the storage system;
    a name server configured to manage an access path between the storage system and the host computer, and
    a switch for connecting the storage system and the host computer.

7. A storage system according to claim 1, wherein
    the control devices of a storage node each sends data stored within the at least one storage device of the storage node to another control device within another storage node using the control device coupling unit.

8. A storage system according to claim 1, wherein
    the control devices of a storage node each sends information relating to access with one of the host computers to another control device within another storage node using the control device coupling unit.

9. A storage system comprising:
    a plurality of storage nodes each including at least one storage device configured to store data and plural control devices, each control device comprising:
        a network controller for communication with a host computer;
        a disk controller coupled to the at least one storage device for controlling input and output of data for the at least one storage device; and
        a memory for storing control information used for input and output of data with the at least one storage device; and
    a control device coupling unit configured to connect control devices from among mutually different ones of the storage nodes without using access paths between the control devices and any host computers,
    each of the control devices configured to access a combined memory area having a single address space, the combined memory area comprising the memories of each of the control devices,
    wherein each of the control devices among the storage nodes in the storage system is associated with a control device affiliation such that the control devices in a storage node each is associated with a different control device affiliation, and the control device coupling unit connects only those control devices among the storage nodes that are associated with the same control device affiliation.

10. A storage system according to claim 9, wherein
    the control devices among the storage nodes in the storage system each includes a control device switch for connecting with the control device coupling unit, and
    the control device coupling unit includes a connecting line for connecting to the control device switches.

11. A storage system according to claim 9, wherein
the control devices among the storage nodes in the storage system each includes a control device switch for connecting with the control device coupling unit, and
the control device coupling unit includes a coupling switch associated with a control device affiliation and a connecting line for connecting the coupling switch and the control device switch.

12. A storage system according to claim 11, further comprising:
a connecting line for connecting the coupling switch,
the control devices of a storage node are connected by the connecting line for connecting the coupling switch.

13. A storage system according to claim 9, further comprising
a management console configured to manage structural components within the storage system.

14. A storage system according to claim 9, further comprising:
a management console configured to manage structural components within the storage system;
a name server configured to manage an access path between the storage system and the host computer, and
a switch for connecting the storage system and the host computer.

15. A storage system according to claim 9, wherein
the control devices of a storage node each sends data stored within the at least one storage device of the storage node to another control device within another storage node using the control device coupling unit.

16. A storage system according to claim 9, wherein
the control devices of a storage node each sends information relating to access with one of the host computers to another control device within another storage node using the control device coupling unit.

* * * * *